US011425160B2

(12) United States Patent
Murray et al.

(10) Patent No.: US 11,425,160 B2
(45) Date of Patent: Aug. 23, 2022

(54) AUTOMATED RISK ASSESSMENT MODULE WITH REAL-TIME COMPLIANCE MONITORING

(71) Applicant: Tugboat Logic, Inc., Burlingame, CA (US)

(72) Inventors: Patrick Glenn Murray, Kula, HI (US); Carman Kwong, Calgary (CA); Christopher Cross, Calgary (CA); Jose Costa Moreno, Calgary (CA); Harpreet Shergill, Calgary (CA); Keegan Callin, Calgary (CA)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 17/373,534

(22) Filed: Jul. 12, 2021

(65) Prior Publication Data
US 2021/0367963 A1    Nov. 25, 2021

Related U.S. Application Data

(63) Continuation-in-part of application No. 17/191,346, filed on Mar. 3, 2021, now Pat. No. 11,283,840, (Continued)

(51) Int. Cl.
*H04L 9/40*    (2022.01)
(52) U.S. Cl.
CPC .......... *H04L 63/1433* (2013.01); *H04L 63/20* (2013.01)
(58) Field of Classification Search
CPC .................. H04L 63/1433; H04L 63/20
See application file for complete search history.

(56) References Cited

U.S. PATENT DOCUMENTS 6,356,909 B1    3/2002    Spencer
8,296,244 B1    10/2012    Heroux
(Continued)

FOREIGN PATENT DOCUMENTS

WO    2001-061593 A1    8/2001

OTHER PUBLICATIONS

Song et al., "Enterprise Internal Controlling Risks and Prevention within ERP System", Nov. 2011, International Conference on Information Management, Innovation Management and Industrial Engineering, pp. 41-44 (Year: 2011).*
(Continued)

*Primary Examiner* — Kenneth W Chang
(74) *Attorney, Agent, or Firm* — ASIF GHIAS

(57) ABSTRACT

Techniques are disclosed for usage-tracking of various information security (InfoSec) entities for tenants/organization onboarded on an instant multi-tenant security assurance platform. The InfoSec entities include policies, procedures, controls and evidence tasks. A policy or procedure is enforced by implementing one or more controls, and the collection of one or more evidence tasks proves/verifies the implementation of a control. The InfoSec entities are linked to each other across the platform and accrue a number of benefits for the tenants. These include generating a security questionnaire response (SQR), defining a readiness project and an audit project, sharing InfoSec entities encompassing the various products of a tenant, automating risk assessment, automatic collection of evidence tasks for verifying the implementation and/or operational state/status of various mitigating controls, etc.

19 Claims, 60 Drawing Sheets

Related U.S. Application Data which is a continuation-in-part of application No. 16/013,037, filed on Jun. 20, 2018, now Pat. No. 10,951,658.

(56) References Cited

U.S. PATENT DOCUMENTS

| | | | |
|---|---|---|---|
| 9,729,583 | B1 | 8/2017 | Barday |
| 10,860,721 | B1 | 12/2020 | Gentile |
| 2001/0049793 | A1* | 12/2001 | Sugimoto .......... G06F 21/6218 726/1 |
| 2001/0051913 | A1 | 12/2001 | Vashistha et al. |
| 2002/0023109 | A1 | 2/2002 | Lederer et al. |
| 2002/0059093 | A1 | 5/2002 | Barton et al. |
| 2002/0107875 | A1 | 8/2002 | Seliger et al. |
| 2002/0120472 | A1 | 8/2002 | Dvorak et al. |
| 2003/0084014 | A1 | 5/2003 | Sohrabi et al. |
| 2003/0229525 | A1 | 12/2003 | Callahan et al. |
| 2003/0233258 | A1 | 12/2003 | Cottrell et al. |
| 2004/0193907 | A1* | 9/2004 | Patanella .......... H04L 63/0227 726/25 |
| 2005/0010819 | A1* | 1/2005 | Williams ................ H04L 43/00 726/4 |
| 2005/0071185 | A1 | 3/2005 | Thompson |
| 2005/0197952 | A1* | 9/2005 | Shea ...................... G06Q 40/08 705/38 |
| 2005/0228688 | A1 | 10/2005 | Visser et al. |
| 2006/0047561 | A1* | 3/2006 | Bolton ............... G06Q 10/0635 705/7.28 |
| 2007/0239495 | A1* | 10/2007 | Osborn .............. G06Q 10/0639 705/7.28 |
| 2007/0250699 | A1 | 10/2007 | Dube et al. |
| 2008/0015913 | A1 | 1/2008 | Courtney et al. |
| 2009/0119141 | A1 | 5/2009 | McCalmont et al. |
| 2009/0265199 | A1* | 10/2009 | Moerdler .......... G06Q 10/0635 705/7.39 |
| 2010/0106653 | A1 | 4/2010 | Sandholm et al. |
| 2011/0208663 | A1 | 8/2011 | Kennis et al. |
| 2011/0251865 | A1 | 10/2011 | Yuen et al. |
| 2012/0041769 | A1 | 2/2012 | Dalal et al. |
| 2013/0067078 | A1 | 3/2013 | Banerjee et al. |
| 2013/0124244 | A1 | 5/2013 | Johnson et al. |
| 2013/0159277 | A1 | 6/2013 | Liu et al. |
| 2013/0246217 | A1 | 9/2013 | Denton et al. |
| 2013/0325731 | A1 | 12/2013 | Guamery et al. |
| 2013/0340030 | A1 | 12/2013 | Riley et al. |
| 2014/0039959 | A1 | 2/2014 | Clarke et al. |
| 2014/0365555 | A1 | 12/2014 | Jwalanna |
| 2014/0380488 | A1 | 12/2014 | Ray et al. |
| 2016/0189198 | A1 | 6/2016 | Mckenzie et al. |
| 2016/0371369 | A1 | 12/2016 | Cormack et al. |
| 2017/0032035 | A1 | 2/2017 | Gao et al. |
| 2017/0103441 | A1 | 4/2017 | Kolb et al. |
| 2017/0132203 | A1 | 5/2017 | Kim et al. |
| 2017/0132313 | A1 | 5/2017 | Kukla et al. |
| 2017/0243028 | A1 | 7/2017 | LaFever et al. |
| 2017/0323265 | A1 | 11/2017 | Burrows et al. |
| 2017/0337287 | A1 | 11/2017 | Gill |
| 2017/0357502 | A1 | 12/2017 | Barday |
| 2018/0285887 | A1 | 10/2018 | Maung |
| 2019/0124120 | A1 | 4/2019 | OReilly |
| 2021/0035116 | A1 | 2/2021 | Berrington et al. |

OTHER PUBLICATIONS

Capterra, "Proposal Management Software", https://www.capterra.com/proposal-management-software/, Apr. 10, 2018, VA, USA.

Hayes et al., "Expert system for development of request for proposal packages and evaluation of proposals", Proceedings of the IEEE National Aerospace and Electronics Conference, May 1989, vol. 3, pp. 1364-1369.

Loopio, "Customer Success Story", https://www.loopio.com, Apr. 10, 2018, Toronto, Canada.

Loopio, "RFP Software | Respond to RFPs with Loopio", https://www.loopio.com, Apr. 10, 2018, Toronto, Canada.

Motahari-Nezhad et al., "RFPCog: Linguistic-Based Identification and Mapping of Service Requirements in Request for Proposals (RFPs) to IT Service Solutions", 49th Hawaii Interational Conference on System Sciences, Jan. 2016, pp. 1691-1700.

Ovidian, "Qvidian Proposal Automation Advantage: The inciteKnowledge Migration Opportunity", Connect11 Conference, Apr. 11, 2011, FL, USA.

\* cited by examiner

Policies / PH-014 Passwords 306

◉ Policy  ☒ Controls  ☑ Events  ⋞ Usage

*How to implement PH-014 Passwords*

Ensure that all applications in use are configured to meet minimum password requirements. Consider using multi-factor authentication in all applications.

Implementation Notes ⓘ

Save

*Fig. 6*

Policies / PH-003 Customer Information

308

○ Policy  ⊞ Controls  ✎ Events  ⚙ Usage

| View | Draft (Draft) | History |

PH-003 Customer Information

*Organization members collect, use and dispose of customer information responsibly.*

○ Policy

Acme Corp Customer Information Security Policy

1.0 Purpose

Acme Corp maintains a strong commitment to customer information security and protection. This Customer Information Security Policy is intended to help employees determine what information can be disclosed to non-employees, as well as the relative sensitivity of information that should not be disclosed outside of Acme Corp without proper authorization.

The information covered in these guidelines includes, but is not limited to, information that is either stored or shared via any means. This includes: electronic information, information on paper, and information shared orally or visually (such as telephone and video conferencing).

All employees should familiarize themselves with the information labeling and handling guidelines that follow this introduction. It should be noted that the sensitivity level definitions were created as guidelines and to emphasize common sense steps that you can take to protect Acme Corp Confidential information (e.g., Acme Corp Confidential information should not be left unattended in conference rooms).

Please Note: The impact of these guidelines on daily activity should be minimal.

Questions about the proper classification of a specific piece of information should be addressed to your manager. Questions about these guidelines should be addressed to Acme Corp IT.

2.0 Scope

This policy covers all Acme Corp customer information controlled by Acme Corp.

Acme Corp personnel are encouraged to use common sense judgment in securing Acme Corp customer information to the proper extent. If an employee is uncertain of the sensitivity of a particular piece of information, he/she should contact their manager.

*Fig. 7*

Policies / PH-003 Customer Information

310

○ Policy    ☒ Controls    ✉ Events    ≪ Usage

*How to implement PH-003 Customer Information*

Transmission of confidential and sensitive customer information should use an encrypted channel. This is achieved by configuring email clients to only use SSL/TLS when connecting to email servers.

Storage of confidential and sensitive information must be encrypted at rest and limited only to personnel who need access to support customers.

For disposal of hardcopies of confidential and sensitive information, it is recommended to shred all documents and consider use of a vendor such as Iron Mountain or other local vendors. These vendors often offer hardware (hard-drives, etc.) destruction/disposal services as well.

For security incidents, create a checklist and email templates to track events and communicate with customers.

*Implementation Notes* ⓘ

[Editor toolbar with formatting icons: Source, Styles, Format, B I S, etc.]

Previously-Completed Questionnaires (10)

? Describe the controls in place to secure physical access to the facility.

Yes Our organization ensures that access to data centers and other secure areas requires a formal authorization from IT management prior to access being provisioned.

Hide Answer ◯ — View Details — Select

☐ Bank of Canada

? Describe the controls in place to secure physical access to the facility.

Yes Our organization ensures that access to data centers and other secure areas requires a formal authorization from IT management prior to access being provisioned.

Hide Answer ◯ — View Details — Select

☐ Acme Co

Controls (50)

PE6 - Physical Security Controls

Physical security controls are implemented to secure organization offices, rooms and facilities from unauthorized access.

View Details | Hide Answer | Select

505

PCI 9.1 - Facility Entry Controls

Use appropriate facility entry controls to limit and monitor physical access to systems in the cardholder data environment. - 9.1.1 Use either video cameras or access control mechanisms (or both) to monitor individual physical access to sensiti...

View Details | Hide Answer | Select

Policies (10)

Physical and Environmental Security
The organization protects managed systems and personnel from unauthorized access and from natural and human caused damage or destruction.
507A 507B
Hide Answer  View Details  Select

45 CFR Part 164 Subpart E - Privacy
Privacy of Individually Identifiable Health Information Hide Answer  View Details  Select 506   503D

*Fig. 10D*

Physical and Environmental Security

🛡 Policy   🕐 Events   ✏ Usage   🔍 Evidence

SQR Responses ⓘ    Readiness Projects ⓘ    Audit Projects ⓘ

| Project | | Close Date | Valuation |
|---|---|---|---|
| United Lifecare* | | - | $125,000 |
| ID | Question | | |
| VQ-002 | Are reviews carried out for physical access to data centre? | | |

Create a new comment

Controls List

Filters | SOC 2 | Not Implemented | In Use

Showing 1-14 of 14 Controls

512

Actions ∨

| ☐ Name | Product Scope | Category | Framework Codes | Risk | A | |
|---|---|---|---|---|---|---|
| ☐ CM4 - Change Notification | Startopia Finance | Change Management | CC2.2 | High | ● | ⋯ |
| ☐ CR5 - Business Continuity Pla... ⊕ Organization-Wide | | Continuity and Resilience | A1.3 | Medium | ● | ⋯ |
| ☐ SS1 - Access and Authentication ... | Startopia Finance | Serverless Security | CC6.1 | Not Set | ● | ⋯ |

*Fig. 12A*

PE3 – Physical Access Authorization to Data Center

Organization-Wide Control

516

Organization-wide controls allow you to implement a control a single time across all products. Details of organization-wide controls are shared in all products. There are certain controls that are only necessary to implement once despite having multiple products, such as conducting performance reviews or managing security incidents.

Click on the Usage Tab to see the readiness projects this control is used in.

Control    Evidence Tasks    Events    ⌇ Usage

SQR Responses ⓘ    Readiness Projects ⓘ    Audit Projects ⓘ    Risks ⓘ

| Project | Close Date | Valuation |
|---|---|---|
| United Lifecare* | — | $125,000 |

AT3 - Onboarding Customers and Employees

Product-Specific Control: Startopia Europe

Product-specific controls allow you to have clones of a control in multiple products. Any operation taken on this control does not have any impact on clone controls in other products and vice-versa.

Click on the Usage Tab to see the readiness projects this control is used in.

Control | Evidence Tasks | Events | Usage | Risks

Showing 1-1 of 1 Risk Treatment

Strategic Objective
Customer ~ Customer Success and Communication

Risk: Customers misuse the system due to their failure to understand their responsibilities as well as purpose and design of the system (Risk ID: 4)

Risk Level | Risk Treatment | Residual Risk
● High | Mitigate | ● High

● No Assignees

Create Readiness Project                                           ✕

Step #1 - Select or add a new Product.
Tugboat Logic allows you to have custom audit readiness projects by product, as products have unique scopes, controls, and evidence tasks. The product name can be edited at a later time if you wish.

In order to add more than one product, the Enterprise Plus license is required. Contact sales@tugboatlogic.com for more information.

\* Select Product

[ Select Product ]       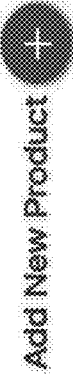 Add New Product

Step #2 - Name your Readiness Project.
Tugboat Logic allows you to have custom audit readiness projects by security framework (e.g. SOC 2, PCI DSS, etc.) as you pursue different audits. We recommend you use a memorable project name such as "SOC 2 2020 for Product X".

All customers are allowed to create unlimited readiness projects.

* Project Name e.g. My Readiness Project

Project Description

Provide additional information on this project.

Step #3 – Set an Observation Period.
Set an observation period to help you determine if you've gathered evidence for the period for which you are being audited. The period can also have an unbounded end date if you wish to manage your InfoSec program on an ongoing basis.

* Start Date 2021-01-01

End Date

Select date

Create

Cancel

Acceptable Use

- Policy
- Events
- Usage
- Evidence

SQR Responses ⓘ   Readiness Projects ⓘ   Audit Projects ⓘ

| Readiness Project | Product |
|---|---|
| ☐ ISO 27001 * | Startopia Finance |
| ISO 27001 for 2020 | |
| ☐ SOC 2 * | Startopia Finance |
| SOC 2 Type 2 for Jan 1 – Dec 31, 2020 | |

AT4 – User Guides

Product-Specific Control: Startopia Finance

Product-specific controls allow you to have clones of a control in multiple products. Any operation taken on this control does not have any impact on clone controls in other products and vice-versa.

Click on the Usage Tab to see the readiness projects this control is used in.

Control    Evidence Tasks    Events    Usage    Risks    570

SQR Responses ⓪    Readiness Projects ⓪    Audit Projects ⓪    Risks ⓪

| Readiness Project | Product |
|---|---|
| SOC 2 * | Startopia Finance |
| SOC 2 Type 2 for Jan 1 - Dec 31, 2020 | |

*Fig. 17B*

Data Encryption at Rest

Associated with organization-wide scope
This evidence task is associated with one or more controls with organization-wide scope. This means evidence uploaded here may apply to all products.

To see the readiness projects that include this evidence task, click on the Usage Tab.

Attachments | ✎ Usage

SQR Responses ⓘ    Readiness Projects ⓘ    Audit Projects ⓘ

572

| Readiness Project | Product |
|---|---|
| ISO 27001 * | Startopia Finance |
| ISO 27001 for 2020 | |
| 10 * | Startopia Finance |
| Foundational framework with top 10 policies and 20 controls. A subset of SOC 2 and other frameworks. | |
| SOC 2 * | Startopia Finance |
| SOC 2 Type 2 for Jan 1 - Dec 31, 2020 | |

*Fig. 17C*

| Policy Name | Category | Assignee | Reviewer | Status |
|---|---|---|---|---|
| Business Continuity and Disaster Recovery | Business Continuity | ● | ● | Draft |
| Change Management | Security Operations | ● | ● | Draft |
| Corporate Ethics | Organization and Management | ● | ● | Published |
| Customer Support and SLA | Audit and Compliance | ● | ● | In Progress |
| Data Retention and Disposal | Data Security | ● | ● | Draft |
| Incident Management | Security Operations | ● | ● | Draft |
| Information Classification | Information and Communication | ● | ● | Draft |
| Information Security | Organization and Management | ● | ● | Awaiting Approval |

Showing 1-21 of 21 Policies

Showing 1-50 of 76 Controls

578

| Name | Category | Framework Codes | Tag | Risk | A | ⌄ |
|---|---|---|---|---|---|---|
| ☐ AT1 - Information Security Policies... ● | Awareness and Training | CC1.4... | Priority 1 | ● | ● | ⌄ |
| ☐ AT2 - Information Security Awaren... ● | Awareness and Training | CC1.4... | Priority 1 | ● | ● | ⌄ |
| ☐ AT3 - Onboarding Customers and Em... | Awareness and Training | CC2.1... | Priority 2 | ● | ● | ⌄ |
| ☐ AT4 - User Guides | Awareness and Training | CC2.1... | Priority 2 | ● | ● | ⌄ |

*Fig. 18C*

Showing 1-50 of 83 Evidence Tasks

580

| Evidence Task | Product Scope | Associated Controls/Policies | ⏱ ⁝ | 👤 | Last Collected | Overall Status |
|---|---|---|---|---|---|---|
| ☐ Data Encryption at Rest | Multiple | PCI 8.2.1 - Strong Cryptogra...<br>A.10.1.1 - Policy on the Use...<br>SO5 - Encryption of Data at... | Yearly | ● | Last Thursday | ⊘ |
| ☐ Firewall Configurations Settings | Multiple | PCI 1.2.1 - Firewall Restricti...<br>PCI 1.2 - Firewall and Router...<br>A.13.1.3 - Segregation in Ne...<br>+1 more... | Yearly | ● | Last Thursday | ⊘ |

*Fig. 18D*

Risk Identification Survey

The alignment of strategic objectives and risk management is essential to avoiding a siloed risk management approach. A siloed risk management approach can lead to incomplete risk identification, lack of focus on the highest priority risks that impact the organization, and a lack of executive management support.

This survey helps you define a custom set of risks based on your unique strategic objectives.

584

Get Started!

Simply review the strategic objectives and select the ones that apply to your organization. Tugboat Logic has automatically selected some of the strategic objectives below based on controls in your readiness project(s) that indicate that these strategic objectives apply to your organization. When you're ready, click 'Generate Risks' to see your risk register auto-populated with a list of recommended risks mapped to each strategic objective. It is recommended that you revisit this survey quarterly or annually to identify potential new risks and verify that current control measures are sufficient.

Customer

Inadequate customer service and relationship management pose various risks, including insufficient privacy and protection of customers' personal data, increased customer churn rates, low customer satisfaction, and contract risk. These risks directly affect your organization's operational efficiency, reputation, and profitability.

■ Customer Success and Communication
  Recommended

■ Maintain Integrity of Customer Data
  Recommended

■ Meet Contractual Obligations/Customer
  Commitments
  Recommended

*Fig. 19A*

Governance

Governance related objectives focus on ensuring an organization's leadership makes decisions that deliver on performance objectives while protecting and promoting shareholder investment. Weaknesses in corporate governance practices expose an organization to several risks, including legal, regulatory, and reputational risks.

- Identify and Mitigate Risks that Threaten the Achievement of Security Objectives
  *Recommended*
- Identify and Resolve Incidents that Threaten the Achievement of Security Objectives
  *Recommended*
- Leadership Commitment in Achieving Security Objectives
  *Recommended*

586

People

People are the most valuable asset in any business, but they are also the most vulnerable asset. Employees must follow your organization's procedures, practices, and rules to avoid deviating from expected behavior in a way that could damage the business's performance and reputation. This risk directly affects your culture, reputation, operational efficiency, and profitability.

- Attract, Encourage, and Retain the Key Talent
  *Recommended*
- Embedding Corporate Ethics, Diversity, and Inclusion in Organizational Culture
  *Recommended*
- Meeting Security Commitments
  *Recommended*

*Fig. 19B*

Regulatory

Regulatory objectives address the risks of non-compliance with legal or contractual requirements by implementing protocols to monitor compliance with regulatory obligations. Failure to comply with legal and contractual requirements can increase financial, reputational, and operational risk.

- ■ Compliance to Data Privacy Commitments
  *Recommended*
- ■ Compliance to Legal, Contractual and Regulatory Requirements
  *Recommended*
- ☐ Compliance to Payment Card Standards

Resilience

Business resilience is the ability an organization has to adapt to disruptions while maintaining continuous business operations and safeguarding people, assets, and company reputation. Having a strong business continuity plan in place is critical to avoid financial and reputational risks.

- ■ Capacity and Performance Management
  *Recommended*
- ■ Continuity of Information and Services
  *Recommended*

588

Ready to generate a risk register?  [ GENERATE → ]

Showing 1-25 of 69 Controls

592

| Name | Description | Category | 👤 | ✓ | Audit Status |
|---|---|---|---|---|---|
| AT4 - User Guides | The organization has developed documentatio... | Awareness and Training | 🟢 | ✓ | ✓ |
| CM4 - Change Notification | Changes that affect the functionality and secu... | Change Management | 🟢 | ⋯ | ✓ |
| HR1 - Security Roles and Responsi... 🟢 | Information security roles and responsibilities ... | Human Resources | 🟢 | ✓ | 📚 |
| OM7 - Formal Agreements with Cu... 🟢 | The organization has formal agreements in pla... | Organization and Management | 🟢 | ✓ | ✓ |
| AC1 - Access Provisioning and Appro... | Access to in-scope system components (appli... | Access Control | 🟢 | ✓ | 📚 |
| AC3 - Administrative/Privileged Access | Access to a generic administrator or privileged... | Access Control | 🟢 | ✓ | ↗ |
| AC5 - Segregation of Customer Data | System components are configured such that ... | Access Control | 🟢 | ✓ | 📚 |

*Fig. 20B*

594 — Showing 1-25 of 76 Evidence Tasks

| Name | Associated Controls | & | ⟳ | Audit Status |
|---|---|---|---|---|
| Data Encryption at Rest | PCI 8.2.1 - Strong Cryptography f...<br>+2 more... | ● | Yearly | ✓ |
| Firewall Configurations Settings | PCI 1.2.1 - Firewall Restriction to L...<br>+3 more... | ● | Yearly | ✓ |
| Mobile Device Management Configuration | A.6.2.1 - Mobile Device Policy<br>+1 more... | ● | One-Time | 📋 |
| Automatic Capacity and Performance Monitoring ... | SO2 - Automatic Capacity and Per...| ● | One-Time | ✓ |
| Antivirus Software Configuration | PCI 5.1.1 - Anti-virus Protection ...<br>+3 more... | ● | Quarterly | ✎ |

*Fig. 20C*

Startopia II    598            Information Security Program

Table of Contents

| | |
|---|---|
| Table of Contents | 2 |
| InfoSec Policies | 5 |
| Acceptable Use | 6 |
| Startopia II Acceptable Use Policy | 6 |
|    1.0 Purpose | 6 |
|    2.0 Scope | 6 |
|    3.0 Policy for Acceptable Use | 6 |
| Access Control | 9 |
| Startopia II Access Control Policy | 9 |
|    1.0 Purpose | 9 |
|    2.0 Scope | 9 |
|    3.0 Policy | 9 |
| Business Continuity and Disaster Recovery | 12 |
| Startopia II Business Continuity and Disaster Recovery Policy | 12 |

*Fig. 21B*

Products

View and manage the unique aspects of a specific product's InfoSec program, including readiness projects, audit projects, evidence collection integrations, and more.

Showing 1-3 of 3 Products

Startopia Health

SH

600

Startopia for healthcare organizations.

View Product Details

Startopia Finance

SF

Startopia for financial services organizations.

View Product Details

Fig. 22D

AT2 - Information Security Awareness Training

Organization-Wide Control

608

Organization-wide controls allow you to implement a control a single time across all products. Details of organization-wide controls are shared in all products. There are certain controls that are only necessary to implement once despite having multiple products, such as conducting performance reviews or managing security incidents.

Click on the Usage Tab to see the readiness projects this control is used in.

 Control     Evidence Tasks    Events    Usage

What is this control all about?
Employees are required to complete an information security and awareness training annually.

*Fig. 22E*

S09 – Log Management Process and Access to Logs

Product-Specific Control: Startopia Finance  610

Product-specific controls allow you to have clones of a control in multiple products. Any operation taken on this control does not have any impact on clone controls in other products and vice-versa.

Click on the Usage Tab to see the readiness projects this control is used in.

Control   Evidence Tasks   Events   Usage

What is this control all about?
A log management process has been formalized to make sure that access to change the log configuration and access to modify logs is restricted.

*Fig. 22F*

Readiness Projects

Tugboat Logic allows you to have custom audit readiness projects by product, as products have unique scopes, controls, and evidence tasks. The product name can be edited at a later time if you wish.

Step 1: Select a Product

[ Select ▼ ]

812

Tugboat Logic allows you to have custom audit readiness projects by security framework (e.g. SOC 2, PCI DSS, etc.) as you pursue different audits. We recommend you use a memorable project name such as "SOC 2 2020 for Product X".

Step 2: Name Your Readiness Project

My Readiness Project

Step 3: Set Observation Period

Set an observation period to help you determine if you've gathered evidence for the period for which you are being audited. The period can also have an unbounded end date if you wish to manage your InfoSec program on an ongoing basis.

Start Date  
06/24/2021 📅

End Date  
12/31/2021 📅

[ CREATE --> ]

Risk Identification Survey

The alignment of strategic objectives and risk management is essential to avoiding a siloed risk management approach. This survey helps you define a custom set of risks based on your unique strategic objectives.

Get Started

Simply review the strategic objectives and select the ones that apply to your organization. Tugboat Logic has automatically selected some of the strategic objectives below based on controls in your readiness project(s) that indicate that these strategic objectives apply to your organization. When you're ready, click 'Generate Risks' to see your risk register auto-populated with a list of recommended risks mapped to each strategic objective.

Customer

Inadequate customer service and relationship management pose various risks, including insufficient privacy and protection of customers' personal data, increased customer churn rates, low customer satisfaction, and contract risk. These risks directly affect your organization's operational efficiency, reputation, and profitability.

- [✓] Customer Success
  *Recommended*
- [ ] Maintain Integrity of Customer Data
- [✓] Meet Contractual Obligations
  *Recommended*

Governance

Governance related objectives focus on ensuring an organization's leadership makes decisions that deliver on performance objectives while protecting and promoting shareholder investment. Weaknesses in corporate governance practices expose an organization to several risks, including legal, regulatory, and reputational risks.

- [✓] Mitigate Fraud Risks
  *Recommended*
- [✓] Mitigate Security Objectives Risks
  *Recommended*
- [✓] Incident Response
  *Recommended*

Technology

Technology risks include hardware and software failure, human error, spam, viruses, and malicious attacks, as well as natural disasters. Poor technology risk management can lead to operational, financial, and regulatory risks.

- [ ] Monitoring System
- [✓] Information Security & Confidentiality
  *Recommended*
- [ ] Change Control Management

[ Generate Risks --> ]

Risk Assessment: Risk #1

Risk: Unauthorized access to stored data or data during transmission

Assess Inherent Risk

Choose Risk Treatment

Choose Mitigating Controls

Additional Risk Details

Identify Assets

Choose Mitigating Controls

Mitigating controls are designed to help reduce risk by avoiding, detecting, or correcting the things that create risk. The goal of this step is to evaluate the controls that you currently have in place and identify potential gaps.

Current Linked Controls

| Control Name | Framework | Product Scope | Implemented | Action |
|---|---|---|---|---|
| Control 1 | SOC 2 | Product 1 | Yes | Unlink |
| Control 2 | SOC 2 | Product 2 | No | Unlink |
| Control 3 | SOC 2 | Product 1 | Yes | Unlink |

Recommended Controls

| Control Name | Framework | Product Scope | Implemented | Action |
|---|---|---|---|---|
| Control 4 | SOC 2 | Product 1 | No | Link |
| Control 5 | SOC 2 | Product 2 | No | Link |
| Control 6 | SOC 2 | Product 1 | No | Link |

Next Step -->

Risk Assessment: Risk #1

Risk: Unauthorized access to stored data or data during transmission

- Assess Inherent Risk
- Choose Risk Treatment
- Choose Mitigating Controls
- Additional Risk Details
- Identify Assets

Additional Risk Details

To complete the risk analysis, you should evaluate the residual risk, assign a risk owner, and document action items.

Define Residual Risk

| High | Medium | Low |

Residual risk is the amount of risk that remains considering mitigating controls in place. Once you treat the risks, you won't completely eliminate all the risks because it is simply not possible. Therefore, risks will remain at a certain level, and this is what residual risks are. The goal is to determine whether the planned mitigating controls are enough to reduce the risk level to an acceptable level.

Assign Risk Owner

[Select ▼]

Add Action Items

Documenting action items identified to address the risk is important so that the risk owner can track progress.

*Action Item description*

Due Date    Status

06/24/2021      [Select ▼]

[ Next Step --> ]

Risk Assessment: Risk #1

Risk: Unauthorized access to stored data or data during transmission

Assess Inherent Risk

Choose Risk Treatment

Choose Mitigating Controls

Additional Risk Details

Identify Assets

Identify Assets

Assets include servers, client contact information, sensitive partner documents, trade secrets, and others. The goal of this step is to identify critical assets that need to be protected so that you can determine the risks associated with them and put in place appropriate control measures.

Assets                                                                                                   Add Asset

| Asset       | Asset Type | Description   | Actions  |
|-------------|------------|---------------|----------|
| EC2 Servers | Server     | Prod servers  | Select ▼ |
| AWS S3      | Database   | Customer data | Select ▼ |
| AWS RDS     | Database   | Backup data   | Select ▼ |

870

Next Step -->

*Fig. 33*

Realtime Risk Register

STATUS: Draft | ASSIGNEE: Assignee #3 | Reviewer: Reviewer #2 | Review Date: June 18, 2021

Filters: *

[Expand All]

Q Search

| Risk | Category | Inherent Risk | Risk Treatment | Controls | Residual Risk | Assignee | Implemented | Operational |
|---|---|---|---|---|---|---|---|---|
| Risk 1 | Customer | High | Mitigate | 1 | Low | GG | Yes | No |
| Risk 2 | Governance | Medium | Mitigate | 3 | Low | PM | Yes | Yes |
| Risk 3 | Technology | High | Mitigate | 5 | Low | SS | No | No |
| Risk 4 | Regulatory | Medium | Transfer | 2 | Low | CC | Yes | Yes |

Realtime Risk Register

STATUS: Draft  ASSIGNEE: Assignee #3  Reviewer: Reviewer #2  Review Date: June 18, 2021

Filters ▼

[Expand All]

Q Search

| Risk | Category | Inherent Risk | Risk Treatment | Controls | Residual Risk | Assignee | Implemented | Operational |
|---|---|---|---|---|---|---|---|---|
| Risk 1 | Customer | High | Mitigate | 3 | Low | GG | Yes | No |

890

Mitigating Controls Status

| Strategic Objective | Product | Implemented | Operational | Learn More |
|---|---|---|---|---|
| SO5 - Encryption of Data at Rest | Product #1 | Yes | Yes | View Control |
| SO5 - Encryption of Data at Rest | Product #2 | Yes | No | View Control |
| WS2 - Workstation Disk Encryption | Organization-Wide | Yes | Yes | View Control |

*Fig. 35A*

Failure type: The following controls are associated with evidence tasks that have missing evidence attachments in the last 3 months:

S05 - Encryption of Data at Rest (Product #2)

[ View Evidence Task ]

*Click 'View Evidence Task' to add evidence for all missing collection intervals.*

AUTOMATED RISK ASSESSMENT MODULE WITH REAL-TIME COMPLIANCE MONITORING

RELATED APPLICATIONS

This application is a continuation-in-part of U.S. patent application Ser. No. 17/191,346, filed on Mar. 3, 2021, which is a continuation-in-part of U.S. patent application Ser. No. 16/013,037, filed on Jun. 20, 2018, now U.S. Pat. No. 10,951,658 B2 issued on Mar. 16, 2021. All the above numbered patents and applications are incorporated by reference herein in their entireties for all purposes.

FIELD OF THE INVENTION

The present invention generally relates to the field of information security (InfoSec) assurance and more specifically to InfoSec compliance monitoring via usage-tracking of InfoSec entities.

BACKGROUND OF THE INVENTION

Security and privacy are of paramount concerns to most businesses in today's sensitive environment. There is an ever-increasing need for efficiently monitoring the compliance of an organization against one or more security/privacy policies, frameworks, standards or regulations or against a set of security/privacy controls required in an RFI/RFP. Relatedly, most artisans are aware of the painstaking process, usually involving fire drills and war room efforts, for answering such a security/privacy RFP or the security/privacy questions of an RFP in a timely fashion.

There is no solution in the prior art that addresses the concern of automatically or semi-automatically answering a security/privacy RFI/RFP, which remains a laborious and logistically hard, but yet repetitive process. Furthermore, no solution exists that would combine such an auto-answering capability of an RFP with the related aspect of monitoring the security/privacy compliance of an organization against a set of security/privacy controls.

Yet there is plenty of prior art in this field. US Patent Publication No. 2012/0041769 A1 to Dalal et al. discloses an RFP management system for improving the process of matching researchers with relevant research projects described in RFPs. The system creates a researcher profile based on a scan of the researcher's reports and past proposals and scans web-based and other databases for project opportunities that fit the profile. It then produces a subset of RFPs for the researcher to consider.

The system further includes search and matching features that enable identification of expertise among researchers based on their profiles to facilitate collaboration, and to suggest research teams. With the best-matched expertise for each RFP, the user interface allows researchers to refine their profiles and give feedback to allow the system to learn and improve performance.

US Patent Publication No. 2016/0371369 A1 to Cormack et al. discloses systems and methods for classifying electronic information and terminating a classification process utilizing Technology-Assisted Review ("TAR") techniques. In certain embodiments, the TAR process, which is an iterative process, is terminated based upon one or more stopping criteria. In certain embodiments, use of the stopping criteria ensures that the TAR process reliably achieves a level of quality (e.g., recall) with a certain probability. In certain embodiments, the TAR process is terminated when it independently identifies a target set of documents.

The TAR process is terminated based upon whether the ratio of the slope of the TAR process's gain curve before an inflection point to the slope of the TAR process' gain curve after the inflection point exceeds a threshold. The TAR process is terminated when a review budget and slope ratio of the gain curve each exceed a respective threshold.

US Patent Publication No. 2017/0132203 A1 to Kim et al. describes a document-based requirement identification and extraction system. The process includes parsing a set of documents and identifying relationships among parsed components of the documents. The process further includes applying the parsed components and identified relationships to a meta-model that defines requirements.

The requirements include a statement expressing a need and/or responsibility. It also includes identifying candidate requirements and their candidate topics based on the above process. For each of the identified candidate topics, a feature vector is built from the corresponding candidate requirements. The process also includes training the meta-model with the feature vectors, validating the meta-model and classifying output of the validation. This results in identifying a subset of the candidate requirements and corresponding topics expressed in the set of documents.

US Patent Publication No. 2017/0132313 A1 to Kukla et al. discloses a computerized system and methods for the automated extraction of contextually relevant information from generic document sets. This is done by automatic processing of actionable information from the documents. Their techniques appear to avoid inaccuracies and inefficiencies resulting from conventional and/or human-based document processing techniques.

US Patent Publication No. 2014/0365555 A1 to Jwalanna teaches a computer-implemented method of cloud-computing based content management. The process includes receiving a dynamic content block generated by a user of a client application in a computing device. The dynamic content block is stored in a cloud-storage environment. A search query for the dynamic content block by another client application in another client's computing device is received. The dynamic content block is provided to the second client application. An update to the dynamic content block by the first user is received. The update to the dynamic content block is automatically synchronized to the second client application. Optionally, the dynamic content block can be a wit. The dynamic content block can include a reusable portion of user-generated information such as a portion of a sales document or a repeatedly used email content. A drag and drop operation from the second client application to another application can then be detected.

Reference of "Qvidian Proposal Automation Advantage" obtained from Connectll conference website mentions an auto-answer function of RFPs. Similarly, NPL web page entitled "Supercharge responses to RFPs, RFIs, and Security Questionnaires" obtained from Loopio's website mentions streamlining responding to RFPs and RFIs by using their solution.

U.S. Patent Publication No. 2014/0380488 A1 to Ray et al. teaches that real-time security, integrity, and reliability postures of operational, information, and security systems dynamically evolve. The embodiments of their design are purported to be systematized and pervasively applied across interconnected, interdependent, information and security systems. The result is to mitigate system-wide business risk for improving efficiency and effectiveness of business processes and for enhancing security control which conventional perimeter, network, or host-based control and protection schemes cannot successfully perform.

U.S. Patent Publication No. 2019/0124120 A1 to O'Reilly discloses a cybersecurity system that sums and scores one or more cybersecurity controls for different client computing systems each having different attributes, needs, and interests. In addition, the cybersecurity system provides to each different client computing system auto-suggestions that suggest one or more ways in which the client computing system may improve the confidentiality, integrity, and availability of the information stored on the client computing system and/or improve the confidentiality, integrity, and availability of the underlying characteristics of the client computing system. In addition, the cybersecurity system verifies that the functioning of the client computing system has improved.

U.S. Pat. No. 10,860,721 B1 to Gentile teaches systems and methods for assessing and improving the information security management health of an organization. The techniques may be used for generating a baseline assessment measuring a level of compliance with proper security framework elements as well as a level of cross-management, interaction, or engagement across four essential information security domains. These domains include a benchmark domain, a measurement domain, decision domains and an execution domain using a domain-element table with a plurality of measurement types. The measurements types are associated with criteria for progressing through an increasing level of difficulty tiered scoring system. The scoring system is established by selected frameworks, policies, standards, and guidelines while also providing a path for improving upon a baseline assessment.

Despite the above prior art, there is no solution that teaches information security (InfoSec) entities linked/connected to each other in a multi-tenant security assurance platform/system. Furthermore, using the techniques of the prior art, there are many problems and limitations in the field of risk assessment. These include:

1. Lack of automated business risk guidance specifically mapped to the industry InfoSec standards such as SOC 2, ISO 27001, NIST CSF, HIPAA, PCI DSS, CCPA and GDPR, etc. Most prior art solutions require the business risks to be provided manually by the user, so they are unhelpful to users without prior deep knowledge of risk assessments. Secondly, if they have content, it is not based on the industry standards that they are being audited against, which makes it very difficult to keep the content consistent with the actual InfoSec program of record. As a result, the prior art solutions require the user to input a paragraph of custom text in the mitigating control section. This makes it difficult to know if it is indeed a best practice, unless the user is an expert. Furthermore, such free form textual input is un-linked/unhinged to the actual InfoSec controls.
2. Lack of real-time continuous monitoring of true operational state/status of mitigating controls. Most prior art solutions are siloed, without the knowledge of specific mitigating controls being operational in actuality or not. They do not connect to the InfoSec controls of record or check for evidence collection continuously, and as a result, are just unhinged aspirational documents.
3. Lack of support for multiple products. The compliance is only as good as the weakest link in the organization. For larger organizations, prior art risk assessment solutions do not monitor operational state of controls across multiple product lines. As a result, they have no knowledge as to which products are or are not compliant with the risk best practices.

Objects and Advantages

In view of the shortcomings of the prior art, it is an object of the invention to teach techniques for linking various information security (InfoSec) entities for the tenants of a multi-tenant security assurance platform/system.

It is also an object of the invention to enable usage-tracking of these InfoSec entities across the platform.

It is further an object of the invention to enable the creation and monitoring/tracking of a readiness project for the tenants of the multi-tenant system, based on above usage-tracking.

It is further an object of the invention to enable real-time risk assessment based on the true operational status of the mitigating controls for risks identified during a risk assessment.

It is also an object of the invention to automatically recommend risks to the tenant organization during above risk assessment.

It is also an object of the invention to automatically recommend mitigating controls to the tenant organization during above risk assessment.

It is also an object of the invention to provide a real-time or near real-time view of the operational status of the various mitigating controls in the organization.

It is also an object of the invention provide the above functionality in a real-time risk register. It is also an object of the invention to provide the above capabilities across/encompassing the various products of a tenant in the multi-tenant system.

These and other objects and advantages of the invention will become apparent upon reading the detailed specification and by reviewing the accompanying drawing figures.

SUMMARY OF THE INVENTION

The present invention relates to systems and methods for providing information security (InfoSec) assurance by usage-tracking of various InfoSec entities for an organization. The security assurance or simply assurance is provided via a multi-tenant software-as-a-service (SaaS) web-application or system or in other words a multi-tenant security assurance platform. Each tenant organization or simply a tenant or an organization onboarded onto the instant security assurance platform benefits from the variety of linked InfoSec entities managed and tracked by the instant design.

The InfoSec entities include one or more security policies, one or more controls, one or more evidence tasks, etc. There may also be one or more procedures that may be thought of as sub-policies used by a tenant. Any number of such entities may be used by a tenant of the instant multi-tenant security assurance platform. An overall InfoSec program of an organization comprises all the InfoSec policies, procedures, controls and evidence tasks used by the organization.

According to the chief aspects, a policy or procedure is enforced by the implementation of one or more controls. The "proof" or verification of the implementation of a control is made by collecting one or more evidence tasks that prove/verify that the control has been implemented. This proof may be needed in an audit which is typically external-facing or in an internal-facing readiness project that prepares the organization/tenant or measures its readiness for an audit.

Furthermore, the proof may also need to be periodically updated to ensure that the control is in an operational state/status.

Based on the usage-tracking capabilities of the present design, the tenant/organization can perform a variety of useful activities. These include generating in a streamlined or a fully or semi-automated manner a security questionnaire response (SQR). These also include creating and monitoring the progress of a readiness project or an audit project mentioned above. As noted, the various entities housed or stored by the present technology are linked together by a "connective tissue" or "live linkage".

Preferably, the above linkage is afforded by a data-model. Preferably such a data-model is a relational data-model. However, alternatively, the data-model may be based on any other types of database techniques known in the art, including but not limited to NoSQL, graph, object database, among others. This linkage enables the present technology to provide a consistent view of all the InfoSec entities in the system to the various stakeholders. For example, a control that has been implemented for a tenant as a part of policy A but is also used in policy B, is automatically reflected as having been implemented for both the policies.

Similarly, an evidence task collected to verify the implementation of a control used in policy A and policy B will reflect as having been collected for both the policies. Similarly, an evidence task required to prove the implementation of two different controls, once having been collected for one control, will be reflected as having been collected for both. This live linkage of the InfoSec entities allows the present technology to track the usage of the entities across various tenants, their constituent products, their customers/prospects, partners, auditors or any other relevant stakeholders.

The present design is able to support large tenant organizations that have more than one product-lines or businesses or simply products. In other words, each entity has a scope that may span across the organization i.e. be organization-wide, or product-specific. This multi-product functionality allows a user to select the desired scope when viewing the various InfoSec entities in the instant multi-tenant security assurance platform. Since the InfoSec entities are shared across the products, the technology provides a consistent view of their status across the organization or individual scopes.

The usage-tracking capabilities of the present technology allow an organization or tenant to effectively measure or monitor the compliance of an organization with any desired compliance objectives. These may include a custom set of policies or controls, or established security frameworks/standards in which the policies/controls are prescribed/used, or both. Such security frameworks include but are not limited to General Data Protection Regulation (GDPR), System and Organizational Controls (SOC) 2, National Institute of Standards and Technology Cybersecurity Framework (NIST CSF), California Consumer Privacy Act (CCPA), International Organization for Standardization (ISO) 27001, Health Insurance Portability and Accountability Act (HIPAA) and Payment Card Industry Data Security Standard (PCI DSS).

Preferably, the evidences tasks are collected automatically via an autocollect evidence task integration or collection capability that deploys/installs integrations for a tenant in the instant security assurance platform. These integrations are programs or scripts that interface with the source of the evidence at one end and with the instant multi-tenant security assurance platform at the other end. Once installed, an integration automatically executes on a configured schedule to collect the specific evidence that proves/verifies the implementation and/or operational state/status of the control. An evidence task may typically take the form of a file that is viewed by a user such as an auditor. More than one evidence tasks may be collected to verify the implementation of a control.

Other benefits of the usage-tracking capabilities of the instant technology include the automatic or streamlined generation of an information security program document for a tenant/organization. This task is otherwise laborious, time-consuming and error-prone based on the techniques of the prior art. The benefits further include the generation of a risk register that specifies and tracks the various risks that the organization may be exposed to, their treatment plans, residual risk levels, etc. Still other benefits of the present technology include automatic recommendations made to the tenant user for making appropriate selections. These recommendations are made while generating an SQR, during risk assessment, creating a readiness project, for the multi-product functionality and otherwise across the multi-tenant security assurance platform.

A set of highly preferred embodiments greatly enhance and automate risk assessment for a tenant. The automation is afforded by a risk assessment module (RAM) working in conjunction with the other modules of the system. The risk assessment is automated by first enabling a tenant user to define a readiness project with the desired scope and compliance requirements. Then a risk recommendation engine automatically recommends the risks to the user based on the controls and the scope defined in the readiness project.

A mitigating control recommendation engine recommends the appropriate mitigating control(s) for each risk, using the linkage between the controls and risks in the system. Based on the usage-tracking capabilities of the present design and the above-discussed evidence task collection/verification, the tenant user is provided a real-time or near real-time view of the operational status of various mitigating controls. This view is afforded by a real-time risk register module. As a result, the tenant stays informed and current above the state of compliance of their organization. In a preferred embodiment, there is also a bulk-uploader that allows uploading or importing of one or more files comprising a custom or legacy risk register into the instant risk assessment module. Such an embodiment extends the real-time monitoring benefits of the instant risk register to tenants that may have alternate or legacy risk management solutions.

Preferably, the risk recommendation engine draws risks from a risks library/database module/sub-module for recommending to the tenant user above. Preferably, the user assesses/defines one or more inherent risks in the system, as well as a residual risk level for each risk. Preferably, the user chooses a treatment plan for each risk. Preferably, there is one or more mitigating controls in the risk treatment plan. Preferably, the mitigating controls recommendation engine draws mitigating controls from a controls library/database module/sub-module for recommending to the tenant user above. If a risk or control does not exist in the libraries, the tenant is preferably given the option of creating a custom risk and/or control.

The present invention, including the preferred embodiment, will now be described in detail in the below detailed description with reference to the attached drawing figures.

BRIEF DESCRIPTION OF THE DRAWING FIGURES

FIG. 4 is a screenshot of an implementation of the present teachings showing various stock policies at a high-level.

FIG. 5 shows a portion of a detailed view of an exemplary stock password policy of an implementation of the present teachings.

FIG. 6 shows exemplary requisite controls from the policy of FIG. 5.

FIG. 7 shows a portion from a detailed view of an exemplary stock customer information policy of an implementation of the present teachings.

FIG. 8 shows exemplary controls associated with the policy of FIG. 7.

Figure 10A:
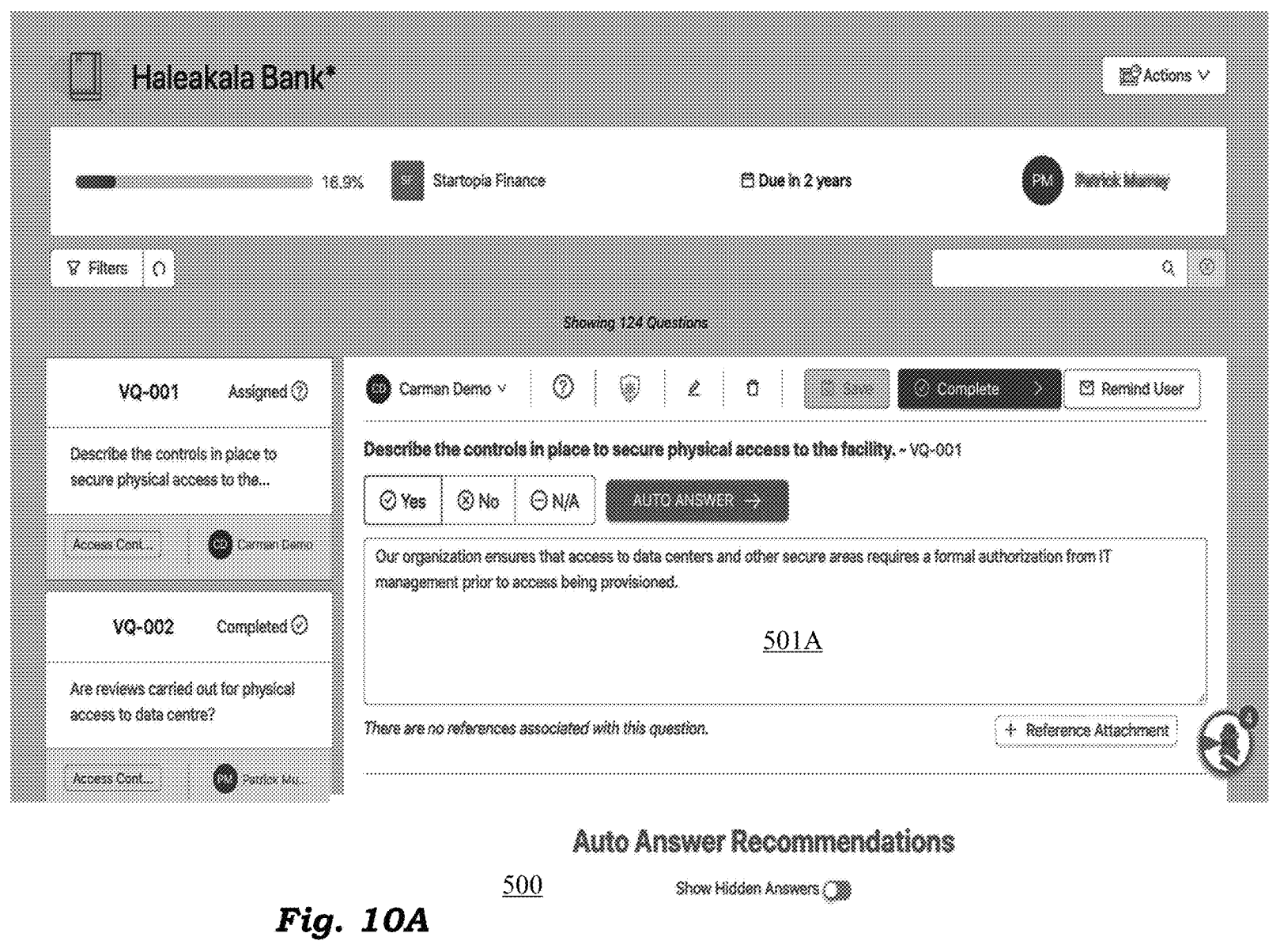

FIG. 10A-D present successive screen portions from top to bottom of a screen from an exemplary GUI/web-interface/portal, illustrating the usage-tracking functionality for generating an SQR.

FIG. 11 shows the Usage tab of an exemplary GUI/web-interface/portal, for Physical and Environmental Security policy.

Figure 12B:

FIG. 12A-B show a top portion and a bottom portion of a screen displaying a list of control entities from a GUI/web-interface/portal of a specific implementation of the usage-tracking embodiments.

Figure 13B:
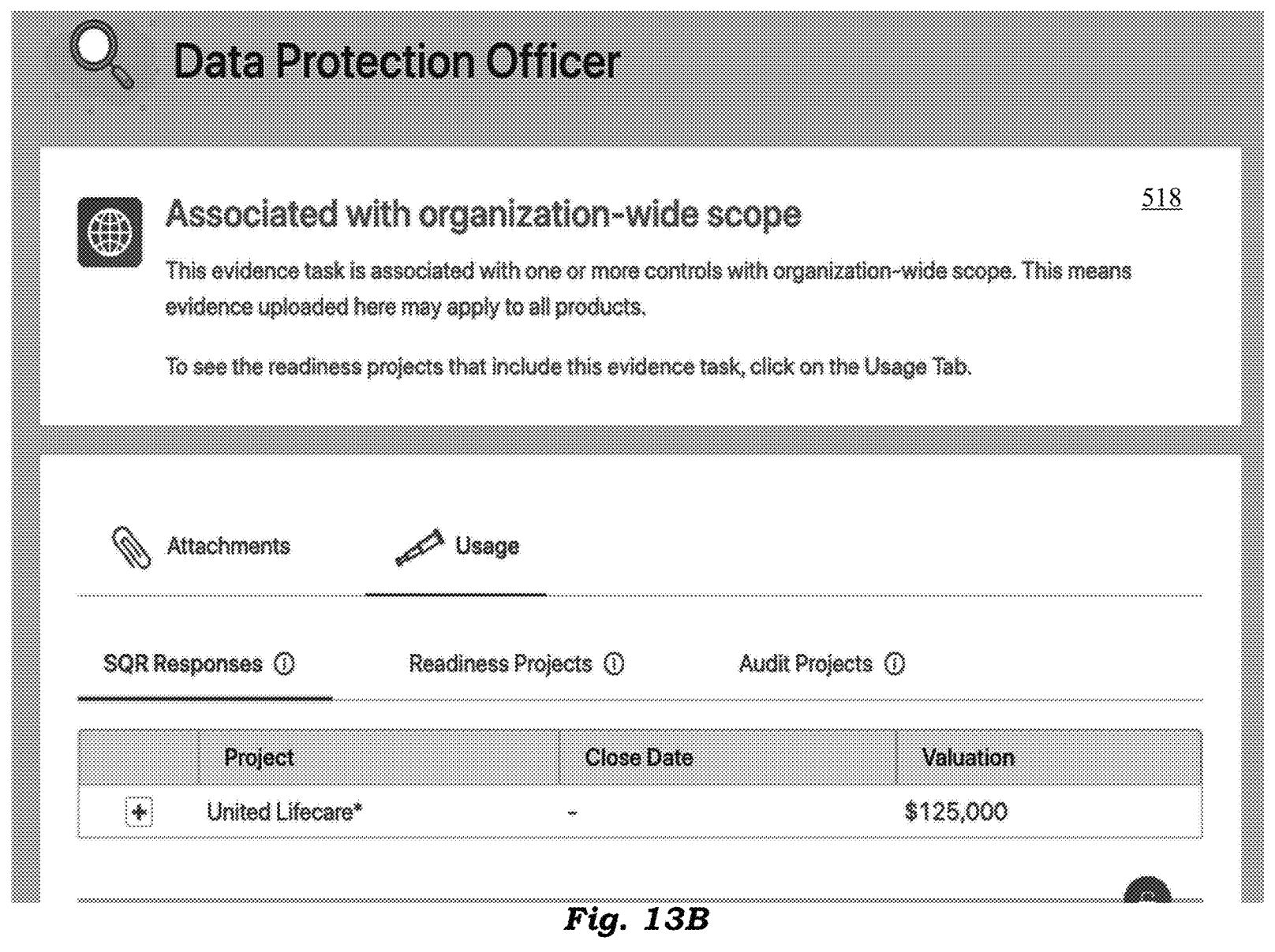

FIG. 13A-B provide screen portions illustrating the usage-tracking functionality showing a control used in a policy and the associated evidence task to prove the implementation of the control.

Figure 14:
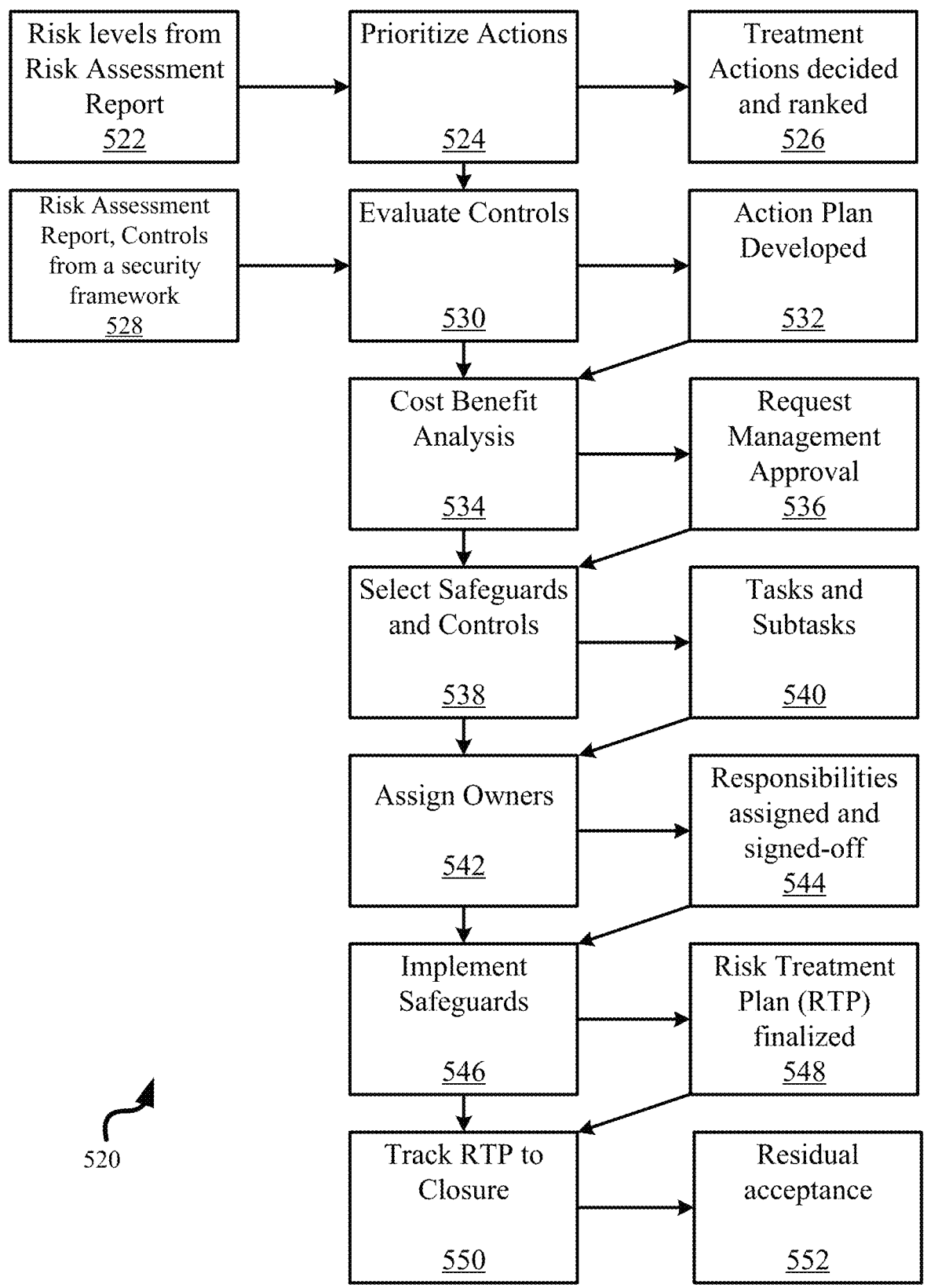

FIG. 14 a risk-management flowchart based on the present principles.

FIG. 15A shows a top screen portion of a screen from a GUI/web-interface/portal of an implementation showing the Risk, Risk Treatment and the Residual Risk level for a control.

Figure 15B:
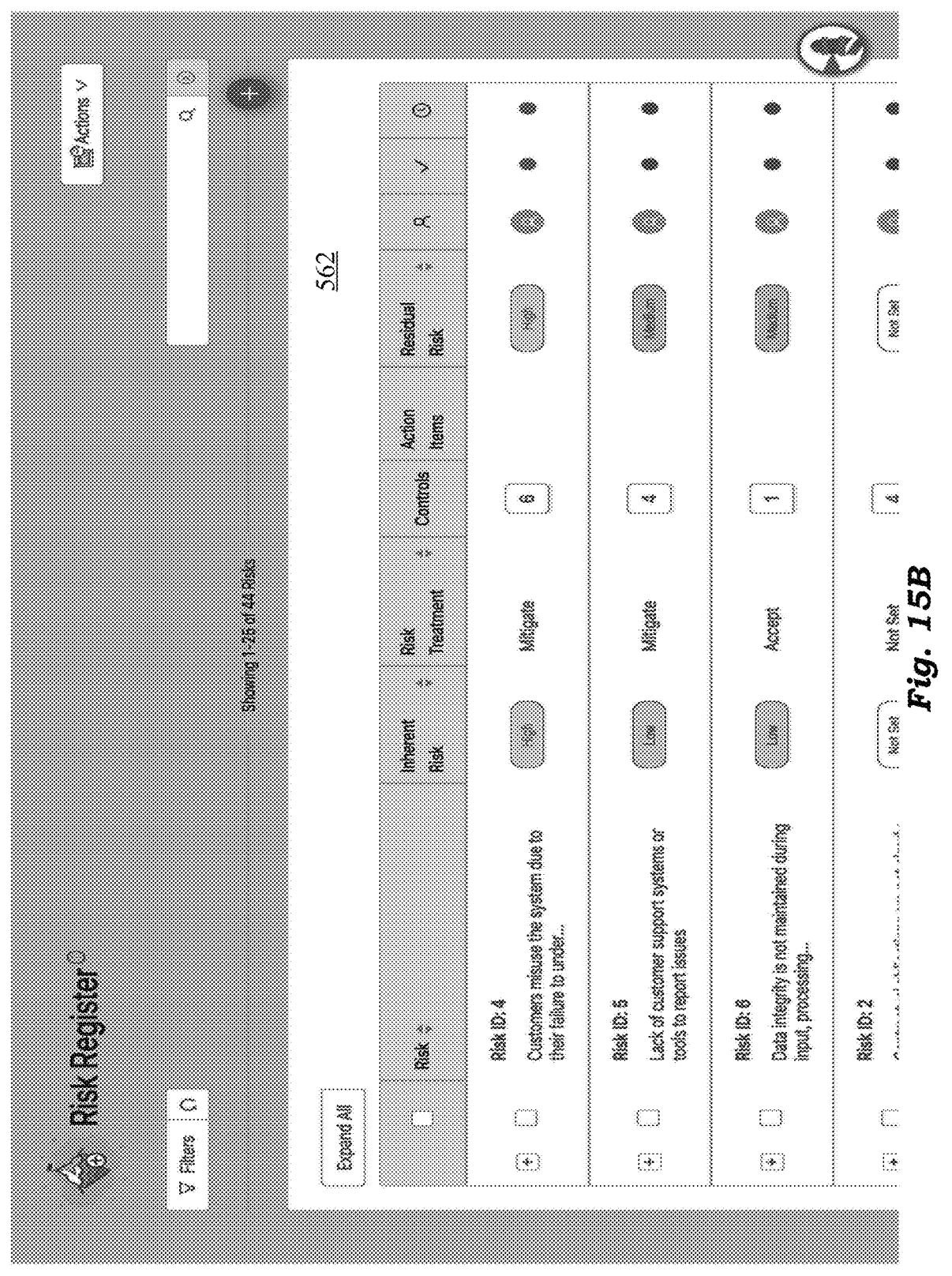

FIG. 15B shows the Risk Register of tenant/organization containing the bottom portion of the screen portion of FIG. 15A.

FIG. 16A-B show top and bottom portions from a screen of a GUI/web-interface/portal of an exemplary implementation of the usage-tracking embodiments showing the creation of a readiness project.

FIG. 17A-C demonstrate the usage-tracking functionality for the various readiness projects defined for an organization.

FIG. 18A-E present the progress dials, lists of policies, controls and evidence tasks as well as compliance calendar functionalities of the readiness project dashboard or simply readiness dashboard.

FIG. 19A-C present successive screen portions from top to bottom of a risk identification survey.

Figure 20A:
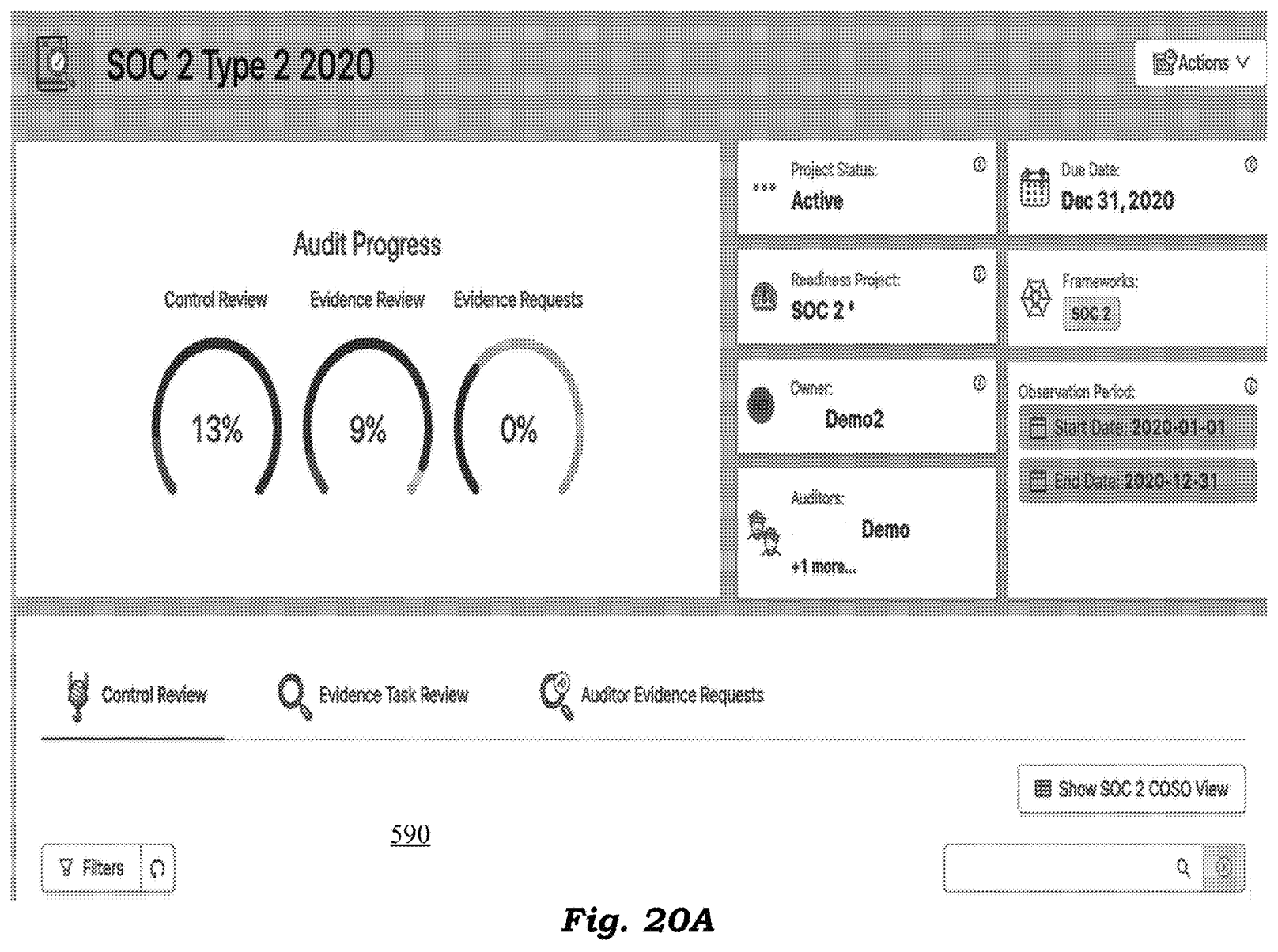

FIG. 20A-C present the progress dials, lists of controls and status of evidence tasks of the audit project dashboard or simply an audit dashboard of the present design.

Figure 21A:

FIG. 21A-B illustrate the InfoSec program document generation capability of the present technology.

FIG. 22A-G illustrate the multi-product functionality of the present design.

Figure 23:
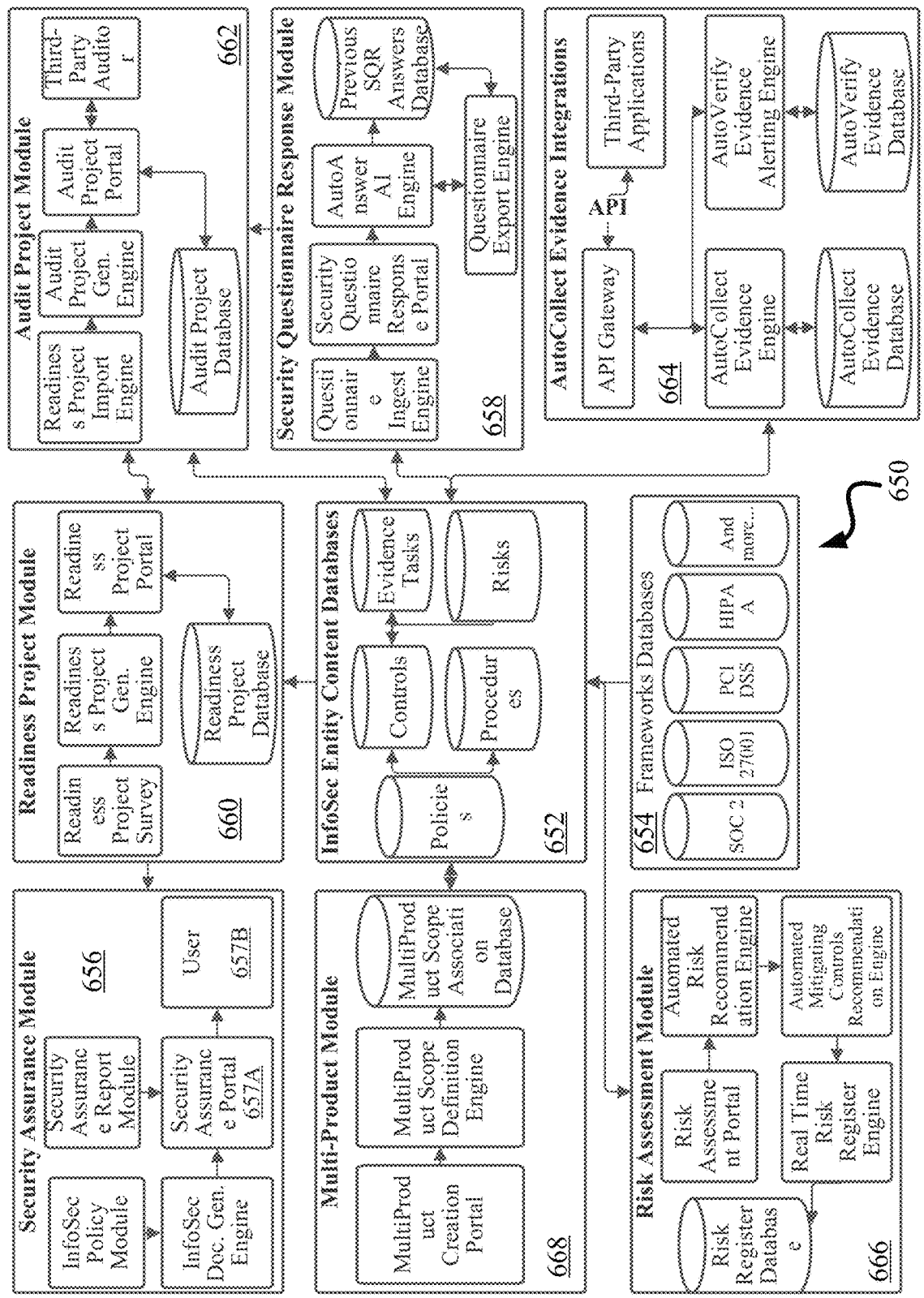

FIG. 23 presents an architectural block diagram of the present design.

Figure 24:
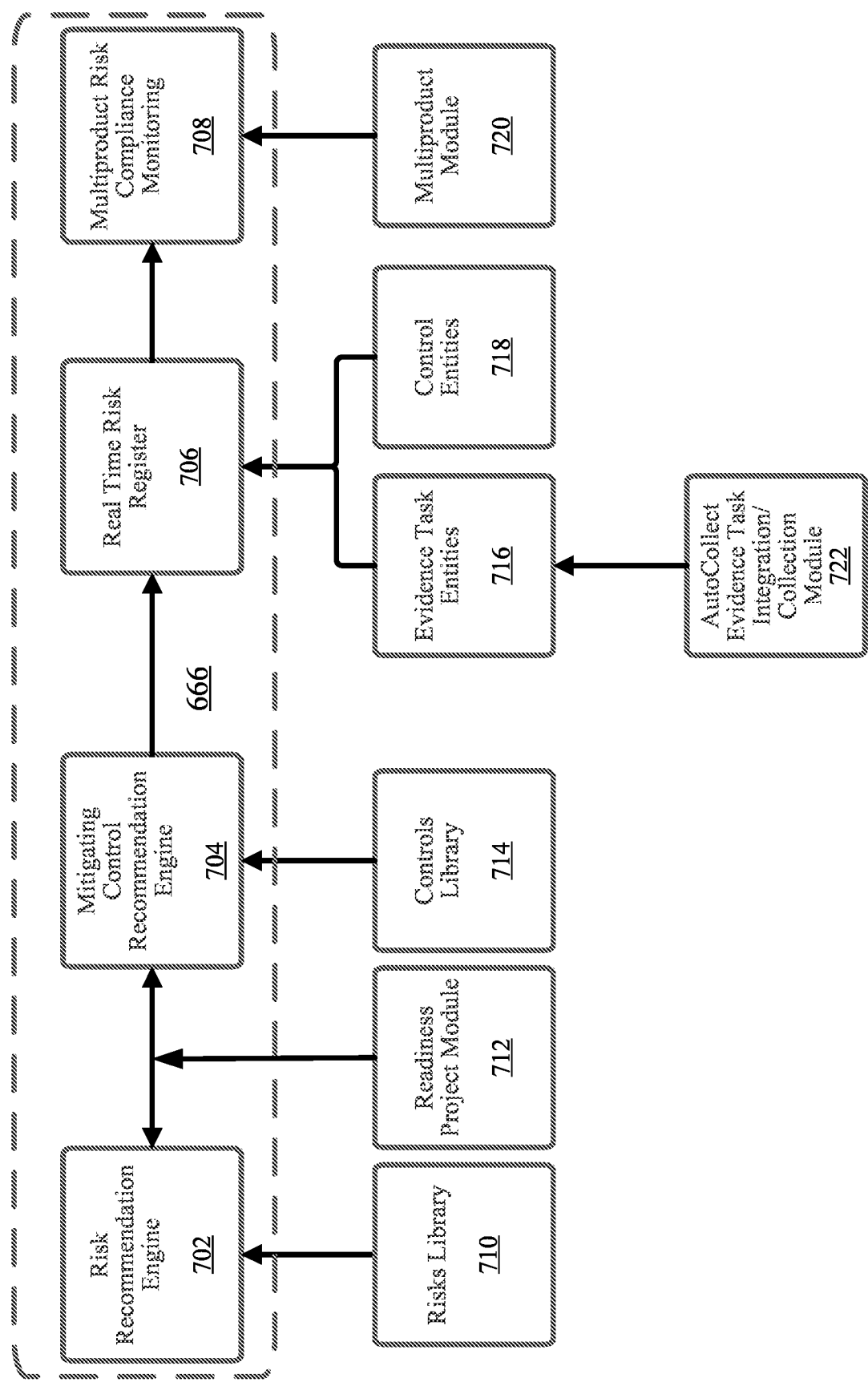

FIG. 24 shows real-time risk assessment module 666 from FIG. 23 along with other modules that it works in conjunction with.

Figure 25:
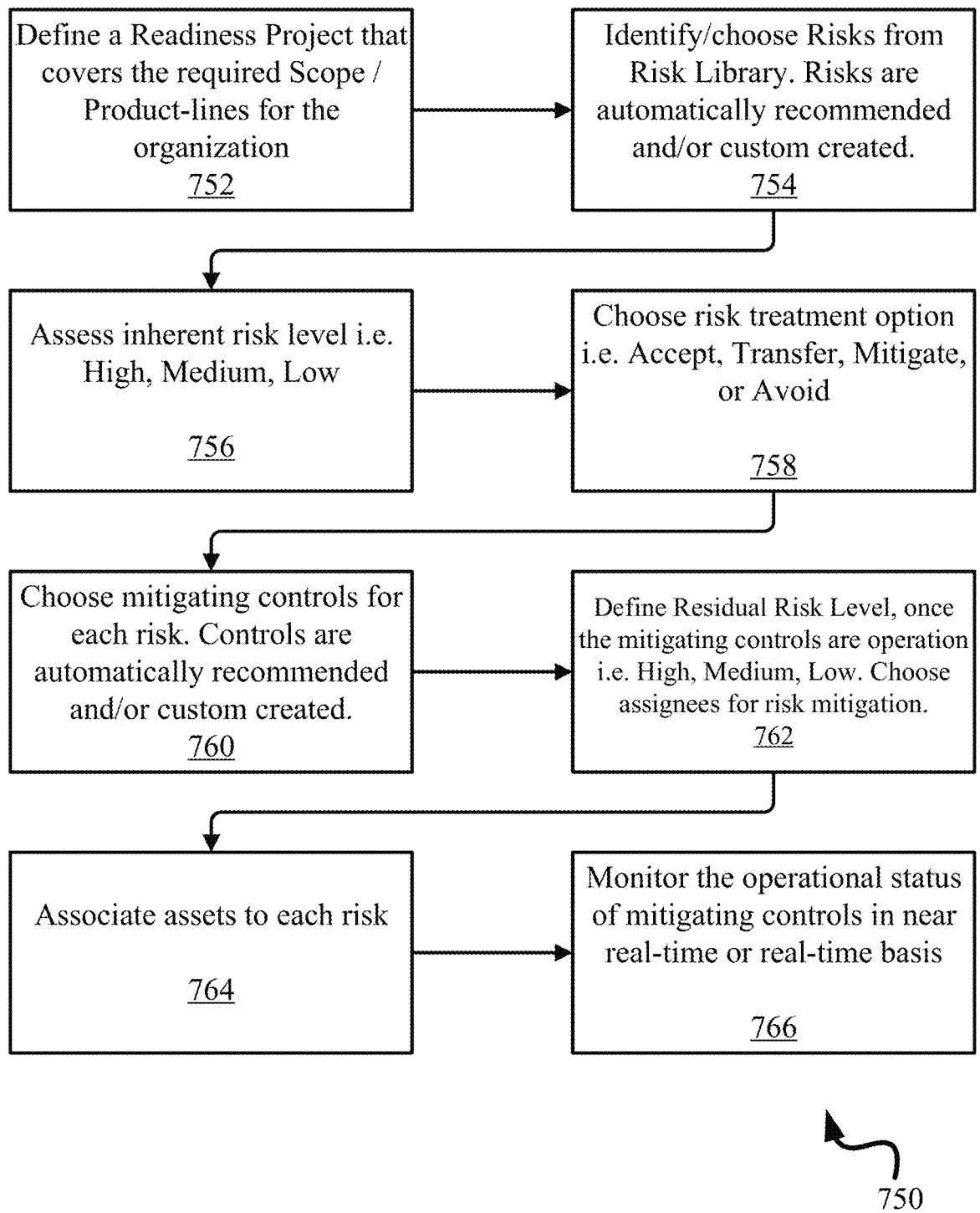

FIG. 25 shows a detailed flow diagram or a flowchart of the various steps carried out by an instant risk assessment module in conjunction with other modules for automating risk assessment.

Figure 26:
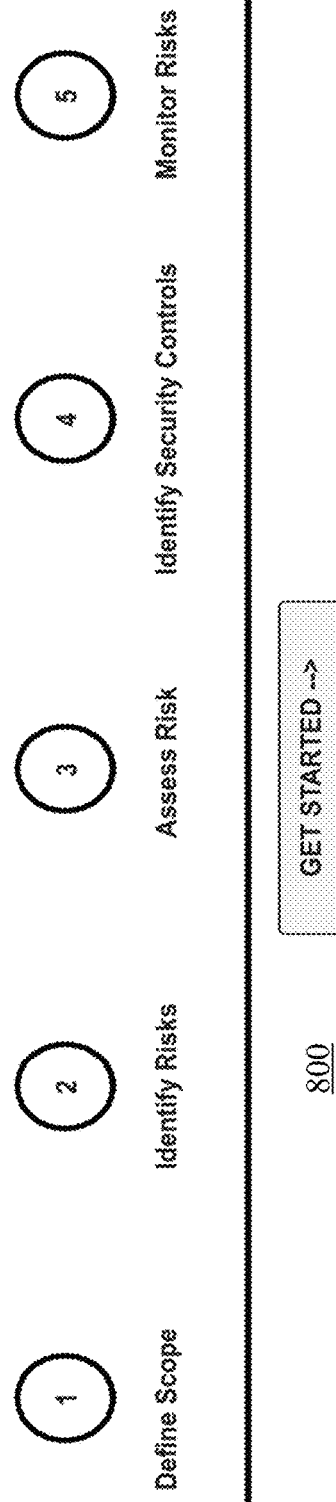

FIG. 26 shows a screen mockup or a screenshot or a screen of the first screen shown to the user outlining the various steps required for risk assessment.

FIG. 27 shows the screen for creating a readiness project with the desired scope as a first step for performing risk assessment.

FIG. 28 shows the capabilities of an instant risk recommendation engine that recommends risks to the tenant in a risk identification survey, and based on the readiness project(s) defined above.

Figure 29:
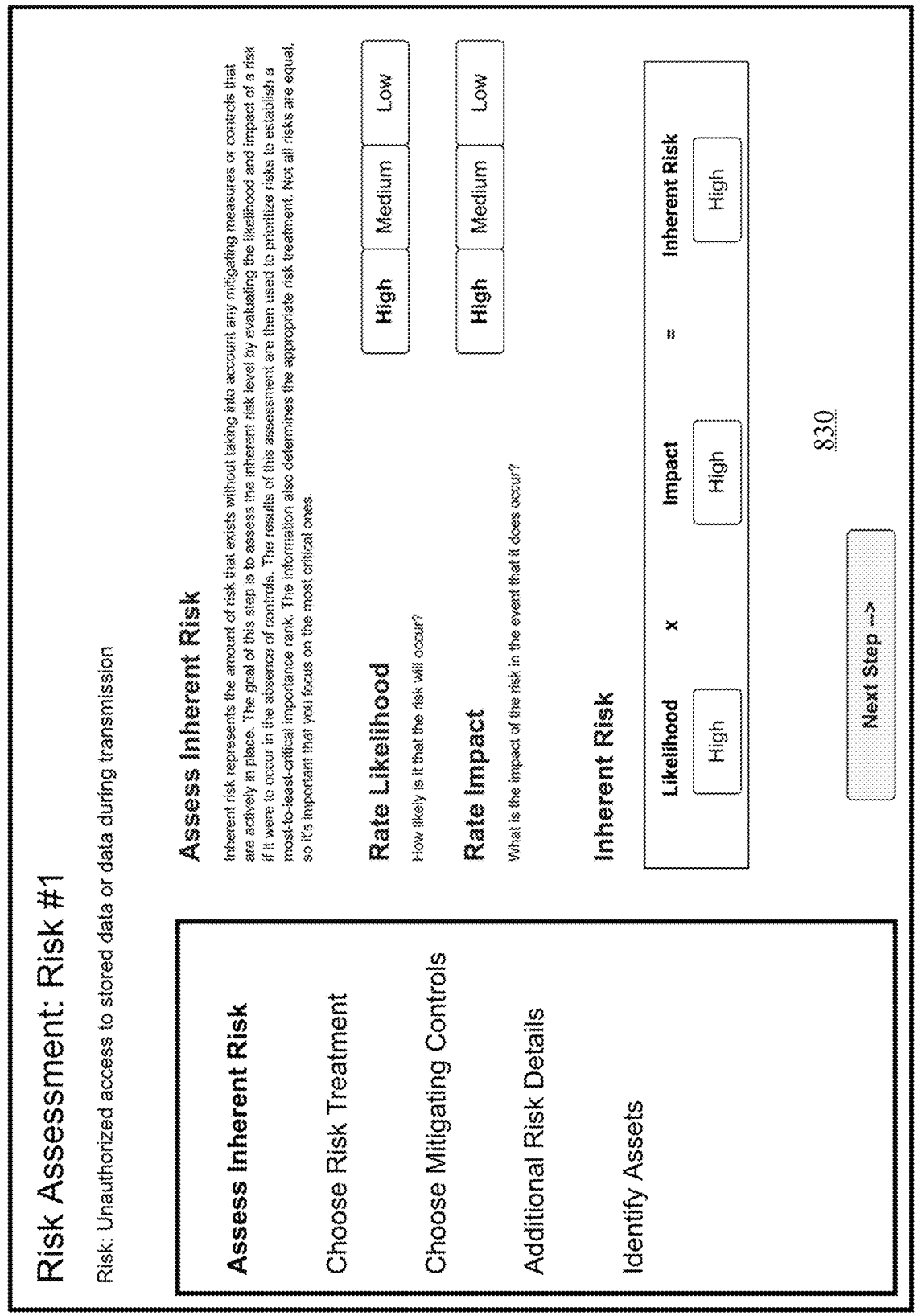

FIG. 29 shows the screen used by the tenant for assessing an inherent risk.

Figure 30:
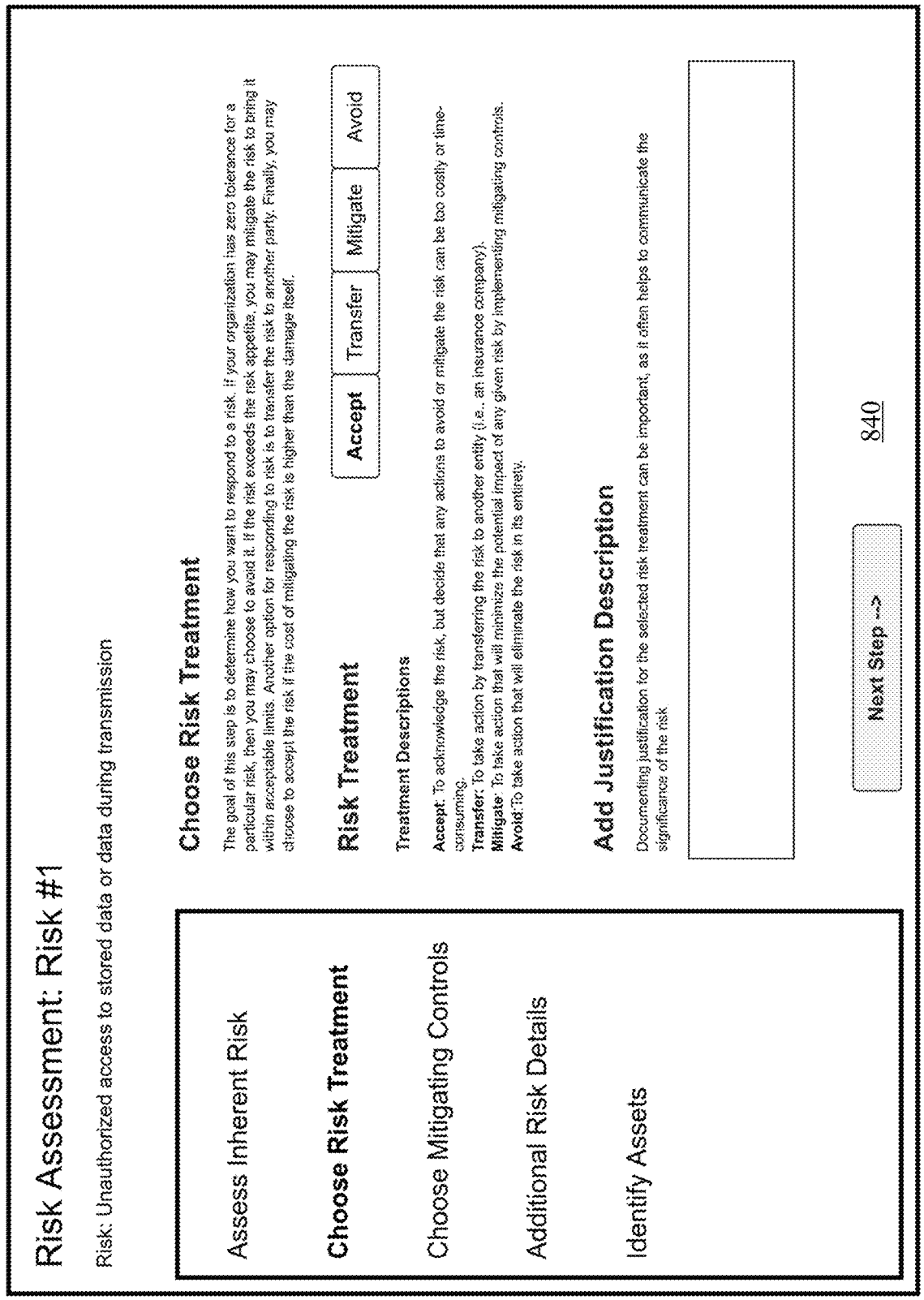

FIG. 30 shows the screen used by the tenant for choosing a treatment plan for a risk.

FIG. 31 shows the screen used by the tenant for choosing mitigating controls for a risk.

FIG. 32 shows the screen used by the tenant for providing additional details about a risk, including owner, due date, etc.

FIG. 33 shows the screen used by the tenant to identify assets impacted by a risk.

FIG. 34 shows the summary screen of an instant real-time/near real-time risk register.

FIG. 35A shows the summary screen of an instant real-time/near real-time risk register with another example containing a control that is not operational.

FIG. 35B shows an informational message for the user once he/she clicks a row on the summary page for a control that is not operational in the example of FIG. 35.

DETAILED DESCRIPTION

The drawing figures and the following description relate to preferred embodiments of the present invention by way of illustration only. It should be noted that from the following discussion many alternative embodiments of the methods and systems disclosed herein will be readily recognized as viable options. These may be employed without straying from the principles of the claimed invention. Likewise, the figures depict embodiments of the present invention for purposes of illustration only.

RFP/RFI Management

Figure 1:
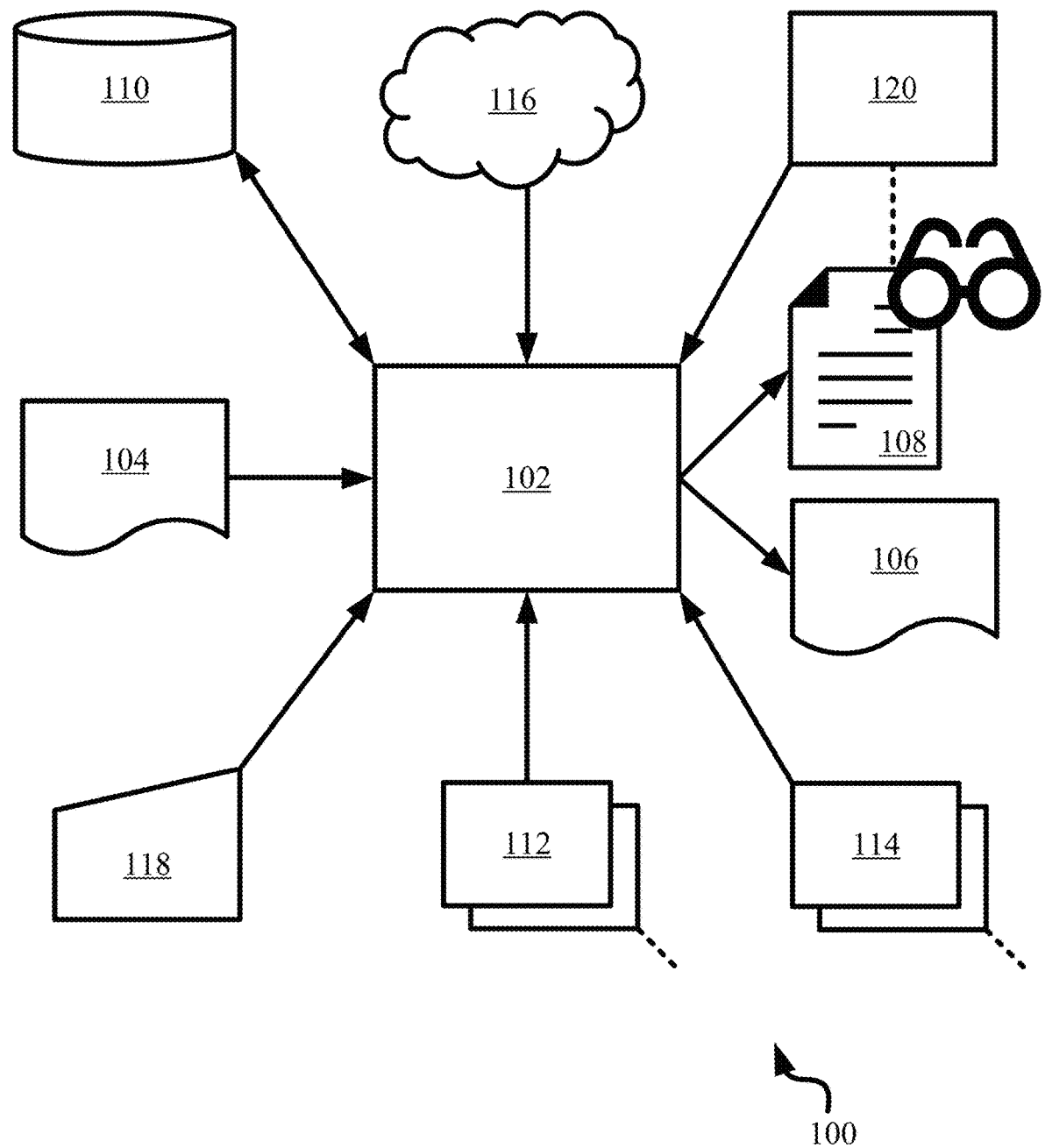
FIG. 1 illustrates a block diagram of the main embodiments of the IT compliance and request for proposal (RFP) management system of the present design.

The methods and systems described herein will be best appreciated by reviewing an RFP/RFI management and IT compliance system or platform 100 as illustrated in FIG. 1. For the purposes of this disclosure, we will collectively refer to an RFP and an RFI as just an RFP to avoid unnecessary repetition but with the implicit knowledge that the present techniques apply to automating/streamlining the process of responding to either. Security assurance system or platform 100 is most typically deployed as a multi-tenant software as a service (SaaS) web-application. Various customer organizations or tenants are then onboarded to system 100. The system is hosted and operated by a third-party in a cloud or a hosted platform using techniques known in the art. Organizations that are onboarded to system or platform 100 shown in FIG. 1 accrue the benefits of the various techniques described herein.

RFP management and IT compliance system or platform 100 of FIG. 1 shows a new request for proposal (RFP) document or questionnaire 104 to which a customer organization or simply an organization is in the process of responding. RFP 104 contains questions or requests for responses of security and/or privacy nature among potentially other types of questions. These questions related to IT security and/or privacy domains are provided to an artificial intelligence (AI) and insights engine 102 that is used by system 100 to respond to RFP 104 in a semi-automatic/ automated or a fully automatic/automated manner. As a result of the automation afforded by system 100 according to the techniques described herein, a completed RFP 106 is obtained for the organization.

System 100 also has a real-time security and compliance monitoring module or simply monitoring module 120. Working in conjunction with insights engine 102, monitoring module 120 monitors the security posture of the organization and determines any gaps or risks. Module 120 further monitors the compliance of the organization against security frameworks/standards and provides results 108 to the organization of its analysis containing the observed risks/gaps as well as recommendations and feedback on overcoming the same. As noted, that in its most preferred embodiment, security assurance system or platform 100 is implemented as a multi-tenant SaaS web-application on which various organizations or customers are onboarded to accrue its benefits. In alternative embodiments, system 100 may be deployed in-house. In further embodiments, monitoring module 120 may be subsumed in AI and insights engine 102 itself.

In order to provide for automatically or semi-automatically answering the questions of new RFP 104 to produce a completed RFP 106 and to provide results 108 of its compliance monitoring of the organization, system 100 makes use of a variety of data sources. These are provided as inputs to AI and insights engine 102 and which as noted, works in conjunction with monitoring module 120. These data sources or inputs include:

1. Prior RFPs. A corpus or collection 112 of prior RFP documents that the organization has previously responded to. AI and insights engine 102 takes advantage of similar or relevant questions previously answered by the organization in responding to other RFPs.
2. Stock policies. A corpus or collection 114 of internal or "stock" policies that are available to the organization in system 100. These stock policies may already have been implemented by the organization or are in the process of being implemented or are otherwise assigned to an owner/user/admin in an organization to be implemented or still otherwise deemed to be applicable to the organization. System 100 allows users of the organization with appropriate privileges to import, draft and/or edit these stock policies for the organization as well as record the implementation of their controls.
3. External resources. A corpus or collection 116 of resources obtained from external sources by the organization. Sources comprising corpus 116 include relevant security/privacy regulations, standards/frameworks or policies available on the internet. These also include policy documents on a peer or partner network and available to the organization under an appropriate agreement with the peer/partner. In a hosted or software as a service (SaaS) implementation of the present design, peers of the organizations may be other organizations or tenants onboarded to system 100 and which have access to their own instance of the multi-tenant SaaS system shown in FIG. 1.
4. Admin-inputs. System 100 further uses inputs 118 entered by an administrator user of the organization. Administrator inputs 118 include specific controls entered by the admin for the organization as well as any other security/privacy resources/documents that the administrator may have deemed relevant to the organization.

The above inputs or data sources of system 100 are preferably tagged and classified according to the teachings described herein and stored in database 110. Note that database 110 is only shown connected to AI and insights engine 102 for clarity of illustration in FIG. 1. It is understood that all elements shown in FIG. 1 will take advantage of database 110, however not all connections between the elements and database 110 are explicitly shown in FIG. 1 for clarity of illustration.

After having reviewed the high-level working of RFP management and IT compliance system 100 illustrated in FIG. 1, let us now look at its functionality in much more detail. According to the instant design, RFP/questionnaire 104 of FIG. 1 may be a document that contains a variety of different questions or items related to a variety of different aspects of the organization's business. Some of those questions may be related to IT security, privacy, risk and compliance posture of the organization. Although, it is questions of these type that are the focus of the auto-answer capability of the preferred embodiment, in other embodiments the below teachings apply to answering questions related to other aspects of the organization as well. The auto-answering techniques will be taught in detail further below.

As already noted, the other key aspect of the present design is the ability to monitor the risk and compliance posture of the organization viz-a-viz a set of policy or standards requirements. As a result of this monitoring, system 100, and specifically its monitoring module 120 provides its observations of security gaps/risks 108 and recommendations to the organization on how to improve its security and/or privacy posture. It may further inform the organization what material benefits will accrue as a result of its compliance.

The collections of documents or corpuses 112, 114 and 116 as well as admin-inputs 118 may come in a variety of formats, including but not limited to Microsoft Word, Microsoft Excel, portable document format (PDF), WordPerfect, etc. All these documents are stored in database 110 in a standardized and normalized database schema. The database schema comprises various tables in which specific privacy/security controls related to these documents are stored.

For example, a table for controls related to password security stores items from the various documents related to password security. These items may be questions, requirements or recommendations related exemplarily to password security. The items are stored in their textual form while database 110 further stores the original documents which the items are associated with. An appropriate database schema construct such as a foreign key ensures the relationship of the items to their respective original documents. Advantageously, any information related to the formatting of the items in their respective documents may also be stored in the same table or appropriately elsewhere in database 110. In a similar manner, there may be a table for controls related to email retention, or for controls related to acceptable use of computer equipment, equipment disposal, etc. In the preferred embodiments, all controls exist in the same table with appropriately defined identifiers and categories to properly facilitate their usage in the system.

Thus, each document of the above-mentioned data sources of system 100 is decomposed into its constituent items which may be requirements/questions/recommendations/controls and stored in respective tables in database 110. We will sometimes refer to such a collection of tables containing the texts of the individual items of the documents as the working copy of the document. As mentioned that alongside the working copy, the original document is also stored in its unaltered form in database 110.

Before storing the items into the tables, system 100 may preprocesses the texts of the items to perform any necessary cleanup and text normalization. The choice of such preprocessing steps may depend on the requirements of a specific embodiment. More specifically, preprocessing includes one or more of the following steps:

1. Spelling and/or punctuation corrections. Before the contents of the items of the documents is stored, it is processed through a spelling and/or punctuation correction algorithm available in the art to ensure its downstream readability.
2. Stemming and/or lemmatization of the texts of the documents. Those skilled in the art will appreciate that stemming is the process of reducing inflected (or sometimes derived) words to their word stem, base or root form, while lemmatization further accounts for the proper part of speech in the above process to arrive at the lemma of a word. There are a number of algorithms available in the art for stemming and lemmatization that may be used for this purpose. A non-exhaustive list of such algorithms includes Lovins, Porter, Paice/Husk, Dawson, N-Gram, Hidden Markov Model (HMM) and Yet Another Suffix Stripper (YASS) algorithms. These stems/bases/roots/lemmas of the words are stored separately as metadata in the same tables as the items or in separate metadata table(s) of database 110.
3. Removal of stop words. Familiar stop words, such as "the", "is", "at", "which", "on", etc. are also removed from the texts of the items. However, other common words that can be useful in detecting requests or questions such as "please" or "system" are preserved.
4. Tokenization and computation of TFIDF. The documents are also tokenized and the term frequency-inverse document frequency (TFIDF or tf-idf) of each term/token is computed using techniques known in the art. Those skilled in the art will appreciate that TFIDF is a numerical statistic of informational retrieval that reflects how important a word is to a document in a collection or corpus. The TFIDF for each term is also stored as metadata in the same tables as the items or in separate metadata table(s) of database 110.
5. Named Entity Recognition (NER). The documents are also processed with one or more available NER algorithms to extract named entities and/or keywords which are also stored in the metadata. The process extracts predefined categories from the texts, such as the names of persons, organizations, locations, expressions of times, quantities, monetary values, percentages, etc. Available algorithms/techniques in the art that may be used for this purpose include Hidden Markov Models (HMM), conditional random field (CRF), Recurrent Neural Networks (RNNs), and the like. Alternatively, or in addition, natural language processing (NLP) techniques are also employed for this purpose.

Furthermore, weights are assigned to the extracted named entities based on their frequency. The less frequent the term is in all the documents, the more is its weight and vice-versa. This is to normalize the named entities or terms appearing very frequently across multiple corpuses of documents with less weight, with terms appearing less frequently across multiple corpuses with more weights. In one embodiment, weights may thus be assigned using a negative linear relationship. Preferably, a curated list of common but low-meaning security words/terms is also used in order to deweight/under-weight less useful terms for improved matching.

There may be other preprocessing steps required for a given implementation not included in the above list but within the scope of the main principles being taught. Thus, after preprocessing, the documents are stored in the form of their constituent items stored in various tables of database 110. The precise techniques for decomposing the above documents into their constituent actionable items will be described further below in reference to RFP auto-answering capability of the present design.

Figure 2:
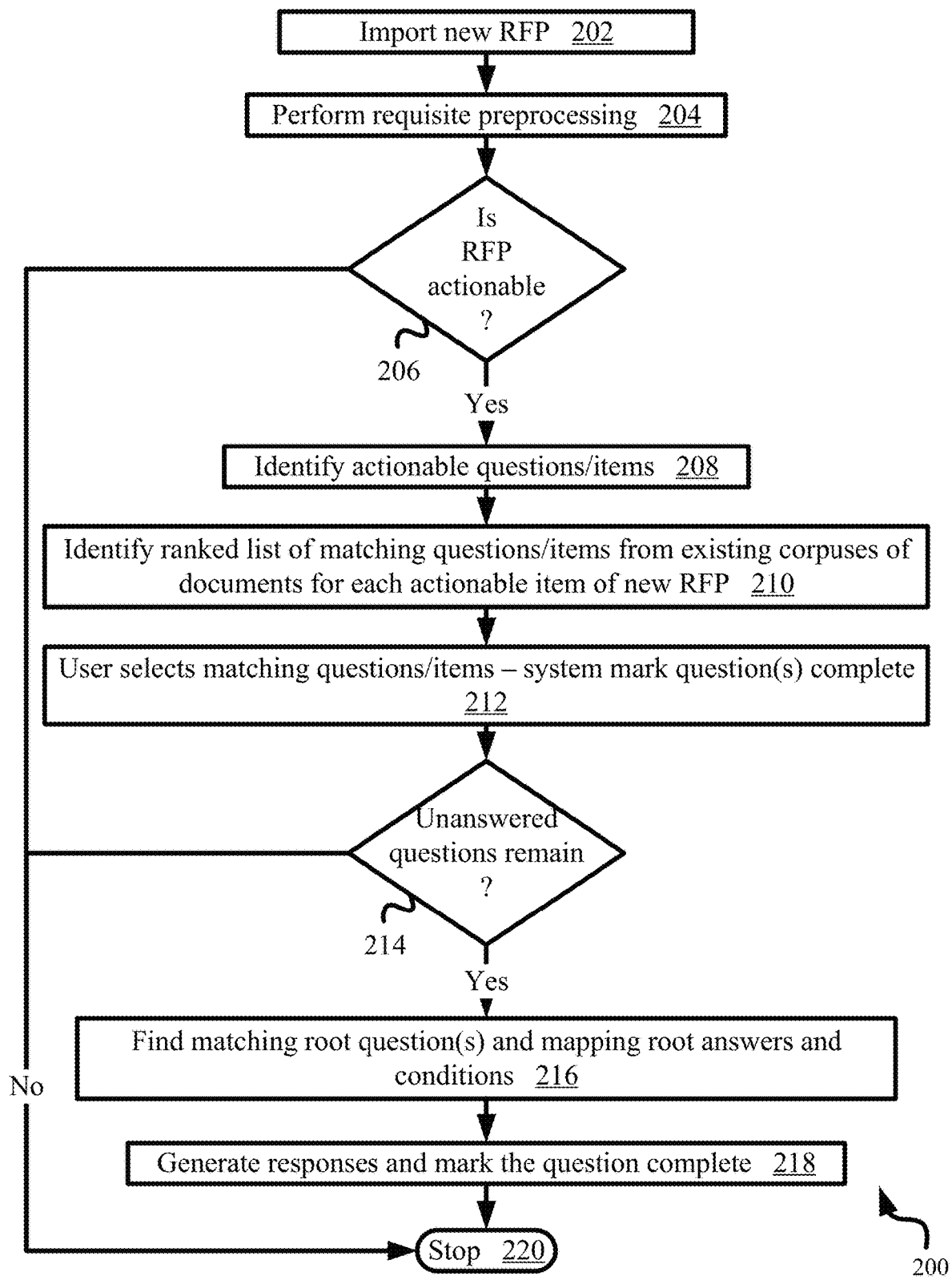
FIG. 2 shows the steps performed by the system of FIG. 1 in a flowchart form in order to achieve its objectives.

RFP Auto-Answering:

For understanding the RFP auto-answering functionality/capability of the present design in detail, let us take advantage of flowchart 200 illustrated in FIG. 2.

New RFP/questionnaire 104 that the organization is responding to, is imported/ingested into system 100 using techniques known in the art. This step is shown by block 202. Then, the RFP is preprocessed using a suitable combination of above preprocessing steps (1) through (5) as required for an implementation. This preprocessing is indicated by block 204.

Next, a determination is made whether RFP 104 is actionable or not. This is because at times a document that appears to be an RFP may actually not be an RFP or not have any actionable items. For example, an RFP in an Excel format may contain several worksheets one of which is just ancillary details about the RFP. If the worksheets are imported as separate documents into system 100, then one worksheet may not be actionable at all. Similarly, a document may apparently look like an RFP and may even be named as such, but without containing any actionable questions or items or requests. Thus, it is advantageous to make a determination whether the overall document is actionable or not. This is indicated by decision diamond 206 in FIG. 2.

The above determination is done algorithmically by AI and insights engine 102 as a classification problem using an appropriate machine learning classification algorithm such as support vector machine (SVM). For this purpose, existing documents are labeled by one or more human experts classifying them actionable or non-actionable. The labelled documents are then provided as training data to SVM. Based on this approach, if new RFP 104 is determined to be actionable or answerable then processing continues to the next steps of flowchart 200, otherwise no further action is taken as shown by terminal oval 220.

Next, the individual items in RFP 104 that need action are identified. This is indicated by block 208 in FIG. 2 and accomplished as follows:

1. First, RFP document 104 is decomposed into its constituent sentences. For well-formed sentences, this is a matter of scanning for a period "." to determine the start of a sentence. If there is poor grammar or missing punctuations marks, then system 100 applies AI and insights engine 102 to the task by first scanning for patterns in sentence structures to determine queues for when a sentence begins or ends. This is done by creating training data with poorly formed sentences containing relevant patterns and sentence structures as inputs, and the beginning and ending of sentences as outputs. The training/labelled data is then provided to an appropriate classification algorithm such as SVM.

2. Once RFP document 104 has been decomposed into individual sentences per above, each sentence is scanned to determine if it is actionable or is a question. For this purpose, the detection of certain keywords and punctuations at certain locations in the sentence or in a paragraph can be enough to identify the sentence as an action item or a question or a request or a recommendation. For instance, the word "Please", "Provide", "What", "Did you", or "Do you" at the beginning of a sentence can indicate a request for a response. Punctuations marks, such as a question mark or colon at the end of a sentence, can also identify a question.

Additionally, the formatting of original document 104 is also used to assist in identifying actionable items by looking for requisite structural features in the document. Such structural features include the font of the text in the item sentence(s), such as italics, the size of the font, etc. Such structural features further include the background color of the cell of the table containing the item, or the background color of the spreadsheet cell containing the item, if RFP document 104 is in a spreadsheet form.

Furthermore, machine-learning is also employed to determine/classify actionable items in new RFP 104. As per earlier teachings, the machine learning algorithms are supplied with labeled training data, where the labels are performed by humans. A practical approach employs a human or a group of humans to label those terms or sentences that indicate a question or an actionable item. Multiple humans are preferred in order to increase accuracy and efficacy of labelled data.

There are a number of such machine learning algorithms that may be used for the above classification. For this approach, the sentences are first converted into n-grams, with n being the number of words. Values of n up to 5 (n=1, n=2, n=3, n=4, n=5) are used. Then, the choice machine learning classification algorithms includes Naive Bayes, k-nearest neighbors (kNN) and SVM for classification. The feature vectors for an SVM algorithm include lexical features, such as word count or average word length, syntactic features, such as if or not there is an occurrence of a particular punctuation, and structural features, such as the number of paragraphs or lines. Furthermore, deep-learning models, such as Deep Structured Semantic Model (DSSM), can also be used for classification of actionable items, preferably after a collection of 10,000 or more labeled data.

As noted, the above process for detection of actionable questions/items in new RFP 104 is also carried out on all existing documents related to data sources 112, 114, 116 and 118 of FIG. 1, as they get ingested into database 110 overtime. Thus, each document is decomposed into its constituent actionable items which are then stored in tables in database 110 per above explanation.

The actionable items in RFP 104 identified above are then automatically answered according to the teachings described below. Specifically, the answers to these actionable items can come from various sources. These are provided as options via an appropriate mechanism, such as a drop-down menu, of a graphical user interface (GUI) to the user of system 100. The GUI is developed using techniques known in the art which are not delved into detail to avoid detraction from the main principles being taught.

Specifically, the GUI presents each actionable item of new RFP 104 being answered to the user. Below the surface, system 100 employing AI and insights engine 102 searches all the documents in database 110 for possible matches to the items being responded to. This aspect is shown by block 210 of flowchart 200. As taught above, database 110 contains a corpus 112 of prior RFP documents answered by the organization, a corpus 114 of existing stock policies, a corpus 116 of externally sourced documents and a collection 118 of manually inputted documents or controls by an administrator.

After having identified above documents in database 110 with matching items to the question/item of new RFP 104 being responded to, the matching items from the documents are presented to the user. More than one matching items are presented as a list of matches in ranked order of matching/similarity. The matching items presented are selected from the following data sources in order:

1. Corpus 114 of existing stock policies of FIG. 1. If one of these policies with its corresponding matching item is selected by the user via the GUI, then the RFP question/item is marked complete. This is done by incorporating the selected control of the stock policy as the response to the RFP question. Otherwise, the system continues to the following steps.

2. Corpus 112 of previously answered RFPs. If one of these RFPs with its corresponding matching question/item is selected by the user via the GUI, then the RFP question/item is marked complete. In a similar manner as before, this is done by incorporating the answer to the selected question of the prior RFP as the response to the present RFP question. Otherwise, the system continues to the following steps.

In a highly preferred embodiment, corpus 112 of FIG. 1 is extended to include all prior RFP documents that peer organizations of the organization in question have responded to. Thus, in this embodiment, corpus 112 contains RFP documents that all tenants/peers on system/platform 100, including the organization in question, have previously responded to. The list of above-explained matching items presented to the user thus includes the matching questions/items from the peer organizations also. These matching peer items are presented to the user in an anonymized manner.

Preferably, the system weights the matching peer items by the number of peers that have responded to the item/question, or a similar item/question based on present teachings of similarity, by a given answer. Then, as a matching peer item/question is presented to the user in the GUI, the system further shows to the user that "5 of your peer organizations have answered this question as follows . . . ". This gives the user additional insights of the industry-wide acceptability/popularity of a given answer for a specific RFP question.

Alternatively, the weighting is done based on financial or marketing or another value metric ascribed to the RFP, or still using other approaches. Still alternatively, the weighting of the peer item is done based on whether the answer by the peer to the matching/similar peer item/question resulted in a successful RFP. In a similar manner as before, the RFP question is marked complete by incorporating the answer to the selected question of the prior peer RFP as the response to the present RFP question.

3. One of IT security/privacy policies from a peer organization per above teachings. Such policies comprise corpus 116 of externally sourced documents as also taught above. Note, that if a matching peer item has been selected for the response to the RFP question per above, then it may not be necessary to use a peer policy. However, if one of such peer policies is selected, then the system recommends updating an existing policy of the organization if necessary or offers creating a new policy with the controls required to gain compliance with the peer policy. The peer policy is retrieved by the system in an anonymized manner so any personally identifiable information (PII) data or identifiers are masked out. Thus, the system creates a policy and controls for review. Next, the user marks the new policy as applicable and implements its controls, and the question is marked complete per above. Otherwise, the processing continues.

4. One of industry accepted security/privacy frameworks residing in corpus 116 of externally sourced documents. If selected, the system recommends updating an existing policy if necessary or creating a new policy with the controls required to gain compliance. The system creates a policy and controls for review. Next, the user marks the new policy as applicable and implements its controls, and the question is marked complete per above teachings.

5. The matching item/question may also come from corpus 118 of administrator provided inputs, controls or documents. The user may then select the matching admin-inputted control, and the question is marked complete per above teachings.

The above aspects of the selection of a matching document from corpuses 112, 114, 116 and 118 of FIG. 1 and marking the RFP item complete is shown by block 212 in flowchart 200.

However, if after having performed the above steps, any unanswered questions still remain in new RFP 104, then processing continues to the following steps of automatically generating RFP responses. This is shown by decision diamond 214 in FIG. 2. If no answered questions remain, then processing stops per terminal 220. To facilitate this, each of the questions/items of existing documents as well as the questions/items of new RFP 104 being answer are mapped to a "root question".

Root Question Analysis:

A root question has the following qualities:

It represents an enquiry about a single, human-understandable concept

It is independent of any particular phrasing

It has a unique ID that can be used for matching suitable answers

System 100 of FIG. 1 contains a library or collection of root questions in database 110. One or more questions/items of the new RFP may map to each of the root questions in database 110. The library of root questions of existing data is developed by a combination of human judgement and machine-learning clustering techniques, such as k-means clustering. Thus, the text of all existing documents is processed to find clusters of words and concepts, and the clusters with a density above a desired threshold are identified as root questions. A human expert further vets the clusters to ensure that the clusters identified indeed qualify as root questions or otherwise which clusters do.

In contrast to a root question, the many ways of asking the same root question are referred to as "literal questions". A literal question is the raw text of the individual questions/items of the existing documents as well as the actionable questions/items of the RFP with minimal preprocessing. A literal question is typically mapped onto exactly one root question, although there are special cases where the literal question is complex, long or ambiguous or it may contain multiple related questions. In such a scenario, the same literal question may reasonably map to more than one root questions.

On the other hand, many literal questions may typically map onto the same root question. The following are exemplary literal questions mapping to the same root question because they are about the same fundamental concept. Note that not all of these are necessarily phrased in a question form, although for the purposes of this disclosure we will still refer to these various phrasings as "questions".

What is your password policy?

How are strong passwords mandated by your organization?

What constitutes a strong password?

Please describe your password policy?

Password policy:

Do you have a password strength requirement? Please describe.

Thus, the first step towards answering a literal question is to map it to a root question. As noted, that typically, there will be only one matching root question. If a literal question maps to more than one matching root questions, then the system advantageously presents a list of matching root questions ranked according to similarity of the match. Thus, to answer such a literal question, answers to multiple root questions may be combined to form a more complete answer for new RFP 104.

In a similar manner, a "root answer" represents a single conceptual answer, independent of any particular phrasing or presentation. A root answer has one or more of the following qualities:

It is a Boolean value: Yes or No

It is implemented by a particular control

It related to a particular security/privacy policy

It is not relevant or Not Applicable

A root question may have multiple associated root answers however, a root answer should only be map to a single root question. Root answers also have answer conditions. Answer conditions allow the system and/or the user to filter out irrelevant root answers from the list of potential matches. Various types of answer conditions may be expressed, examples of which are given below:

Size of the organization

Industry of the organization

Locale of the organization

A particular policy that the organization has implemented

A particular policy above a given revision number that the organization has implemented A particular security control that the organization has enabled/enacted A specific awareness threshold that the organization has achieved A specific license that the organization has obtained One of the benefits to the above approach is that it allows system 100 to propose counter-factual answers to the user. For example, the system may suggest to the user that "If you enacted this policy with these controls you could answer the question of the RFP with a given industry best-practice answer". Explained further, answer conditions specify the characteristics of the organizations on system 100 along with their association with a given root answer.

When an organization wishes to use a root answer previously used by other tenants/organizations, the system can suggest how well accepted or how much of an industry accepted best practice a given root answer or specifically a given policy control or policy itself is. Furthermore, root answers have ratings of how well they are liked by the community of users belonging to various organizations onboarded on system 100 or by the frequency with which they result in a successful RFP. Of course, no PII or identifying data is released from one organization to another without anonymization/masking.

In a similar manner to a literal question, a "literal answer" is a way of expressing the root answer so that it matches the formatting or the template of its corresponding document, such as new RFP 104 of FIG. 1. For instance, if the root answer is "yes", then the literal answer can be "y" or "yes" depending on the format of the RFP.

For explanatory purposes, here is a concrete example of an excerpt from an RFP in Microsoft Excel spreadsheet form:

|     | Security | Yes | No | NA | Notes |
| --- | --- | --- | --- | --- | --- |
| 1.1 | Does your organization have a password strength requirement? Describe. | | | | |
| 1.2 | ... | | | | |

So, the literal question extracted from the spreadsheet per above explanation is "Does your organization have a password strength requirement? Describe." Armed with the above-explained concepts, the following steps are executed for auto-answering this question based on the present techniques.

1. Find matching root questions. As a first step, system 100 employing its AI and insights engine 102 finds root questions matching this literal question using similarity/matching techniques of the present design. In one embodiment, employing keywords-based matching, exemplary matching root questions thus retrieved are as provided below:

| Confidence | Root Question | Keywords |
| --- | --- | --- |
| 100% | <ID: 1 PWD STRENGTH> | "Describe", "What", "password strength", "minimum strength", "password" |
| 90% | <ID: 2 HAS PWD POLICY> | "Have", "Has", "password strength", "minimum strength", "password" |
| ... | ... | |
| 5% | <ID: 6 CLEAN DESK POLICY> | "Have", "clean desk", "desk", "removal", "clear" |

In one embodiment, matches above a predetermined threshold or confidence level are highlighted while those below are dimmed out. Thus, in the above example, the first and second rows that are underlined will be highlighted while the other rows are dimmed out in the GUI.

2. Look up the root answers. A mapping table or tables contains all the answers associated with each of the root questions. Continuing with the above example, the mapping table may be as follows:

| Root Question ID | Root Answer ID |
| --- | --- |
| <ID: 1 PWD STRENGTH> | <ID: 1 NO REQS> |
| <ID: 1 PWD STRENGTH> | <ID: 2 BASIC POLICY> |
| <ID: 1 PWD STRENGTH> | <ID: 3 TWO FACTOR> |
| <ID: 2 HAS PWD POLICY> | <ID: 8 NO PWD POLICY> |
| <ID: 2 HAS PWD POLICY> | <ID: 9 HAS PWD POLICY> |
| ... | ... |
| <ID: 6 ... > | <ID: 13 ... > |

Notice that each root question and root answer has a respective unique identifier or ID. Further, root questions that were earlier matched with acceptable confidence level and their corresponding root answers are shown underlined. In a GUI, they may be shown as highlighted per above teachings, while other rows are dimmed out.

3. Evaluate answer conditions. Next, system 100 with its AI and insights engine 102 of FIG. 1 retrieves the conditions for each of retrieved root answers and evaluates their applicability one-by-one. For the above example, the organization has implemented Policy PH-01 and enabled/enacted controls for Two Factor Authentication (TFA). The following table lists the conditions associated with the above exemplary root answers.

Notice again the underlining of the applicable root answers. First and fourth rows are not underlined because the value of their answer conditions is false/n indicating that they do not match the organization's posture of having implemented Policy PH-01 and having enabled/enacted controls for Two Factor Authentication (TFA) per present example. Note further the ratings column indicating the rating of the answer in the community of users per above explanation.

The above aspects of finding matching root questions for RFP items, the root answers that map to the root questions, and the evaluation of the answer conditions is shown by block 216 of flowchart 200 of FIG. 2.

| Root Answer ID | Conditions | Type | Value Summary | Rating | Conditions Met? |
| --- | --- | --- | --- | --- | --- |
| <ID: 1 NO REQS> | Policy PH-01 NOT implemented | Not Applicable | False n | ☆☆☆☆☆ | No |

-continued

| Root Answer ID | Conditions | Type | Value | Summary | Rating | Conditions Met? |
|---|---|---|---|---|---|---|
| <ID:2 BASIC POLICY> | Policy PH-01 implemented | Boolean | Truthy | All organization services enforce minimum password requirements. | ★★★☆☆ | Yes |
| <ID:3 TWO FACTOR> | Policy PH-01 implemented AND TFA control enabled | Boolean | Truthy | Two factor authentication in use for all employees in the organization. | ★★★★★ | Yes |
| <ID: 8 NO PWD POLICY> | Policy PH-01 NOT implemented | Boolean | Falsen | | ☆☆☆☆☆ | No |
| <ID:9 HASPWD POLICY> | Policy PH-01 implemented OR ISA control enabled | Boolean | Truthy | | ★★★☆☆ | Yes |

4. Answer phrasing. The system has thus identified three matching answers to the above-identified literal question of "Does your organization have a password strength requirement? Describe." from our new RFP 104 of FIG. 1. These are given below:

| Root Answer ID | Conditions | Type | Value | Summary | Rating | Conditions Met |
|---|---|---|---|---|---|---|
| <ID:2BASIC POLICY> | Policy PH-01 implemented | Boolean | Truthy | All organization services enforce minimum password requirements. | ★★★☆☆ | Yes |
| <ID:3TWO FACTOR> | Policy PH-01 implemented AND TFA control enabled | Boolean | Truthy | Two factor authentication in use for all employees in the organization. | ★★★★★ | Yes |
| <ID:9HAS PWDPOLICY> | Policy PH-01 implemented OR TFA control enabled | Boolean | Truthy | | ★★★☆☆ | Yes |

Based on the RFP spreadsheet, an excerpt from which was presented earlier, the system determines the presence of discrete answer value columns and a Notes column. Thus, it can express the answers to both of these questions as a Boolean value and a string of text respectively. In one embodiment, the Boolean value is the most frequent or mode of all root answer values. The answer text is a concatenation of all the summaries from the table. The result of the auto-generated response in the RFP looks as follows, and the question is marked complete by the system. This is shown by block 218 of flowchart 200.

| | Security | Yes | No | NA | Notes |
|---|---|---|---|---|---|
| 1.1 | Does your organization have | ✓ | | | All organization services enforce minimum password |

-continued

| | Security | Yes | No | NA | Notes |
|---|---|---|---|---|---|
| 1.2 | a password strength requirement? Describe? . . . | | | | requirements. Two factor authentication in use for all employees in the organization. |

To summarize, while still referring to flowchart 200, for each question/item of new RFP 104 the system finds matching items from all existing documents, which are presented to the user. For each given RFP question, a selection of an item marks the question complete. If still unanswered questions remain, the system attempts to fill in the answers to the questions based on the root question analysis presented in this section and per blocks 216 and 218. The root question analysis utilizes the present concepts of root questions, mapping root answers and answer conditions, literal questions, literal answers and associated teachings.

An alternative embodiment of system 100 of FIG. 1 of the present design executes blocks 210, 212 and blocks 216, 218 of flowchart 200 in parallel. In such an embodiment, system 100 auto-answers the RFP questions based on corpuses 112, 114, 116 and 118 per above teachings as well as root question analysis of blocks 216 and 218 provided above, in a parallel. A list of all the generated answers from both processing logics is then presented to the user corresponding to each question/item of RFP 104 for manual selection.

For completeness, the GUI of the system allows the user to manually answer/update/override any of the auto-answered responses of the teachings if required.

For matching or finding similarity of individual questions to the existing documents, specifically to their questions/items, as well as for finding matching root questions for an RFP question/item per above, system 100 and specifically its AI and insights engine 102 employs one or more of a number of techniques. One or more of these may be chosen for a given implementation, and include:

1. Cosine similarly measurement. With the texts of the documents tokenized, TFIDF of the tokens measured and stored as metadata per above teachings, engine 102 uses the familiar measure of cosine similarity to determine the similarity between two documents. Specifically, it computes cosine similarity based on TFIDF, between the current question of new RFP 104 being answered and the constituent questions/items of all the documents in database 110. If the computed similarity measure is above a predetermined threshold, for example 0.8, then the respective items are considered similar/matching, otherwise not. Such an approach may also be extended to topic modeling to determine what topics the items belong to.

2. NER-based or keywords-based similarity measurement. As another measure of similarity used by engine 102, two items are determined to be similar or not by observing the terms or named entities shared by them. Recall, that all documents are also preprocessed through a NER step and the resulting terms/keywords/named entities are stored as metadata in database 110 along with their respective weights. Now, if (number of shared named entities×respective weights of the shared named entities) between two documents, and specifically their two respective items being matched, is above a predetermined threshold, then they are considered similar/matching.

To understand this further, consider the following three items and the respective named entities extracted from or associated with them:
   a. Item-1: password, encrypted, support hours
   b. Item-2: password, encrypted, network encryption
   c. Item-3: recovery, support hours Now, item-1 and item-2 are considered similar by AI and insights engine 102 of FIG. 1, because they share multiple terms in common, such as "password" and "encrypted". However, even though item-1 and item-3 only share one term in common, it is possible that this term is less common and is given a higher weight. Thus, since item-1 and item-3 share only one term, but that term is highly weighted, item-1 and item-3 are also considered similar.

Thus, using the above NER-based similarity measurement approach, system 100 retrieves all documents from database 110 that have items similar or matching to the question of new RFP 104 being answered.

3. Machine learning based classification. Machine learning based classification techniques are also employed by AI and insights engine 102 in determining similarity between the questions of the RFP and the questions/items of existing documents. With labeled data of tagged questions/items provided by human experts per above explanation, the possible techniques for matching include Naive Bayes, k-nearest neighbors (kNN), SVM and Random Forest.

Security Gaps and Compliance Monitoring

Referring back to FIG. 1, a key capability of system 100 is auto-answering a new RFP 104 to produce completed or answered RFP 106 for security/privacy domains per above teachings. Such a capability is absent from the teachings of the prior art. The other related and highly useful functionality provided by system 100 is that of security gaps and compliance monitoring and is accrued as a result of monitoring module 120 working in conjunction with AI and insights engine 102. This functionality is also an innovative aspect of the present design and absent from the teachings of the prior art.

Figure 3:
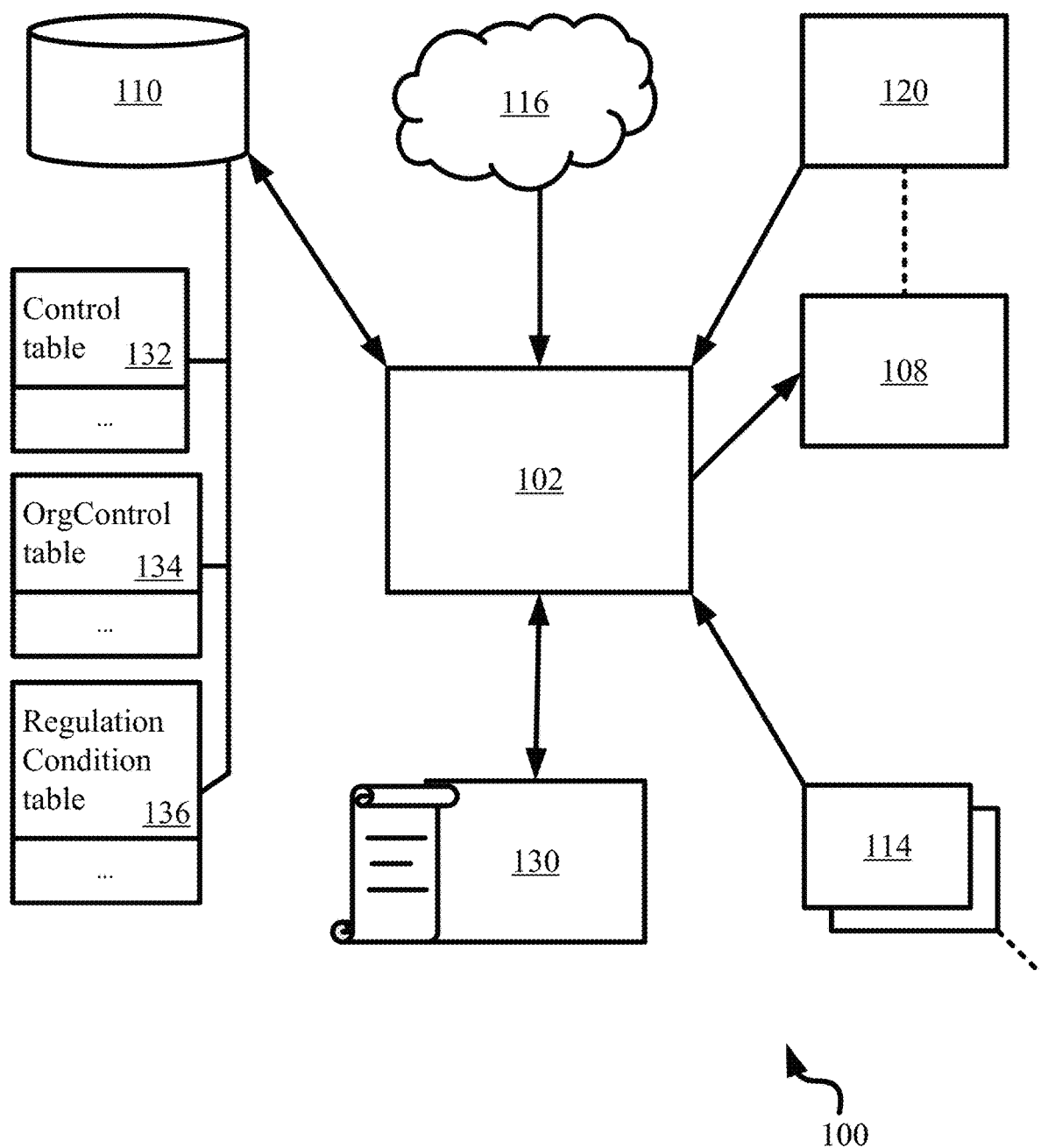
FIG. 3 is a variation of the block diagram of FIG. 1 emphasizing the use of a survey wizard and other elements related to compliance monitoring according to the present techniques.

To understand this functionality of the present design better, let us take advantage of FIG. 3.

FIG. 3 shows monitoring module 120 and other elements with their reference numerals drawn from FIG. 1. The rest of the elements from FIG. 1 have been left out for clarity of explanation and to emphasize the elements associated with compliance monitoring of the present discussion. In order to determine gaps in the privacy and/or security posture of an organization, the present design uses a security/privacy survey and an associated survey wizard 130 as shown in FIG. 3. Survey wizard 130 is typically run when the organization is being onboarded onto system 100 in a SaaS environment per prior teachings. Alternatively, or in addition, wizard 130 is run by the organization on a periodic basis, for example, on an annual basis or on an ad-hoc basis.

When invoked, wizard 130 presents a series of questions to the organization in a survey. In specific embodiments, the survey may be precipitated by a human resources (HR), financial or information technology (IT) audit occurring or desired in the organization. The questions require the admin/user to answer whether certain policies have been implemented or certain set of controls have been enabled/enacted with the purpose of discovering security/privacy gaps or risks in the current security/privacy posture of the organization. In response to the survey, the user answers these questions in a manner analogous to the auto-answer functionality taught earlier.

More specifically, the following set of actions are taken:
1. User runs wizard and is presented with the survey questions.
2. Per above teachings related to RFP auto-answering functionality, system 100 finds policies from corpus 114 of stock policies of FIG. 1 that match each survey question. The matching questions/items or controls of the policy are suggested to the user as responses. If the user selects a matching response, the question is marked complete.
3. If the system cannot find a matching item from the stock policies for the survey question, the system recommends policies from corpus 116 of externally sourced security/privacy documents. Specifically, AI and insights engine 102 searches for:

a. Matching IT security/privacy policies from a peer organization of above teachings. If a peer policy is selected in an anonymized manner per above teachings, then the system recommends updating an existing policy of the organization if necessary or creating a new policy with the controls required to gain compliance with the peer policy. The system then creates policy/controls for review. Next, the user marks the new policy as applicable and implements its controls, and the question is marked complete. Otherwise, the processing continues.

b. One of industry accepted security/privacy frameworks residing in corpus 116 of externally sourced documents. If selected, the system recommends updating an existing policy if necessary or creating a new policy with the controls required to gain compliance. The system then creates policy/controls for review. Next, the user marks the new policy as applicable and implements its controls, and the question is marked complete.

Once the survey has been completed, any unimplemented controls of the selected policies per above, and/or any unanswered questions or the survey, are identified as gaps/risk in the security posture of the organization. These are incorporated into observed security/privacy gaps/risk results 108 of the analysis and provided to the user along with applicable recommendations to overcome them. The recommendations/feedback may include creating new policies or controls to address the gaps and/or implementing the required controls of already existing stock policies, as an example. Additionally, the recommendations/feedback may include implementing the required controls of an externally sourced policy framework/standard, etc.

In addition, system 100 and specifically its monitoring module 120 also performs real-time monitoring of the compliance of the organization to security standards and industry regulations. Specifically, changes occasionally occur in public compliance standards or guidelines where new policy text or controls are updated. For example, if a new version of the National Institute of Standards and Technology (NIST) Cybersecurity Framework is published, the system alerts the relevant users or admins of the organization onboard its SaaS platform of the change/update event. It subsequently identifies the gaps in the existing implemented policies as well as impact on any RFP responses that depended on those implemented policies when compared to the revised standard.

To accomplish this, system 100 is updated with the new regulation or the recommended controls in the new regulation. It then classifies the level of change using appropriate tags and identifies which policy controls or categories of controls will be impacted. It then checks all implemented policies and controls on file/stock, flags the matching policies and annotates the changes in text or suggests new text for affected policies. For this purpose, it utilizes techniques provided above in reference to RFP auto-answering functionality, including using the concepts of root questions/answers.

System 100 then sends an alert message to the administrator of each onboarded organization, providing them the updated language. It also alerts each administrator as to which RFPs are impacted by the change in policy due to the revision of the standard/regulation.

The present techniques are thus effectively deployed to monitor the compliance of the organization to a variety of industry standards as required for specific embodiments. Such industry standards include but are not limited to Health Insurance Portability and Accountability Act (HIPAA), Payment Card Industry (PCI), General Data Protection Regulation (GDPR), NIST standards, etc.

Let us now review the compliance monitoring capability/functionality of the present design in even greater detail. For this purpose, let us look at a table of the instant database schema responsible for holding security/privacy controls. As will be apparent, this Control table has an ID column to uniquely identify each control:

| ID | Control Type | Description |
|---|---|---|
| 1 | TWO_FACTOR_CUSTOMER_DATA | Org requires two factor authentication on all customer data stores |
| 2 | MIN_PASSWORD_LENGTH | Org requires minimum password length on all internal services |
| 3 | ... | ... |

When an organization implements a control, a corresponding record is created in OrgControl table:

| Org ID | Control ID | Status | Value | Implemented At |
|---|---|---|---|---|
| 45 | 1 | IMPLEMENTED | null | 2018 Jan. 1 |
| 45 | 2 | IMPLEMENTED | 8 | 2018 Jan. 1 |
| 46 | ... | ... | ... | ... |

Now, when a new version of a policy with additional controls is published by the system, the OrgControl table is updated with the new controls for each organization but its status is set to NOT_IMPLEMENTED:

| Org ID | Control ID | Status | Value | Implemented At |
|---|---|---|---|---|
| 45 | 1 | IMPLEMENTED | null | 2018 Jan. 1 |
| 45 | 2 | IMPLEMENTED | 8 | 2018 Jan. 1 |
| 45 | 12 | NOT_IMPLEMENTED | null | Null |
| 46 | ... | ... | ... | ... |

Thus, the system monitors the presence of unimplemented controls within each organization and identifies them as security/privacy gaps and notifies their admins accordingly.

In a similar manner, the task of evaluating regulatory compliance is achieved by having a RegulationCondition table holding the conditions required to satisfy a regulation. For example:

| Regulation | Control ID | Conditions |
|---|---|---|
| ABC-123 | 1 | IMPLEMENTED |
| ABC-123 | 2 | IMPLEMENTED and VALUE > 8 |
| ABC-124 | ... | ... |

An organization satisfies a regulation if all its conditions are met. For monitoring compliance viz-a-viz industry regulations, the system or a human expert regularly monitors the respective websites or online resources where new regulations or updates to existing regulations are published. The system or human expert can determine if a particular document or website has been updated. If the human/system detects an updated document or website, it then can either alert human admins to add/update the conditions to the RegulationCondition table when there is a new regulation or changes to an existing one.

The system then reevaluates the conditions against each organization in the system and duly notifies admins of controls which require implementing. For instance, the RegulationCondition table as shown below now holds a row for a new regulation that was recently discovered by the system along with the associated conditions required for meeting/satisfying it:

| Regulation | Control ID | Conditions |
|---|---|---|
| ABC-123 | 1 | IMPLEMENTED |
| ABC-123 | 2 | IMPLEMENTED and VALUE > 8 |
| BCD-234 | 13 | IMPLEMENTED |

FIG. 3 further shows above exemplary Control table 132, OrgControl table 134 and RegulationCondition table 136 of the present discussion explicitly.

Furthermore, when changes to a control are made within an organization, the system reevaluates the conditions on all answers previously selected in completed RFPs and notifies the respective admins of changes that invalidate any previously answered questions. In this way, forward compliance of past RFPs is safeguarded.

Figure 4:
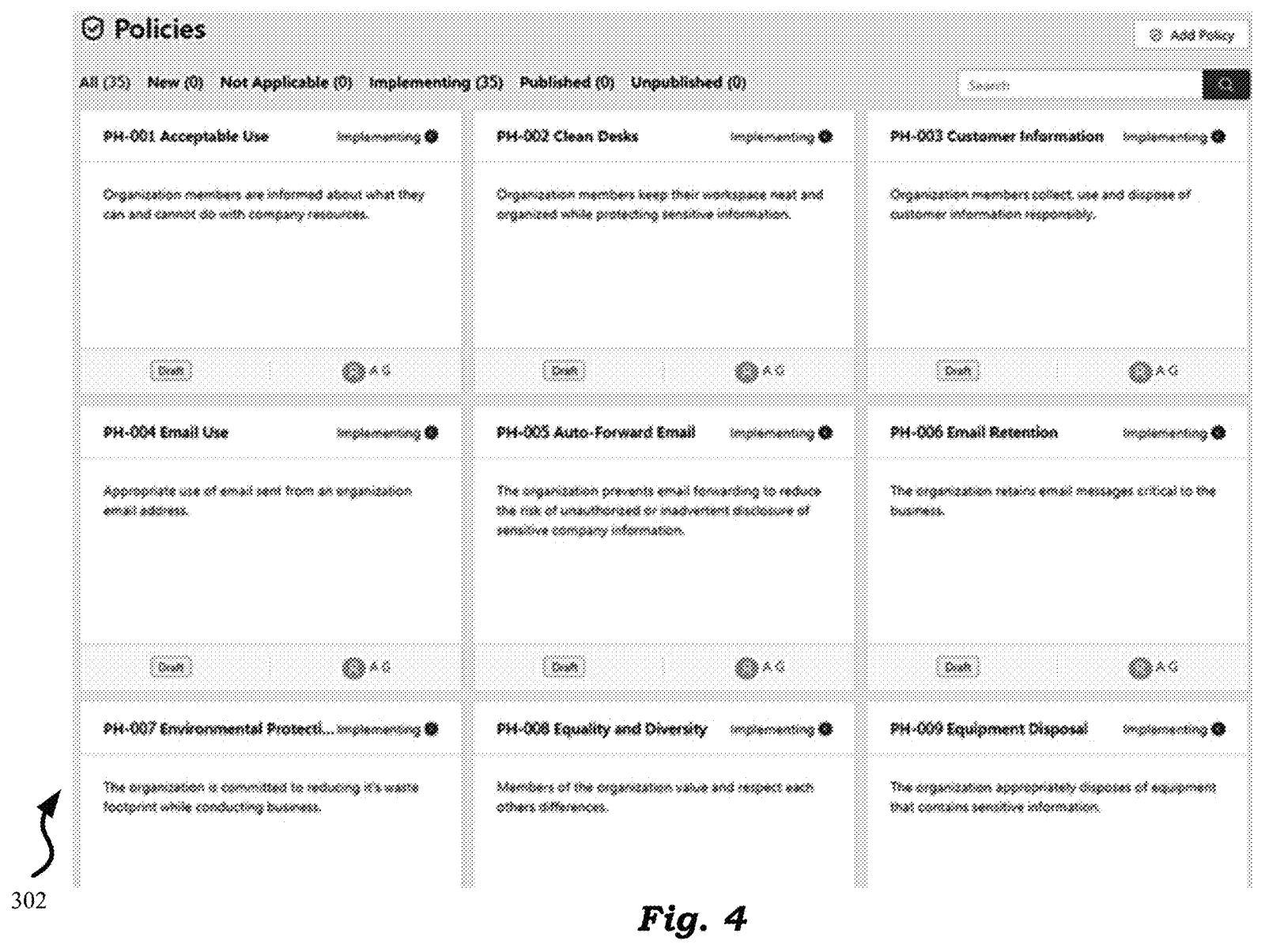
Figure 5:
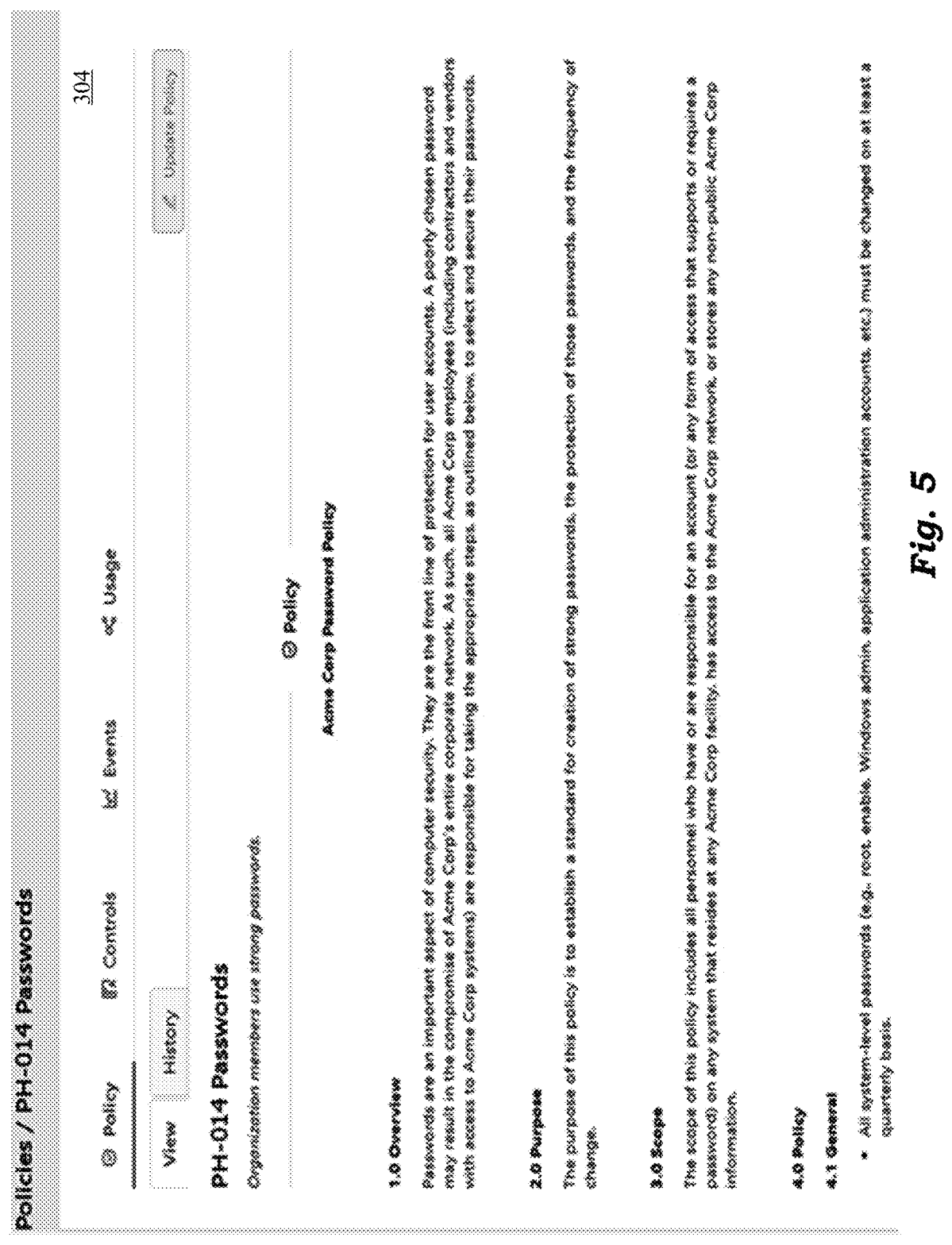

FIG. 4 presents a screenshot 302 of an implementation of the instant techniques showing various stock policies at a high-level. FIG. 5 shows a portion 304 of a detailed view of an exemplary stock password policy and FIG. 6 shows its requisite controls 306. Similarly, FIG. 7 shows a portion 308 of a detailed view of an exemplary customer information policy while FIG. 8 shows the associated controls 310 of that policy.

Usage-Tracking of InfoSec Entities for Information Security Assurance

Let us now review a set of highly preferred embodiments of the present technology that track usage, or perform usage-tracking, of various information security (InfoSec) entities. These embodiments enable a tenant organization or simply an organization or a tenant of the above-taught multi-tenant SaaS web-application or multi-tenant security assurance platform or simply security assurance platform to provide (information) security assurance to its prospects, customers, partners, auditors or any other interested stakeholders. According to NIST's Special Publication 800-53, Revision 5, entitled "Security and Privacy Controls for Information Systems and Organizations", "assurance is the measure of confidence that the system functionality is implemented correctly, operating as intended, and producing the desired outcome with respect to meeting the security and privacy requirements for the system—thus possessing the capability to accurately mediate and enforce established security and privacy policies", (Section 2.5 Trustworthiness and Assurance).

Figure 9:
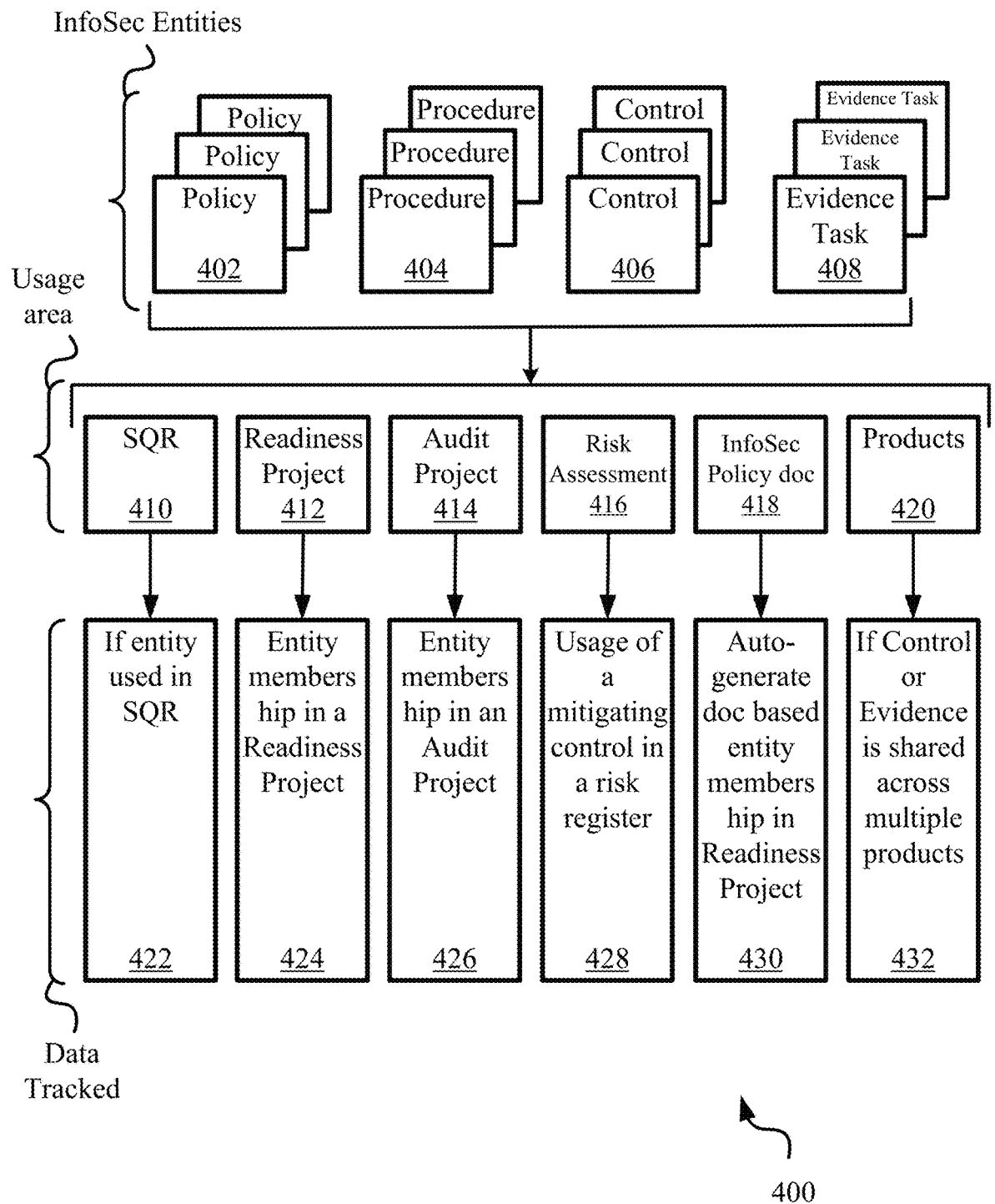
FIG. 9 shows the various InfoSec entities used by usage-tracking embodiments, along with their respective areas of usage as well as the specific usage data tracked.

In order for the above-mentioned tenant to provide security assurance or simply assurance, the present embodiments keep track of the usage of various InfoSec entities that are used by the tenant/organization in its InfoSec program. For understanding the present embodiments, let us first review block diagram 400 of FIG. 9. FIG. 9 shows the various InfoSec entities used by the present embodiments, along with their respective areas of usage as well as the specific usage data tracked. For a given tenant/organization, one or more or any number of such entities, or even other InfoSec entities, may be present.

Explained further, diagram 400 shows one or more policy entities 402, one or more procedure entities 404, one or more control entities 406 and one or more evidence task entities 408. For the sake of brevity, while referring to these entities, the present disclosure may drop the word "entity" or "entities", and may just refer to these as policies 402, procedures 404, controls 406 and evidence tasks 408. The usage areas of these entities along with the data tracked in the present embodiments is provided below.

i. For generating a security questionnaire response (SQR) 410 as per the prior embodiments. The data tracked for this purpose is whether or not a given entity is used in a given SQR as shown by block 422.
ii. For a readiness project 412. The data tracked for this purpose is the membership of an entity in a given readiness project as shown by block 424.
iii. For an audit project 414. The data tracked for this purpose is the membership of an entity in a given audit project as shown by block 426.
iv. For risk assessment 416. The data tracked for this purpose is the usage data of a control for mitigating/addressing a given risk in a risk register as shown by block 428.
v. For the automatic generation of an InfoSec policy document 418. This is done based on the membership data of various entities in a readiness project as shown by block 430.
vi. For sharing data between various products 420 of a tenant. This is accomplished by sharing of usage data of various InfoSec entities across a plurality of products of the tenant, as shown by box 432.

Now let us further understand the workings of the present embodiments. For this purpose, let us first define the terms relevant to the teachings of the present embodiments. These definitions are provided below. It should be noted, that not all organizations may have all of the following entities present in a particular implementation of the present technology.

1. Usage/Usage-tracking: The ability to track when and where an InfoSec entity (e.g. a policy, a control, an evidence task) is used in an InfoSec program of a tenant/organization. Based on the present design, the tracking of usage data enables the tenant or organization to perform a variety of useful InfoSec activities. These include responding to an RFP or a security questionnaire, or differently stated, creating a security questionnaire response (SQR). These further include creating and monitoring a readiness project, performing an audit project, among others. The present embodiments provide an assurance about what InfoSec practices are operational in the organization. Thus, keeping track of the usage of its InfoSec entities is important for the credibility of the organization/tenant for its customers/prospects, partners, auditors, etc.
2. InfoSec entity: InfoSec entities are the basic building blocks of an InfoSec program of an organization/tenant. These entities include policies, procedures, controls and evidence tasks. A policy is enforced by the implementation of its controls, and the implementation of the controls is verified by collecting evidence task(s) that prove/verify the implementation of specific controls.
3. Entity-linkage: Based on the present design, these InfoSec entities are linked to each other, such that they can be consistently updated and observed throughout the tenant/organization and even across the multi-tenant security assurance web-application system/platform. This live linkage provides the "connective tissue" between the various InfoSec entities in the instant multi-tenant design. This linkage or association or relationship or interdependency is preferably afforded by a data-model for these entities developed based on database techniques known in the art. Preferably, the data-model is a relational data-model implemented in a relational database. Alternatively, it is a NoSQL data-model in a NoSQL database. Still alternatively, it may be any other type of database, including a graph database, an object database, among others.

4. InfoSec Program: The overarching set of InfoSec policies, procedures, controls and evidence tasks comprise an InfoSec program of an organization.
5. Policy: A high level umbrella document that outlines what the policy of the organization is for a particular area of an InfoSec Program. Exemplarily, there may be a policy for access control, a policy for business continuity, a policy for physical and environmental security, etc. The policy contains a variety of security controls, or simply controls, that need to be implemented to enforce the policy. Not all the controls of a policy may be implemented at a given point in time and not all the policies of an organization may be enforced. A policy may be considered as an aspirational document and typically requires review and approval at the highest level of an organization, such as the board of directors.
6. Procedure: A procedure entity, or simply a procedure, describes the process of implementing one or more sections of the policy entity or policy. A procedure may be considered as a sub-policy. However, it is a more tactical document than a policy and is more high-level than a control discussed further below. As noted, a procedure is defined for a particular aspect or section or an area of the policy. It is typically reviewed by the departmental head of InfoSec rather than the board of directors. An organization may not have procedures, but just one or more policies, and the associated controls to enforce the policy/policies.
   Exemplarily, a procedure may be defined for an incident-response or a disaster recovery or a risk-assessment activity such as, "What happens if the organization gets hacked ?", or "What is the process of recovering data if there is an earthquake or a fire at a data-center ?", or "What is the business continuity procedure or plan in case of a pandemic ?", etc. Note, that while there may also be a business continuity policy, a procedure defines the process of implementing business continuity for specific scenarios, such as a pandemic, or a fire, or an earthquake, etc.
7. Control: A control is a specific job or task that is required to be implemented, such as the requirement to install and operate antivirus on all workstations or the encryption of all data-at-rest of the organization. Controls are the tactical tasks of a policy or procedure that are required to be implemented in order to enforce the policy or procedure. A control may belong to, or used in, or prescribed in, more than one policies/procedures.
8. Evidence Task: An evidence task is a "proof" or verification that a given control has been implemented and is operational. There may be one or more evidence tasks whose implementation is required to prove or verify the implementation of a control. This verification is needed in an audit to prove that a given control in a tenant/organization is operational. It is typically a file that can be viewed by the auditor or audit team, or other stakeholders. Evidence tasks can be associated with, or can verify/prove the implementation of one or more controls.
9. Readiness Project: The act of preparing for an audit is called readiness. Based on the instant design, there is an automated readiness project module that helps the organization define a readiness project for tracking its readiness or progress towards compliance with an audit. It is used to track the progress of the organization towards enforcing various policies, implementing various controls and collecting evidence tasks.
   A readiness project may be defined for pre-defined InfoSec frameworks/standards, including General Data Protection Regulation (GDPR), System and Organizational Controls (SOC) 2, National Institute of Standards and Technology Cybersecurity Framework (NIST CSF), California Consumer Privacy Act (CCPA), International Organization for Standardization (ISO) 27001, Health Insurance Portability and Accountability Act (HIPAA) and Payment Card Industry Data Security Standard (PCI DSS), among others.
10. Audit Project: An audit project or simply an audit is the act of being evaluated for compliance by a third-party. Based on the instant design, there is an automated audit project module that allows an organization to collaborate with its auditor(s) by showing the controls that have been implemented so that the auditor may verify them by viewing corresponding evidence tasks. An audit project is closely related to a readiness project. Typically, a readiness project is internal-facing for helping the tenant/organization monitor its progress and readiness for an external-facing audit. However, in some cases, the audit may also be internal-facing or be an internal audit performed by internal auditors.

Any given policy or control may be used in, or prescribed in, one or more of the above InfoSec/security frameworks/standards. Armed with the above definitions, let us now take advantage of some screenshots from a graphical user interface (GUI) of a specific implementation in order to understand the functionality of the present embodiments in greater detail. These screenshots demonstrate the functionality of the present embodiments for usage-tracking of various InfoSec entities, defined above. As noted, these include policies, procedures, controls and evidence tasks.

More specifically, FIG. 10A, FIG. 10B, FIG. 10C and FIG. 10D respectively show successive portions 500, 502, 504 and 506 from top to bottom, of a screen or screenshot from an exemplary GUI or a web-application portal or a web-interface/front-end of a preferred implementation of the present embodiments. These screen portions illustrate the functionality of the design for generating an SQR in a fully or semi-automated manner.

Topmost portion 500 shows that a fictitious bank tenant/organization (Haleakala Bank*) is answering a security question numbered VQ-001 as part of an SQR for its fictitious prospect or customer or partner (Startopia Finance). As shown, the question posed is "Describe the controls in place to secure physical access to the facility", and there is an auto-answer recommendation to answer the question provided in box 501A below. The auto-answer and recommendations capabilities of the technology were taught in detail in reference to the prior embodiments.

Based on the usage-tracking ability/capability/functionality of the present embodiments, the system and its methods keep track of the responses to each question by the organization for each of its prospects/customers/partners. For example, response to question VQ-001 above, or to question VQ-002 shown in FIG. 10A, by Haleakala Bank for its prospect Startopia Finance are tracked by the multi-tenant SaaS design of the present technology.

The SQR questions may also be used in various InfoSec policies and procedures of the organization. As a result of the design, the organization can efficiently track its promises made to its customers/prospects/partners in various SQRs as well as monitor progress towards compliance with a policy/procedure. Since these responses may incur a contractual obligation for the organization, the design thus helps reduce liability exposure for the organization.

Screen portion 502 of FIG. 10B shows the previously completed questionnaires by the organization. The screen portion indicates that there were ten such previously-completed questionnaires. In particular, it shows the responses of the organization to question VQ-001 selected above that it has previously provided to its other customers or prospects. Screen portion 504 of FIG. 10C shows a subset of the various control entities in the system. It indicates fifty controls are stored in the system. In particular, it shows the controls relevant to question VQ-001 being responded to per above. The screen portion shows control named Physical Security Controls along with its NIST's Control number PE-6. Text indicated by reference numeral 505 in the box shown on the screen portion also displays the requirement for the implementation of the control. In a similar manner, the screen portion also shows control PCI 9.1—Facility Entry Controls, along with its implementation requirements.

Now, screen portion 506 of FIG. 10D shows a subset of various policies stored in the system. It indicates that ten policies are stored in the system. In particular, it shows the various policies that the above controls are used in. It specifically shows a policy Physical and Environmental Security along with its high-level description shown by text 507A in the box. Similarly, the screen portion shows Policy 45 CFR Part 164 Subpart E—Privacy, along with its high-level description. The ellipses widgets 503B, 503C, 503D at the bottom of screen portions of FIG. 10B, FIG. 10C and FIG. 10D respectively, allow the user to view the rest of the previous-completed questionnaires, relevant controls and policies respectively of the organization/tenant stored in the system.

The present design thus allows the organization to pick the response for the SQR from a rich database of pre-existing policies and controls. As a result of the auto-answer capabilities of the above teachings, the present design provides recommendations to on organization of not only picking the appropriate response, but also then to implement the corresponding controls and respective policies. Per above, the design thus minimizes the chances of a promise being broken by the organization across its customer base. It further assists the organization in responding to an audit in the future per below teachings, and consequently reduces its risk of liability.

Let us now review one such exemplary policy in greater detail. This policy, Physical and Environmental Security is presented below. This policy may be viewed from screen portion 503D of FIG. 10D by clicking the View Details button 507B.

Physical and Environmental Security

The organization protects managed systems and personnel from unauthorized access and from natural and human caused damage or destruction.

1.0 Purpose:

The purpose of Physical and Environmental Security Policy is to establish controls to prevent unauthorized physical access to the organization's information and information processing facilities and to protect them from damage, interruption, misuse, destruction or theft as well as from interruption due to environmental factors such as fire, humidity, water, power outage, etc.

2.0 Scope:

The Physical Security and Environmental Policy applies to all organization systems, facilities (including data centers or server rooms) and personnel.

3.0 High Level Policy:

Safety of human life shall be given highest priority and the organization shall have systems to ensure their safety in case of a disaster like fire.

Physical access to the organization's facilities and secure areas within the information processing facilities shall be restricted, through the use of appropriate access control and identification mechanisms.

Physical security requirements shall be considered in the design stage of new or upcoming information processing facilities and areas.

Security clauses shall be incorporated into all third-party contracts for maintenance of information processing facilities and its upkeep.

All visitors shall be escorted within the facilities and shall be required to follow visitor access procedures.

Users shall be responsible for the physical and data safety of mobile computing devices like laptops.

4.0 Detailed Policy 4.1 Perimeter Security:

Appropriate access control shall be provided at the organization's information processing facilities to ensure that only the employees of the organization, authorized contractor/service provider staff and the authorized visitors can enter the organization's facilities.

4.2 Physical Access Authorization:

Develop, approve, and maintain a list of personnel with authorized access to the facility where information systems are physically located.

Establish a process to review, approve, and issue credentials for physical access.

Remove an individual's access from the information processing facility when access is no longer required.

4.3 Physical Access Control:

Strict access controls shall be established for the secure areas (including data center(s) and/or other information processing facilities) to prevent any unauthorized persons. It shall be ensured that these security perimeters do not leave gaps where a break-in could easily occur.

Entry control mechanisms shall be put into place for secure areas to ensure and verify the identity of persons entering the same, by deploying security guards and/or access control devices.

Maintain physical access audit logs for these areas.

Perform security assessments on an annual basis at the physical boundary of the data center(s) to check unauthorized exfiltration of information or removal of information system components.

Establish a process to escort visitors and monitor their activity within the information processing facilities.

Change combinations and keys at defined intervals, and when keys are lost, combinations are compromised, or individuals are transferred or terminated.

The unnecessary visibility of the secure areas from outside the premises shall be avoided.

Data center electrical power systems shall be designed to be fully redundant and maintainable without impact to operations, 24 hours a day, and seven days a week.

4.3.1 Visitor Access Controls:

Visitors shall be escorted at all times within the organization's information processing facilities.

All visitors must arrive at a designated Check-In entrance (the main reception desk in most locations). Visitors may be asked to present government-issued photo identification at the time of Check-In and their entry shall be recorded in the visitor access log.

Visitors must be met by their employee sponsor at the time of Check-In and shall be accompanied by their employee sponsor at all times when in common office areas.

A visitor shall not sponsor another visitor. If requested, visitor electronics (laptops, other computer equipment, cell phones, etc.) will be checked in.

Visitor Badges issued must be worn at all times. All personnel must be trained to immediately report unescorted visitors

4.4 Monitoring Physical Access:

Review of physical access rights to the organization's information processing facilities shall be performed on a periodic basis (preferably quarterly) to review the appropriateness of current access and to remove access that is no longer required.

In addition, review of physical access logs shall be performed at a defined frequency and upon occurrence of security incidents.

4.5 Equipment and Cabling:

Place power and telecommunications cabling carrying data or supporting information service in safe locations to prevent environmental or human damage and destruction.

4.6 Supporting Utilities:

The organization shall have an uninterruptible power supply to facilitate transition to long-term alternate power in the event of a primary power loss. This equipment shall be protected from failure of power or other forms of service disruptions.

Other utilities include but are not limited to
- A load balancer to improve the concurrent user capacity and overall reliability and high availability of applications.
- Bandwidth capacity monitoring and alerting to help prevent network strain, threshold notification, and to monitor bandwidth trends for capacity planning.

The above equipment shall be tested regularly to ensure that it functions correctly for business requirements.

4.7 Fire Protection and Detection Devices:

The organization shall install and maintain fire detection and suppression devices that are supported by an independent power source.
- Use fire detection devices/systems that activate automatically and notify emergency personnel and emergency responders in the event of a fire.
- Use an automatic fire suppression system if/when the data center is not staffed on a continuous basis.

These devices shall be tested regularly to ensure they function correctly for business requirements.

4.8 Temperature and Humidity Controls:

Climate and temperature control is required to maintain a constant operating temperature for servers and other hardware. The organization shall have automatic temperature and humidity controls in facilities to prevent fluctuations potentially harmful to processing equipment.

The organization shall use temperature and humidity monitoring that provides an alarm or notification of changes potentially harmful to personnel or equipment.

The above equipment shall be tested regularly to ensure that it functions correctly for business requirements.

Controls:

The control entities or simply controls associated with the above policy are provided below:

A.11.2.1—Equipment Siting and Protection:

Equipment shall be sited and protected to reduce the risks from environmental threats and hazards, and opportunities for unauthorized access.

A.11.2.2—Supporting Utilities:

Equipment shall be protected from power failures and other disruptions caused by failures in supporting utilities.

A.11.2.3—Cabling Security:

Power and telecommunications cabling carrying data or supporting information services shall be protected from interception, interference or damage.

A.11.2.4—Equipment Maintenance:

Equipment shall be correctly maintained to ensure its continued availability and integrity.

DE.CM-2—Monitoring of Physical Environment:

The physical environment shall be monitored to detect potential cybersecurity events.

PE1—Environmental Protections:

Environmental protections shall be installed including the following and will receive maintenance on at least an annual basis.
- Cooling systems
- UPS
- Redundant communication lines
- Smoke detectors and sprinklers PE2—Monitoring of Environmental Protections:

Operational personnel shall monitor the status of environmental protection during each shift. Alert mechanisms shall be installed to communicate any discrepancies in environmental thresholds.

PE3—Physical Access Authorization to Data Center:

Access to data centers and other secure areas shall require a formal authorization from IT management prior to access being provisioned.

PE6—Physical Security Controls:

Physical security controls shall be implemented to secure organization offices, rooms and facilities from unauthorized access.

PE7—Review of Physical Access to Data Center:

Physical access to data centers and other secure areas shall be reviewed quarterly by management.

PR.AC-2—Physical Access Management:

Physical access to assets shall be managed and protected.

PR.IP-5—Physical Environment Policy and Regulations:

Policy and regulations regarding the physical operating environment for organizational assets shall be met.

Screenshot 510 of FIG. 11 shows Usage tab selected for policy Physical and Environmental Security presented above. As will be described further below, the Usage tab is a convenient way for the GUI to show where an InfoSec entity is being used. The screenshot further shows SQR Responses tab selected and question VQ-002 in the above-presented policy being answered in an SQR by a fictitious organization (United Lifecare).

The design easily tracks that question VQ-002 being answered in the SQR for a specific customer/prospect of United Lifecare is used in the above Policy. In a similar manner, the present embodiments also keep track in still other screens of the GUI (not explicitly shown), of any other InfoSec entity besides a policy, such as a procedure, control or evidence task, etc. that is relevant to or used in an SQR by the organization for any of its customers/prospects.

FIG. 11 further shows a Close Date column and a Valuation column that may be used by the organization to track the opportunity with the customer/prospect as a function of time and its potential dollar value respectively. The organization can also generate a report that shows all policies and controls along with their implementation statuses that were used in an SQR, so it can see at a glance if there are any commitments that were made but not met yet. Such a report is referred to as a liability report based on the present design.

FIG. 12A and FIG. 12B respectively show a top portion 512 and a bottom portion 514 of a screenshot displaying a list of control entities from a GUI of a specific implementation of the present embodiments. Based on the highlighted Filter buttons, top portion 512 shows controls that are used in the SOC 2 standard, but not yet implemented by the organization. The high-lighted In-use and Not Implemented Filter buttons indicate that these controls are used by the organization in one or more InfoSec entities, such as a policy, procedure, control or evidence task, however, they have not been implemented yet.

As shown in top portion 512, the second control entity from the top is Business Continuity Plan along with its control number CR5 per NIST. The scope of this control is organization-wide or across the organization as will be discussed further below. The category of this control is Continuity and Resilience and the code per NIST of a Framework in which it is used is A1.3. The Risk of not implementing this control is Medium, with the initials of the owner that it is assigned to as shown. In a similar fashion, the other controls for the organization are listed in the screen portions 512 and 514 of FIG. 12A and FIG. 12B respectively.

Screenshot portions 516 and 518 of FIG. 13A and FIG. 13B respectively further present the Usage functionality of the present embodiments. They show above-presented control PE3 used in Physical and Environmental Security policy and the associated evidence task to prove the implementation of the control. Specifically, FIG. 13A shows control PE3 i.e. Physical Access Authorization to Data Center that is required to be implemented in order to enforce Physical and Environmental Security policy presented above.

Screenshot 518 of FIG. 13B shows the corresponding evidence task that is required (for example, in an audit) to verify that control PE3 has been implemented. Specifically, the evidence task is the hiring/presence of the employee/role of a Data Protection Officer with his/her associated responsibilities in the organization/tenant. Exemplarily, the above evidence task entity is further detailed below. Products and scopes within an organization/tenant will be discussed further below in these teachings.

Evidence Task Title: Data Protection Officer

Evidence Task Scope: Associated with organization-wide scope. This evidence task is associated with one or more controls with organization-wide scope. This means evidence uploaded here may apply to all products.

Evidence Task Description (What to Collect):
i. Provide current organization chart showing the position of Data Protection/Privacy Officer along with the name.
ii. Provide the documented roles and responsibilities of a Data Protection/Privacy Officer.
iii. Provide evidence demonstrating the communication of roles and responsibilities to the Data Protection/Privacy Officer.

Evidence Collection Guidance:
Identify an individual in the organization responsible for data privacy. Consider using a Data Protection Officer (DPO) Job Description template.

Before, proceeding further, let us also review an exemplary procedure entity for an organization as detailed below.

The procedure is for Risk Management and it describes the process for managing and treating Risks to an organization. This capability is facilitated by a risk register module of the present technology as will be taught further below.

Risk Management Procedure

Procedure for assessing and treating risks in the organization.

Risk management considers the identification and selection of controls or security measures for the identified risk for a given process/asset. Risk Impact Rating level of Low is an acceptable level as this does not significantly affect the organization's business and therefore, does not need any special mitigation measure or control. Treating these risks to bring their level further down does not justify the investment.

An associated risk-management flowchart 520 is presented in FIG. 14. The process begins by generating a risk assessment report for the organization and identifying the various risks or risk levels that the organization may be exposed to. This is shown by step/box 522. The next step 524 is to prioritize actions for mitigating the risks. This is followed by step 526 of deciding on and ranking the treatment actions for each risk. The next step 530 is to evaluate the controls required for the treatment actions. This step takes input shown by box 528 containing the risk assessment report and controls identified in various pre-existing security frameworks, such as SOC 2 and ISO 27001, etc.

At this point, as shown by box 532, an action plan is developed for implementing the controls for treating the risks identified above, followed by a cost benefit analysis of the action plan, as shown by box 534. At this stage, the plan needs to be approved by the management of the organization as shown by box/step 536. Now the specific controls and their associated safeguards are selected/identified as shown by box 538, followed by defining fine-grained tasks and sub-tasks required to implement the controls/safeguards as shown by box 540.

Next, appropriate owners from the organization are assigned to the tasks/sub-tasks, per box 542, with respective responsibilities signed-off per box 544. Then, the safeguards are implemented per box 546, and the risk treatment plan (RTP) is finalized per box 548. Finally, the organization tracks the implementation of the RTP through closure per box 550. After implementation of the RTP, the assigned owners must accept the residual risk discussed below, as shown by box 552.

Suitable risk treatment measures should be implemented for processes/assets having a High or Medium risk Level to reduce the risks to an acceptable level. The following are the various risk treatment methods:

7.1 Risk Avoidance:
By deciding to not go ahead with an activity likely to generate risk or choosing alternate methods to carry out business. Alternatively, stop performing certain tasks or processes if they incur such risks that are simply too big to mitigate with any other options. For example, the organization can decide to ban the usage of laptops outside of the company premises if the risk of unauthorized access to those laptops is too high.

7.2 Risk Transference:
By arranging another party to bear the whole or part of the risk. This means the organization/tenant can transfer the risk to another party—for example, it can buy an insurance policy for the business, thereby transferring part of the financial risk to an insurance company.

7.3 Accepting the Risk:

Risk Impact rating of Low is considered an acceptable risk. A risk which cannot be mitigated even after having additional controls and safeguards has residual risk. A risk above the Risk Impact Rating of Low i.e. Medium and High for which implementation of controls is not cost-effective also has residual risk. The acceptable residual risk level for such risks should be reviewed and approved by the management.

7.4 Reduce the Risk (Mitigate):

By reducing the threats and vulnerabilities or by modifying the processes/assets at risk by means of selection and implementation of appropriate controls.

While selecting security controls for implementation, the following factors should be taken into consideration:

Legal and regulatory requirements

Cost

Ease of implementation and servicing

The relative strength of the controls, and

The types of functions performed by the control—prevention, deterrence, detection, recovery, correction, monitoring, and awareness Control selection may include a balance of operational (non-technical) and technical controls supporting and complementing each other. Also, the existing and planned controls should be re-examined for cost comparisons and maintenance, with a view to removing or improving them if they are not effective enough.

Upon implementation of risk treatment measures, the residual risk is required to be evaluated to decide necessary management actions. Table 1 below summarizes the necessary management action based on the level of residual risk (first column):

TABLE 1

| Residual Risk Level | Risk Description and Necessary Management Action |
| --- | --- |
| High | There is a strong need for corrective measures in the form of a risk treatment plan. Process/Asset may continue to operate but a corrective action plan must be put into place within a reasonable period of time for the treatment of risk. |
| Medium | There is a need for corrective measures in the form of a risk treatment plan. Process/Asset may continue to operate but a corrective action plan must be put in place within a reasonable period of time for the treatment of risk. |
| Low | Risk owner and Management to decide to accept the risk or determine whether further corrective actions are still required. |

As noted, the above risks and related functionality is implemented in a risk register module of the present technology. Now let us review this functionality in greater detail. First, with the Risks tab highlighted/selected, top screen portion 560 of FIG. 15A from a GUI of an implementation shows that for control AT3—Onboarding Customers and Employees, the associated Risk (of not implementing it) is High. The Risk Treatment per above is to Mitigate the Risk. The Residual Risk level per above is High and currently there is no owner assigned to it.

Furthermore, bottom portion 562 of FIG. 15B shows the Risk Register of the tenant/organization mentioned above. Specifically, bottom portion 562 shows that for the Risk with Identifier/ID: 5, "Lack of customer support systems or tools to report issues", the Inherent Risk or Risk per above, is Low. The Risk Treatment for this risk is to Mitigate, there are 4 controls in which this risk is used and the level of Residual Risk is Medium. The assigned owner is as shown and this risk has been timely mitigated as shown by the dots in the two right-most columns of the Risk Register. Similarly, other risks in the Risk Register and their above attributes can be accessed in still respective screens from the GUI of the present technology.

Readiness Projects:

Now let us review the functionality of the present embodiments for measuring the readiness of an organization for an audit. Readiness means preparation of the organization for an audit or an examination. Hence, a readiness project is a preparation for performing an audit project. This functionality enables a tenant/organization to measure its readiness for the audit, or any other desired compliance objectives. Such compliance objectives may be a custom set of policies and controls, or established security frameworks/standards or both.

Based on the present design, an organization can create and track/monitor a readiness project for achieving any given compliance objectives. For example, an organization can create a Readiness Project for meeting compliance with a security framework or a standard, such as, GDPR, SOC 2, NIST CSF, CCPA, ISO 27001, HIPAA, PCI DSS, etc. Such a project may also be a recurring or a periodic project such that the compliance with a standard is required to be maintained or renewed on a periodic basis, such as annually.

Top and bottom screen/screenshot portions 564 and 566 of FIG. 16A and FIG. 16B of a screenshot from a GUI or web-interface or portal of an exemplary implementation of the present embodiments show the creation of a readiness project by a user, such as an InfoSec Admin of a tenant/organization. The Select Product field in top portion 564 allows the user to select a Product or Scope within the organization for which this Readiness Project is being created for. A product refers to a product-line of a large organization. Sometimes the name of the product-line or product coincides with the name of the business unit or division of the organization, but that is not necessarily the case. Since the scope of an audit is defined in terms a product, this is the meaning adopted for the term product in the present teachings.

For example, a product of an organization Startopia II, may be Startopia II Health whose primary focus is healthcare companies. Hence, the scope of an audit carried out in Startopia II may be the Startopia II Health product. Similarly, another product of Startopia II may be Startopia II Finance, that is focused on customers in the financial services sector. Yet another product may be Startopia II Europe that is a division of Startopia II with localized support for Europe, including European rules and languages. As such, there may be separate audit projects active for products Startopia II Finance and Startopia II Europe.

After the selection of product in the Select Product field of screen portion 564, the Project Name field in screen portion 566 allows the user to create a name for the readiness project along with a description in the Project Description field. The observation period allows one to set a timeframe during which the compliance is being sought and to which the present readiness project is supposed to apply. The Start Date and End Date fields allow the user to enter the start-date and end-date for the project or in other words the deadline for reaching compliance as per the project objectives.

Once the Create button is clicked, the user is taken to another screen (not shown) where he/she can answer a survey to indicate the InfoSec objectives for this project. As a part of the survey, the user can select one or more security frameworks or standards such as the ones listed above, the compliance to which is being sought and to which the present readiness project is supposed to apply. Based on the answers to the survey, the user is presented with a set of InfoSec controls for which usage-tracking will be done as a part of the readiness project. If the user skips the survey, he/she can manually select the controls desired. In either case, the user can edit the choice of controls whose usage will be tracked for the readiness project.

Screenshot portions 568, 570 and 572 of FIG. 17A, FIG. 17B and FIG. 17C demonstrate the usage-tracking functionality of the present embodiments for the various readiness projects defined for an organization. Specifically, portion 568 shows with the Usage tab selected, the usage-tracking of policy Acceptable Use in the various readiness projects. These are ISO 27001* with the description ISO 27001 For 2020 and SOC 2* with the description SOC 2 Type 2 for Jan. 1-Dec. 31, 2020. Relatedly, screenshot portion 570 of FIG. 17B shows usage-tracking of control AT4—User Guides used in the SOC 2* readiness project above. Screenshot portion 572 of FIG. 17C shows usage-tracking of an evidence task Data Encryption at Rest used in readiness projects ISO 27001*, 10*and SOC 2*.

Figure 18A:
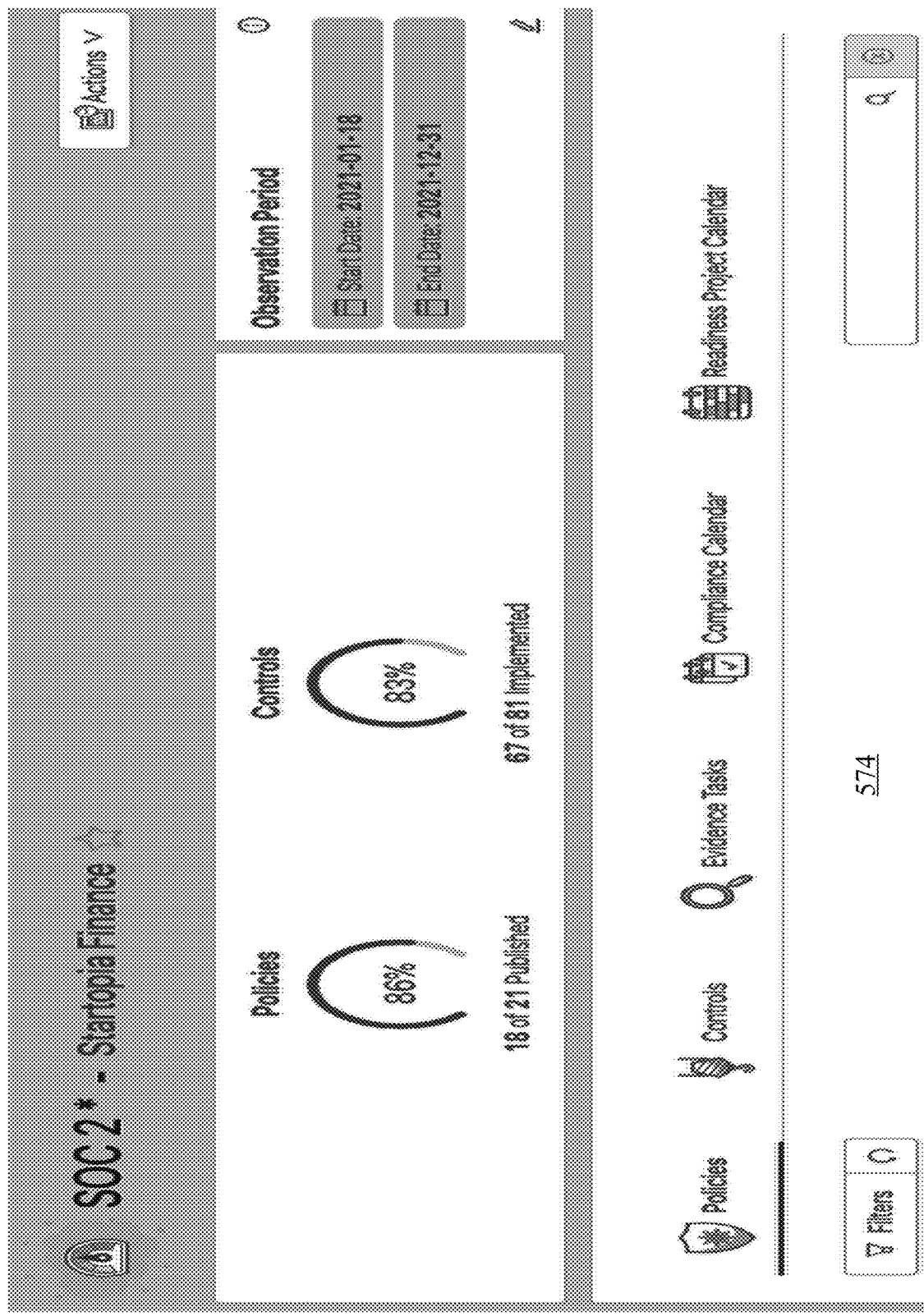

Now, screenshot portions 574 and 576 of FIG. 18A and FIG. 18B respectively show the progress dashboard of the organization against the observation period of Jan. 18, 2021 through Dec. 31, 2021 of the above-defined readiness project SOC 2*. More specifically, the readiness dashboard shows the progress of the organization in implementing the policies, associated controls as supported by related evidence tasks for the SOC 2* readiness project.

Screen portion 574 of the readiness dashboard shows the overall progress of the organization by progress dials indicating how many policies have been Published, and how many of the associated controls have been implemented. The readiness dashboard enables the tenant/organization to measure its readiness or progress towards compliance with an audit project or other compliance objectives. As shown, the organization has published 18 out of 21 policies and of the associated 81 controls, 67 have been implemented. By publication of a policy, we mean that the policy has been approved by the upper management and circulated amongst the stakeholders for enforcement.

With the Policies tab of the readiness dashboard selected/high-lighted in screen portion 574 as shown, screen portion 576 of FIG. 18B of the readiness dashboard shows that policy Change Management is in the Status of being Drafted. It is assigned to the owner/user initialed as shown in the Assignee column and will be reviewed by the user initialed as shown in the Reviewer column. Policy Information Security is assigned to the owner and reviewer as shown respectively in the Assignee and Reviewer columns, and it is in the Status of Awaiting Approval from the reviewer. Policy Corporate Ethics has already been Published. Similarly, other Policies are in various stages/statuses as shown in screen portion 576.

With the Controls tab of the readiness dashboard selected, screen portion 578 of FIG. 18C of the readiness dashboard shows that control AT4—User Guides has been implemented as shown by check/tick mark in the rightmost column. The screenshot portion further shows the Category of the control, the Code of the security Framework(s) it belongs to, a user definable/selectable Tag, associated Risk of not implementing it, and the owner/assignee for implementing it. Similarly, other controls and their above-mentioned attributes are displayed in screen portion 578 as shown.

In a similar fashion, with the Evidence Tasks tab of the Readiness dashboard selected, screen portion 580 of FIG. 18D shows the status and various attributes of the evidence tasks required to prove the implementation of above controls in the readiness dashboard. For instance, the first row of portion 580 shows evidence task Data Encryption at Rest along with the associated controls and policies in which this evidence task is used for proof/evidence. The screen portion shows that the evidence task has been collected and verified as of last Thursday as indicated by the two rightmost columns. What this means is that the technological proof required to establish that the organization is keeping its data-at-rest encrypted has been obtained.

The above proof may take various forms depending on the IT infrastructure of the organization. Exemplarily, it may take the form of a fully automated integration program or a script that is run on predetermined parts of data-at-rest in the organization's IT systems/infrastructure to verify that the data is encrypted. Preferably, this is accomplished by detecting the encryption state of the data/databases in a public cloud environment, as provided by the cloud provider/service in question.

Exemplary cloud providers include Amazon AWS™, Microsoft Azure™, Google Cloud Platform or GCP™, etc. An integration script/program interfacing with an application programming interface (API) of the above cloud provider runs according to scheduled intervals configured for/by the tenant in the instant security assurance platform. As a result, the integration program/script gathers/collects the encryption state of the tenant's data from the cloud for the collection of the above evidence task.

Such integrations for automatic collection of evidence tasks will be further discussion below. Screen portion 580 further shows that the scope of this evidence task applies to multiple products and that this is an annually recurring task of evidence collection as shown by the column with the clock symbol. Of course, the recurrence interval of the task may be on-demand or any regularly defined schedule configured for the tenant/organization in the instant platform. Similarly, other evidence tasks and their above-mentioned attributes are displayed in the screenshot portion as shown.

Figure 18E:
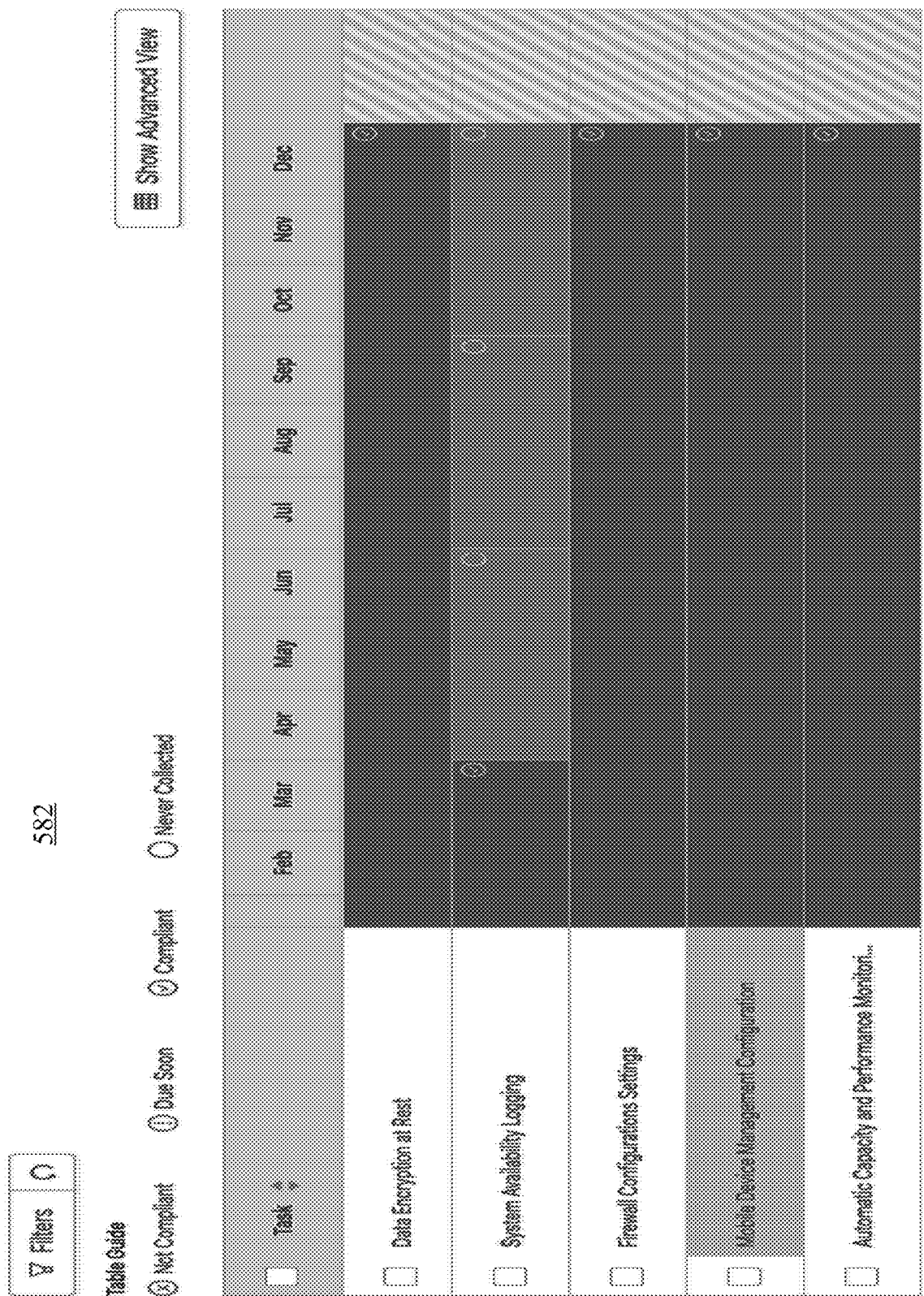

With the Compliance Calendar tab of the readiness dashboard selected, screen portion 582 of FIG. 18E shows the progress of the organization in achieving compliance with the readiness project objectives in a calendar form. The calendar provides a visual indication of how well the various evidence tasks have being collected for the observation period of the project. For example, portion 582 shows that the task of collecting evidence for System Availability Logging has been completed as of end of March.

Recall that there is a live linkage or connective tissue between the various InfoSec entities and the associated usage-tracking functionality of the instant multi-tenant design. As a consequence, when a control or an evidence task is used in multiple projects and its status is updated for one project, it is automatically reflected/updated for all other projects in which it is used.

In the instant security assurance platform, which is a multi-tenant SaaS web-application/system per present teachings, there is also a risk assessment module that is used by a tenant or organization to assess its risks. When this module is launched, it presents a risk identification survey to the tenant user containing various strategic objectives for the tenant/organization. The user can then select the strategic objectives relevant to the tenant/organization.

Screenshot portions 584, 586 and 588 of FIG. 19A, FIG. 19B and FIG. 19C respectively show successive portions from top to bottom of an exemplary Risk Identification Survey. In the screen portions shown, many of the questions are shown with their checkboxes already ticked along with the text "Recommended" below the checkboxes that the system deems should be checked based on its recommendations for the tenant/organization.

There is an internal mapping maintained by the instant security assurance platform that maps various controls to the above strategic objectives defined in the system and presented in the Risk Identification Survey. The system then automatically analyzes any readiness project(s) that the tenant may have defined and based on the above mapping, it then outputs the associated risks in the Risk Register of the above discussion. The Risk Register is generated once the user clicks the Generate Risks button shown in screenshot portion 588 of FIG. 19C.

As a result of the present design, the Risk Register thus generated is relevant to the tenant/organization based on its selection of the strategic objectives above. It enables the tenant/organization to assess what risks it may be exposed to, the associated treatment plans and residual risk levels per above discussion. As a result of this capability, the tenant/organization is also able to generate a Risk Assessment Report of the prior discussion in reference to box 522 of FIG. 14.

Audit Projects:

Now let us look at the functionality of the present embodiments for auditing the progress of an organization towards achieving its compliance objectives for various security frameworks/standards, policies/procedures and controls. Per above, the organization can track its progress towards the above objectives as a consequence of the usage-tracking capabilities of the present embodiments being taught. Recall that a readiness project is used to prepare the organization for an audit per above discussion. Per above, the readiness project enables the tenant/organization to measure its readiness for the audit. Let us now look at the present design for supporting such an audit project, or simply an audit, in greater detail.

For this purpose, let us look at a screenshot showing an audit dashboard from a GUI or web-interface/portal of an exemplary implementation of the present technology. Such an audit dashboard is typically used by an auditor and is shown in a screen portion 590 and a screen portion 592 of FIG. 20A and FIG. 20B respectively. In a manner analogous to the readiness dashboard taught earlier, portion 590 of the instant audit dashboard shows the progress of the audit by progress dials.

Specifically, the dashboard shows that for the audit project named SOC 2 Type 2 2020, the audit of the corresponding controls has been 13% completed and the audit of evidence tasks that prove the implementation of the controls has been 9% completed. There is also a third dial that shows the status of requests for collecting evidence tasks sent by the auditor to the tenant/organization of the present multi-tenant security assurance platform. The dial shows that there are no such outstanding requests.

Portion 590 of the audit dashboard further shows that the audit is Active as shown by the Project Status box. It also shows the Due Date of Dec. 31, 2020 and the observation period for which the Audit is being conducted. It also shows the corresponding readiness project SOC 2* discussed above that was created by the organization in preparation for this audit. It also shows in the Frameworks box the security framework of SOC 2 to which compliance is sought/tracked by this audit. Also shown are the names of the internal stakeholder/owner of the organization of this audit as well as the name of the (typically external) auditor in boxes Owner and Auditors respectively.

With the Control Review tab of the audit dashboard selected as shown in screen portion 590, screen portion 592 shows the status and other attributes of various control entities used in this audit project. For instance, in the first row, control AT4—User Guides is shown along with its description in the Description column and category in the Category column. In the fourth column from the right is shown the internal owner for the control. The tick mark in the next column to the right indicates that the control has been implemented, and the tick mark in the rightmost column labeled Audit Status indicates that the audit of the control has been done or completed. Similarly, other controls of audit project SOC 2 Type 2 2020 along with their Audit Status and other attributes are also shown in screen portion 592.

Now, with the Evidence Task Review tab of the audit dashboard selected, screenshot portion 594 of FIG. 20C shows the Audit Status and other attributes of the evidence tasks required to prove the implementation of the controls displayed in the Control Review tab above. For instance, the first row of portion 594 shows that the evidence task of Data Encryption at Rest used in security Framework PCI 8.2.1 Strong Cryptography for Authentication Credentials, that is required annually and assigned to user initialed SD has been Completed or Approved as per the Audit Status column. Similarly, portion 594 also shows the status and the other attributes of other evidence tasks required to prove the implementation of the controls used in the audit project SOC 2 Type 2 2020. As noted, there may be more than one evidence tasks whose collection is required to prove the implementation of a single control.

As taught above, by virtue of the usage-tracking functionality of the present embodiments, there is a live linkage between the use of various InfoSec entities across the organization. In other words, the information presented in the readiness projects dashboard/reports is consistent with the information in audit projects dashboard/reports. This information is consistent with the information displayed in the usage tab of respective InfoSec entities including policies, procedures, controls and evidence tasks across the organization/tenant and even across the entire multi-tenant security assurance platform per above per above.

InfoSec Document Generation:

By virtue of the linkage or interdependencies between the various InfoSec entities of the present usage/usage-tracking functionality-based embodiments, there are many benefits accrued to a practicing organization or tenant. One of these benefits is that the organization can readily generate its formal InfoSec Program document or information security program document containing the various policies in use, for its customers or prospects or partners or auditors or any other stakeholders. The organization can readily produce its InfoSec Program or information security program document that either contains already published policies or otherwise policies that are in the process of being reviewed for publication. Such a document is otherwise only manually and labor-intensively produced using the techniques of the prior art.

Screenshot portions 596 and 598 of FIG. 21A and FIG. 21B illustrate this capability. Portion 596 shows a subset of the various policies that the organization has in use. Since the Published Policies Only checkbox is checked, only the published policies are being shown on the screen. Along with the name of each policy is a summary column containing its brief description. There is also the ability for the user to include in the InfoSec Program document, the details of the policy via the Detail box and/or the summary of the policy via the Summary box. Alternatively, the user may exclude the policy from the InfoSec Program document via the Exclude button. Screen portion 598 shows the Table of Contents of such an exemplary InfoSec Program document.

Multi-Product Functionality:

Yet another capability afforded by the linkage between the InfoSec entities of the present embodiments is the support for large tenants/organizations possessing multiple product-lines/businesses or simply products. Such organizations/tenants typically have individual products with their own InfoSec programs that may or may not be the same across the whole organization. An audit is typically carried out on a given product of the organization. This ability of the present embodiments to support or to encompass multiple products of an organization is thus referred to as a multi-product functionality and it is afforded by the sharing or linking of the InfoSec entities across the various products of a tenant/organization. Let us now review the instant multi-product functionality in greater detail.

Figure 22B:
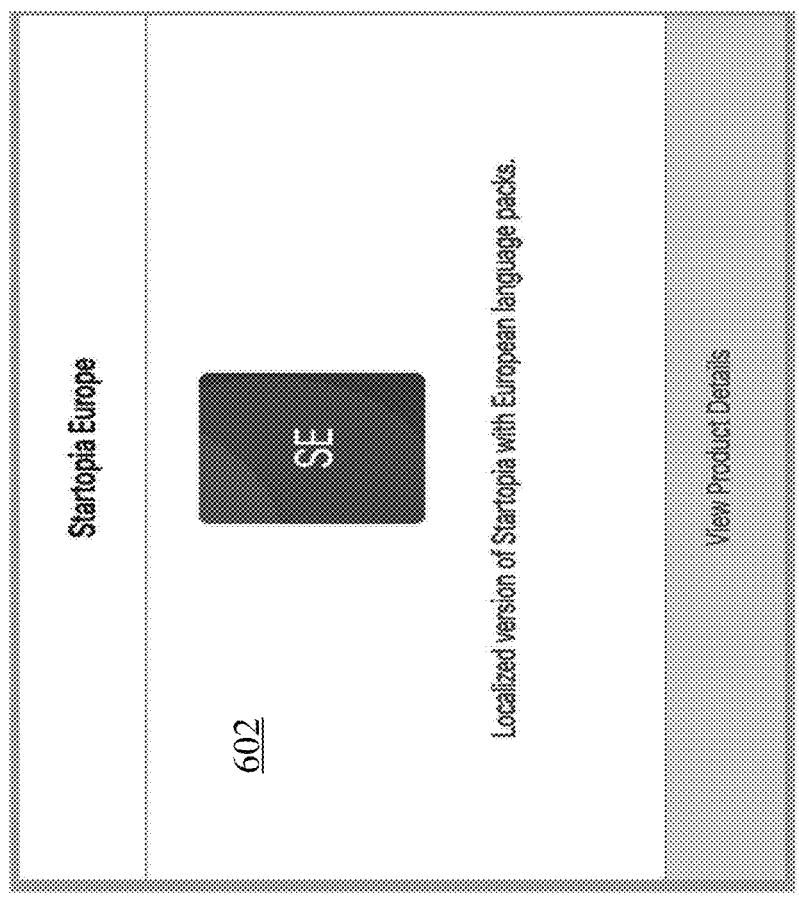

For this purpose, let us first review screenshot portions 600 and 602 of FIG. 22A and FIG. 22B respectively, showing that a fictitious tenant organization Startopia has three products. These are Startopia Finance that caters to financial services companies, Startopia Health that caters to healthcare companies and Starotpia Europe that is localized to European languages and standards. Clicking on the icons for any of the above, takes the user to the respective Product Details screen.

Figure 22C:
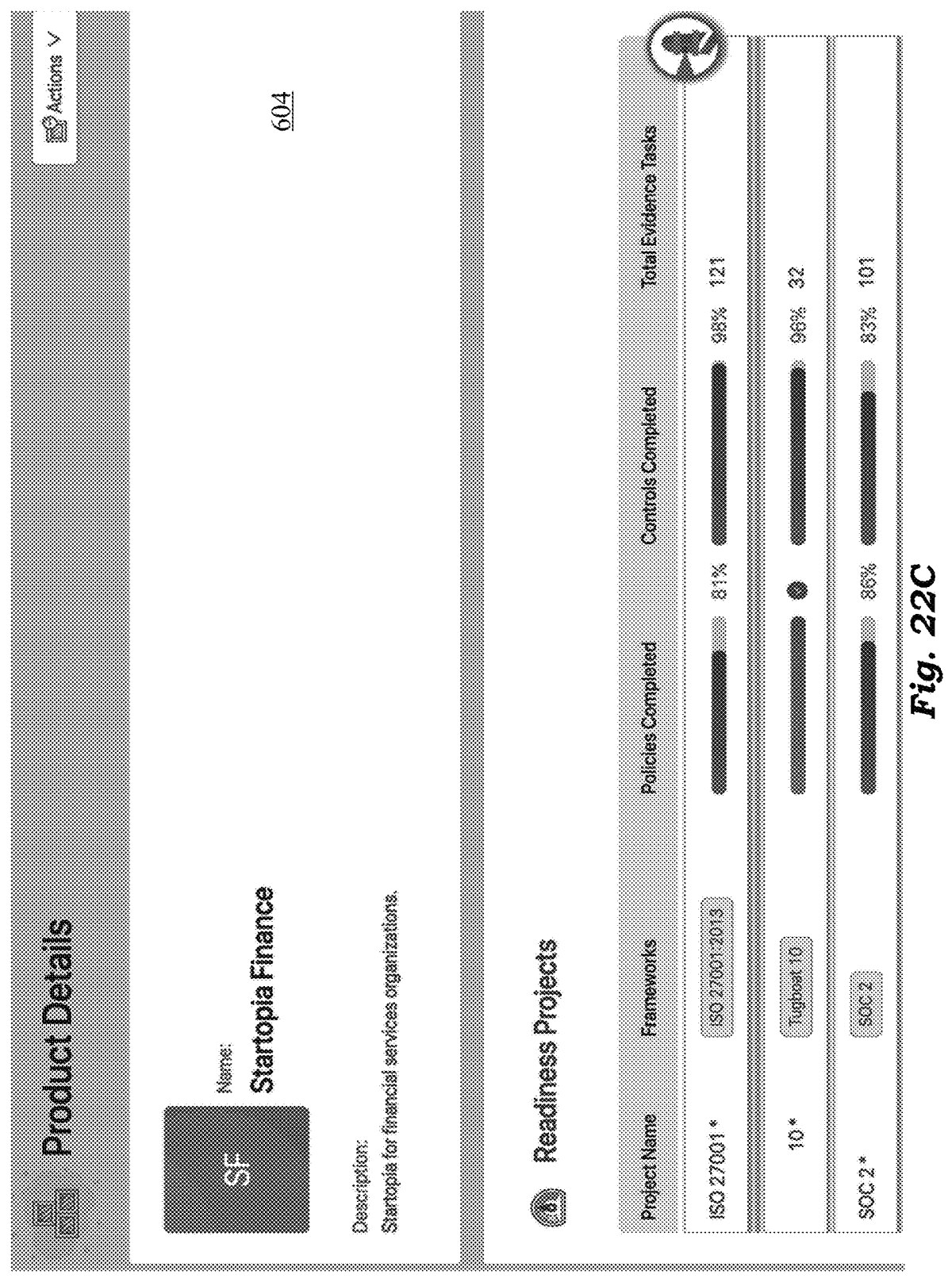

The Product Details screen is shown in screenshot portions 604 and 606 of FIG. 22C and FIG. 22D respectively for Startopia product Startopia Finance. Screenshot portion 604 shows the various readiness projects of the above teachings created/tracked/monitored by Startopia Finance. These include projects ISO 27001*, 10* and SOC 2* discussed above. In a similar manner, screenshot portion 606 shows the audit projects of Startopia Finance that are currently Active. Specifically, it shows that audit project SOC 2 Type 2 2020 that is underway or Active as indicated by the Status column. Screenshot portion 606 further shows in the Installation Status column, the status of various integrations for the collection of evidence tasks.

Exemplarily, portion 606 shows in the autocollect evidence integrations/collections box, that the integration for collecting evidence task of Code Review has not been installed for GitHub™ as indicated by the absence of a tick symbol on icon 607A. However, the integration for collecting evidence task of Code Review for Bitbucket™ has been installed for the current tenant/organization, as shown by tick symbol on icon 607B.

The above integration entails installing or activating an integration script or a program for the current tenant/organization in the instant multi-tenant SaaS web-application system or more simply multi-tenant security assurance platform/system or more simply security assurance platform. This integration script or program or simply, integration, interfaces with the code repository in question, i.e. Bitbucket™, at one end and with the instant security assurance platform at the other end, for the collection of evidence task of Code Review.

Explained further, preferably a predefined integration, or alternatively a customized integration, is installed for Startopia Finance in the instant multi-tenant SaaS web-application security assurance system/platform. This integration interfaces with Bitbucket™ via its application programming interface (API) and automatically collects evidence/proof when reviewers have reviewed the code and signed-off before a product release.

Once installed/activated for Startopia Finance, the Installation Status of the integration is reflected as being installed by tick symbol on icon 607B in screen portion 606. Moreover, this integration now automatically collects evidence task of Code Review once code review in the Bitbucket™ repository has been completed by the developers of Startopia Finance. The status of the collection of the evidence task is then reflected in various screens of the system per above teachings. The collection by the integration may be performed on-demand or based on a pre-configured collection schedule.

The instant autocollect evidence task collection or integration capability/module may not just merely copy a file(s) from the source of the evidence for its evidence task collection. Instead of or in addition, and depending on the complexity of the required evidence, it may also interpret/transform the data from the source of the evidence and then generate the evidence itself based on the interpretation of the source data in order to accomplish its collection of the evidence task.

Screen portion 606 further shows that the integration for collecting evidence task of Employee Account Authorization has been installed for Google™ G Suite as shown by tick symbol icon 607C in column Installation Status. Again, such an integration may take the form of a program/integration script installed/activated for Startopia Finance in the instant multi-tenant SaaS web-application or security assurance platform/system. The integration interfaces with the appropriate APIs of Google™ G Suite for Startopia Finance to ensure that account authorizations for the employees of the organization properly exist in G Suite.

In summary, the instant autocollect evidence task integration/collection module/capability for automatic evidence task collections takes the form of programs or integration scripts that interface with the sources of the evidence tasks at one end, and on the other end with the portion/tenant of the instant multi-tenant SaaS web-application system that is provisioned for the current tenant/organization or product. In a highly preferred embodiment, there is also a screen capture capability that allows an auditor to take screenshots of the collected evidence for incorporating into the audit.

Exemplarily, the above screen capture capability is implemented as an extension of a web-browser (e.g. Google Chrome™) and appears as a GUI widget/button. Once clicked, it displays a list of all the evidence tasks for the various readiness projects defined for the tenant/organization in the instant security assurance platform. The user/auditor can then select an evidence task, and take a screenshot/capture of the collected evidence and store the resulting screenshot along with the evidence task. The screenshot is then saved as a part of the audit for later retrieval as required.

Now, continuing with screen portion 606, the integration for Microsoft™ Azure has not been installed as indicated by the absence of tick symbol on icon 607D. Similarly, the integration for managing access for the employees has been installed as shown by the tick symbol on icon 607E. Similarly, other evidence tasks and their statuses may be shown for product Startopia Finance on various screen portions (not explicitly shown) of the Product Details screen of the instant audit dashboard.

Based on the instant multi-product functionality, there may be InfoSec entities that are implemented across all the products of an organization. These entities are referred to having an organization-wide scope. Alternatively, there may be entities that are product-specific. Screenshot portion 608 of FIG. 22E shows an example of an organization-wide control AT2—Information Security Awareness and Training. As such, this control needs only to be implemented once across Startopia organization, including all its products.

In contrast, screenshot portion 610 of FIG. 22F shows a product-specific control of SO9-Log Management Process and Access to Logs. This control is implemented just for Startopia Finance product without affecting the other products. In other words, and as indicated in the screenshot portion, there are clones of this control for individual products. Therefore, the implementation of this control for Startopia Finance does not affect the status of this control for Startopia Health and vice versa.

It should be noted that even though an entity may have an organization-wide scope, it is possible for different products to enforce or implement it differently. For example, control PCI 8.2.1—Strong Cryptography for Authentication Credentials may be implemented using different technologies for product Startopia Finance as compared to product Startopia Health. This may be because the former has its data in Amazon web services (AWS™) cloud and the later has its data in Google™ cloud. This also implies that the respective evidence tasks to verify the implementation of this control will be accomplished via different integrations for the two products.

Figure 22G:
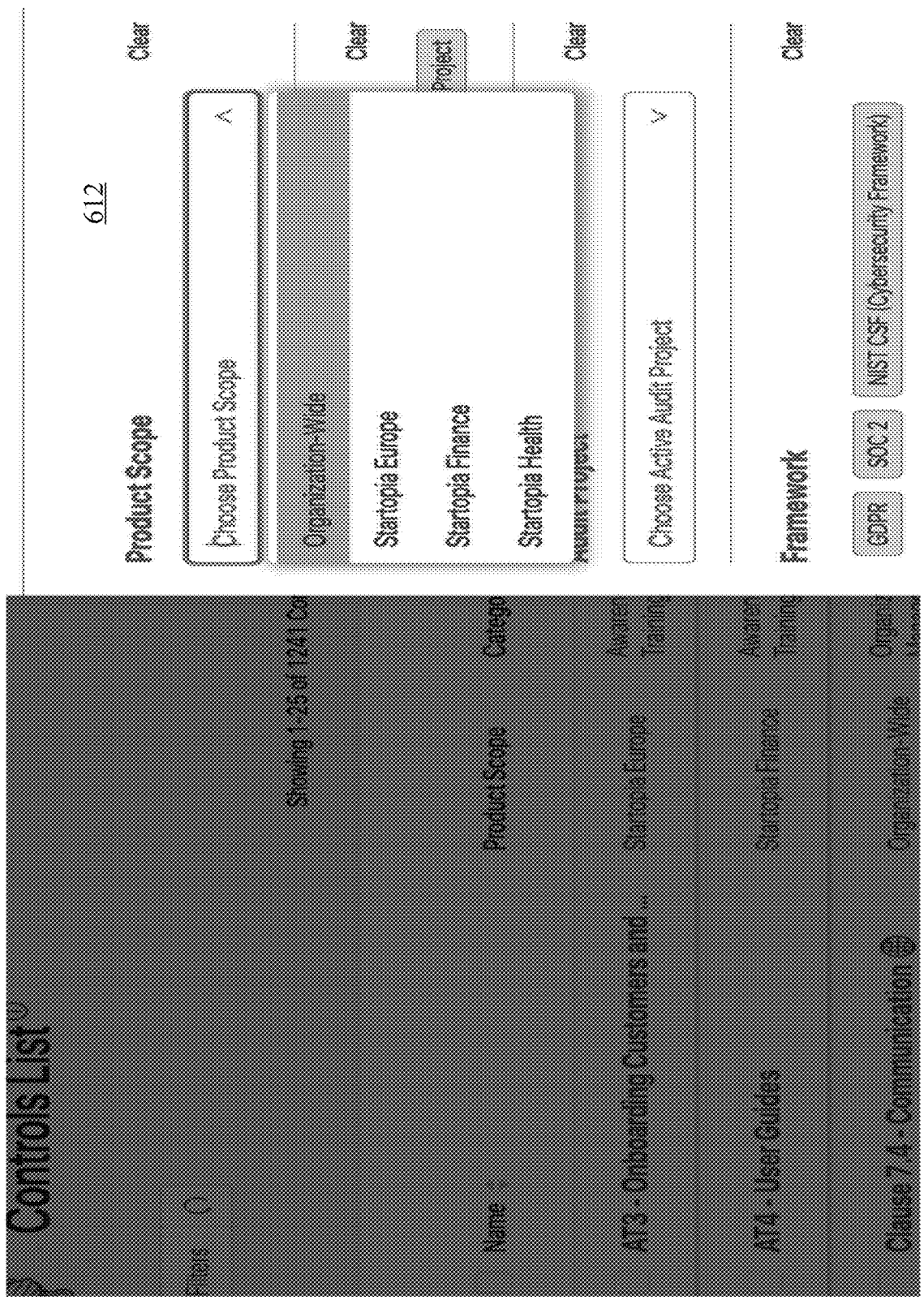

Finally, screenshot 612 of FIG. 22G further explains the instant multi-product capability of the present embodiments. It shows that based on the selection of the Product Scope dropdown shown, the user can view the various applicable InfoSec entities based on the selected scope. The scope may be organization-wide or product-specific for individual products Startopia Europe, Startopia Finance or Startopia Health. Based on the selected scope, the entities shown may be the list of controls as shown on the left-hand side of the screen portion, or other InfoSec entities.

FIG. 23 shows an architectural block diagram 650 of an exemplary implementation of the instant security assurance platform. At the core of the instant architecture are InfoSec Entity Content Databases 652 and Frameworks Databases 654. As their names imply, the former are responsible for storing the various InfoSec entities of the above teachings, including policies, procedures, controls, evidence tasks and risks as shown. The later are responsible for storing the various security frameworks including SOC 2, ISO 27001, HIPPA, PCI DSS, etc. as shown.

Preferably, the above databases are relational databases. But alternatively, they may be other types of databases, including NoSQL, graph, object or any other type of databases. These databases interact with each other as shown, as well as other modules of the system including a security questionnaire response (SQR) module 658, a readiness project module 660, an audit project module 662, an auto-collect evidence task integration/collection module 664, a risk assessment module 666 and a multi-product module 668, each responsible for the respective functionalities provided in the above teachings.

More specifically, module 658 is responsible for housing the SQR generation and management functionality of the prior embodiments. Modules 660 and 662 are responsible for creating, maintaining and tracking readiness and audit projects respectively per above teachings. Module 664 houses the integrations for automatic collection of evidence tasks per above. Module 666 provides the risk assessment capability per above, and module 668 provides the instant multi-tenant security assurance platform/system its multi-product functionality taught above.

There is also a security assurance module 656 that implements the instant web-application portal or front-end or web-interface or user-interface or GUI 657A for user 657B of a tenant/organization/customer of the instant security assurance platform as shown. Of course, web-application portal 657A works in conjunction with various other modules of the system. These include an InfoSec policy module that maintains the various policies used by the tenant/organization. It also interfaces with the InfoSec document generation engine responsible for generating an InfoSec document of the above teachings.

Portal 657A also interfaces with a security assurance reporting module as shown that provides it the ability to generate various security reports, on-demand or otherwise, for tenant user 657B. Security assurance module 656 also interfaces with readiness project module 660, audit project module 662 and database discussed above. Not all the interconnections may be shown in FIG. 23 for reasons of clarity. Similarly, the various sub-modules of above modules 656, 658, 660, 662, 664, 666, 668 are also shown in their respective blocks in the architectural block diagram of FIG. 23 but not individually marked with reference numerals in order to avoid clutter.

Risk Assessment Module (RAM) 666

Let us now discuss another set of highly preferred embodiments that are directed to the functionality of our real-time risk assessment module or RAM 666 of FIG. 23 discussed above in conjunction with related modules. Risk assessment module 666 of FIG. 23 is a module within the instant security assurance platform that is focused on automating the creation and management of risk assessments. It is further responsible for continuously and in real-time/near real-time, monitoring compliance of the tenant organization for mitigating controls within the risk register. As a result, the organization always knows which mitigating controls have been implemented and which ones have not been implemented, and thus has a real-time or near real-time knowledge of its security and compliance status.

In order to gain a better understanding of these embodiments, let us take advantage of FIG. 24. FIG. 24 presents our real-time risk assessment module 666 shown within the dashed lines in conjunction with other related modules. Not all the modules of instant security assurance platform and not all the interconnections between various modules in FIG. 24 are explicitly shown to avoid clutter. An instant RAM of our security assurance platform is composed of the following main sub-components:

1. Risk recommendation engine 702: This sub-module is responsible for automatically suggesting/recommending to the tenant organization as to which business risks to consider.
2. Mitigating controls recommendation engine 704: This sub-module is responsible for automatically suggesting to the tenant organization as to which InfoSec controls to use for mitigating the business risks.
3. Real-Time risk register 706: This sub-module/module is responsible for real-time monitoring of risks based on the operational state of the mitigating controls.
4. Multiproduct risk compliance monitoring 708: This functionality provides in-depth monitoring of the operational state of the mitigating controls, encompassing or across multiple product lines or scopes within an organization.

As a result of the capabilities afforded by the present embodiments, a tenant organization is able to define its risks upfront along with their mitigating controls, and by a real-time risk register, monitor the compliance of the organization on an ongoing basis.

FIG. 25 shows a flow diagram of the detailed steps followed by the real-time risk assessment module 666 of FIG. 24 working in conjunction with related modules. Let us now review flowchart 750 of FIG. 25 in conjunction with FIG. 24. As shown by box 752, the first step is to create one or more readiness projects per above teachings, that cover the requisite compliance requirements and have the required scope or product lines of the tenant organization. The readiness project capability is afforded by readiness project module 712 shown in FIG. 24.

Further, as discussed above in the multi-product functionality of the instant security assurance platform, and specifically with reference to FIG. 22A through FIG. 22C and related teachings, the scope defines which product-line(s) the above-created readiness project(s) belong to. The multi-product functionality is afforded by multiproduct module 720 shown in FIG. 24.

The creation/defining of readiness projects in step 752 of FIG. 25 helps the tenant organization identify or choose the relevant risks and associated mitigating controls, per step 754 of flowchart 750. Based on the controls defined/included in the readiness project(s) created by the tenant organization, the corresponding risks mitigated by the controls are automatically recommended to the tenant user/admin or simply user by risk recommendation engine 702. There is a risks library 710 that contains a database/data store of all the business risks of the instant security assurance platform.

Risk recommendation engine/module/sub-module 702 draws risks from risks library 710 to recommend to the tenant user per above. Risk register 706 is thus an automated risk assessment creation tool that automatically suggests business risks associated with a variety of industry frameworks such as SOC 2, ISO 27001, NIST CSF, PCI DSS, HIPAA, GDPR, CCPA, etc. If a customer does not understand which business risks to include in their risk assessment, risk register 706 recommends risks drawn from risks library 710 and based on frameworks containing controls already defined in the instant security assurance platform. A key benefit of risk recommendation engine 706 is that it greatly reduces the time and expertise needed to provide robust risk assessment for a tenant organization.

Risk recommendation engine 706 selects those risks from risk library 710 that are covered/mitigated by the controls in the readiness project(s) created by readiness module 712 at step 752. These risks are then presented to tenant user via a UI/GUI screen as recommended risks or recommendations to consider as a part of risk assessment for the tenant organization. Furthermore, if there is a certain risk not contained in risk library 710, the tenant user is also able to define a custom risk and add it to risks library 710.

At next step 756, the tenant user determines the risk level of each risk, exemplarily High, Medium or Low per above teachings, and specifically per FIG. 15A-B and associated explanation. This is also referred to as the inherent risk level, and is based on the likelihood of each risk being realized and its impact on the organization. In other words, it is the unmitigated state of the risk and the impact that the realized risk will have on the tenant organization.

Instead of the 3-tier risk rating of High, Medium or Low above, the tenant is also able to define any customizable risk rating for their risk assessment. For example, the customer/client/tenant can choose different granularity of risk ratings, such as with 4 or 5 tiers—exemplarily, Very High, High, Medium, Low or Very High, High, Medium, Low, Very Low, etc. The tenant can also define custom names for their risk levels and what they signify. For example, if the tenant user wishes to quantify what a financial risk means, he/she can define High as "Greater than $1 M in impact", etc.

The above flexibility of defining custom risk ratings in the instant platform is important because there are many different methodologies practiced in the world of risk assessments. Some tenants may wish to keep it simple (High, Medium, Low), while some may have unique rubrics for risks where they wish to choose their own naming convention, and while still others may wish to associated hard numbers to the risks based on quantitative analysis—also known as the quantitative method. The present customizable risk rating capability is able to support any of the above tenants.

Now, at this stage, and as per box 758 of flowchart/flow diagram 750 the tenant user, via one or more appropriate UI/GUI screens, chooses how to treat each risk. More specifically, the tenant user is given the option of Accepting, Transferring, Mitigating or Avoiding each risk. The reader is referred to the section entitled Risk Management Procedure in conjunction with FIG. 14 and FIG. 15A-B for an explanation of risk treatment plan and the above-referenced treatment options.

Now, if the user selects the option to Mitigate a risk, the multi-tenant security assurance platform automatically recommends the controls for mitigating the risks per box 760. Thus, in a manner similar to risk library 710 and risk recommendation engine 702, there is also a controls library 714 and a mitigating controls recommendation engine 704. In conjunction with risk library 710, readiness product module 712 and risk recommendation engine 702, mitigating control recommendation engine 704 selects mitigating controls from library 714 that mitigate the risks recommended by risk recommendation engine 702 per above. If a certain control does not exist in control library 714, then the tenant user is given the option of creating a custom control via appropriate UI/GUI screen(s) which can be then added to controls library 714.

To summarize the functionality of mitigating controls recommendation engine, it provides an automated mechanism of recommending mitigating controls to reduce the risk level of the identified business risks. Risks library 710 of business risks is mapped to InfoSec controls library 714 covering a variety of industry frameworks such as SOC 2, ISO 27001, NIST CSF, PCI DSS, HIPAA, GDPR, CCPA, etc. The instant platform automatically provides a list of controls for each risk associated with these frameworks, for the tenant to choose from so the tenant user does not need to create custom mitigating controls for each risk.

Because of the live linkage of various Infosec entities in the instant security assurance platform per above teachings, these controls are linked to their readiness project defined above in step 752. A key benefit of the present embodiments is that they greatly reduce the time and expertise needed for performing a robust risk assessment for the organization.

At this stage, and as per box/block/step 762, the tenant user selects the residual risk level for each risk, once the respective mitigating control(s) have been implemented, per above teachings. Exemplarily, the user may select the residual risk level from predefined categories, such as High, Medium or Low. Alternatively, the user is allowed to define a custom residual risk level as needed. Now, per box/step 764, the user defines the assets and/or processes that are associated with or affected by each risk. In other words, via an appropriate UI/GUI screen(s), the user selects or enters those items or process of value to the tenant to the organization that are exposed to the respective risks and need to be protected. Protected assets may be physical objects, people or a processes, or anything of value.

As a final step/box 768 of risk assessment flow diagram 750 of FIG. 25, real-time risk register 706 of FIG. 24 continually monitors operational status of all the mitigating controls identified/selected by tenant user in step 760. This results in continuous and near real-time or real-time compliance monitoring of the tenant organization against business risks and associated frameworks defined under the readiness project(s) of the organization in step 752. These business risks have the potential to cause liability and exposure to the product-lines/scope of the tenant organization as covered by the readiness project.

In order to accomplish its objectives, risk register 706 works in conjunction with evidence task entities 716 and associated autocollect evidence task collection/integration module 722 shown in FIG. 24. Recall from the above teachings, that autocollect evidence task collection/integration module/capability automatically collects evidence of the implementation/operational status of various controls in the multi-tenant (SaaS) security assurance platform via one or more integrations. Furthermore, risk register 706 also works in conjunction with control entities 718 and multiproduct module 720 shown in FIG. 24 that provide respective capabilities in the system per present teachings.

The status of the implementation of mitigating controls is then displayed on a risk assessment dashboard of the risk register. The user is also able to generate and export a corresponding risk assessment report for the tenant organization as needed. Risk register thus provides an automated dashboard of all risks in a risk assessment, tracking the operational state/status of each mitigating control associated with each risk on a continual basis, and in real-time or near real-time. Each risk has one or more associated controls, and there is automated knowledge to the user of the operational state of each control based on evidence/evidence task(s) collected to prove whether the control is currently still in place and operating.

The "at-a-glance" graphical dashboard of real-time risk register 706 of FIG. 24 also indicates which risks are green or red for both the implementation state/status (control implemented) and the operational state/status (evidence is current, e.g. obtained in the last 3 months). Further, the user can drill down into any risk and quickly determine the root cause of non-compliance by seeing which mitigating control is not operational, and for which product lines.

In the techniques of the prior art, most risk assessments are disconnected from reality because of the lack of knowledge of whether various InfoSec controls are actually operational. The core benefits of the instant risk assessment functionality over the prior art include leveraging the Usage-based design of the present architecture, to enable a tenant organization to always know in real-time/near real-time whether the risks and associated controls identified in the risk assessment are in fact operational. If controls are not operational, then the organization is exposed to respective risks, which could lead to significant impact to the organization including either financial damages, reputational damages and/or loss of intellectual property.

FIG. 24 also shows a multiproduct compliance monitoring capability 708 afforded by the present embodiments. This capability allows monitoring for compliance of all product lines in the organization with the controls identified in risk assessment. Further, alerts are generated for a tenant user, who may be an admin, as to which specific products and controls are out of compliance in an automated graphical dashboard. The key benefits of this capability include that it greatly improves the ease of educating the entire organization on InfoSec controls based on best practices, how they relate to business risks. This ensures that everyone in the organization is following InfoSec best practices, thereby reducing the risk level of the overall organization.

Let us now further understand the present embodiments in even more detail with the help of screen mock-ups or screenshots or simply screens from a user interface, such as a graphical user interface (GUI) of a specific implementation of the instant technology. For this purpose, let us review FIG. 26 showing the screen mock-up 800 for the starting point of a risk assessment discussed above. More specifically, screen mock-up 800 of FIG. 26 shows a screen that presents to a tenant user, the outline of the flow carried out by risk assessment module 666 in cooperation with other modules shown in FIG. 24 and per the detailed flow diagram of FIG. 25 discussed above. The screen further contains informative content to the user about what is risk assessment, why it is important and the steps involved in carrying it out. The user begins the risk assessment for the tenant organization by clicking on the "Get Started" button shown.

After clicking the "Get Started" button of screen 800, the subsequent screen 810 presented to the user is shown in FIG. 27 for the creation of one or more readiness projects per above discussion. This is per the first step/box 752 of flowchart 750 of FIG. 25 and based on the functionality of module 712 of FIG. 24. The creation of readiness projects was discussed in detail with reference to FIG. 16A-B, FIG. 17A-C and FIG. 18A-E and the related teachings.

On screen 810, the tenant user selects the specific scope or product-line(s) per prior teachings, desired for the readiness project of tenant organization by using drop-down widget 804 as shown. Then he/she selects the observation period from "Start Date" and "End Date" drop-downs shown. Once the user clicks the "Create" button, the readiness project for the desired scope/product-line(s) is created.

Now we go to screen 820 presented in FIG. 28, and as per step 754 of flowchart 750 of FIG. 25 and based on the functionality of risk recommendation engine 702 and risk library 710 of FIG. 24. More specifically, the tenant user now identifies the risks associated with the readiness project(s) created above. Screen 820 presents the risk identification survey already discussed above in reference to FIG. 19A-C and related explanation. However, screen 820 of FIG. 28 shows slightly different selection of risk areas recommended by risk recommendation engine 702 for our current example of the readiness project defined above. Risk recommendation engine 702 of FIG. 24 drives the risk identification survey because it is here where the risk recommendations are made to the tenant based on the readiness project(s) defined above.

Once the user clicks the "Generate Risks" button, a real-time risk register 706 of FIG. 24 is generated with individual risks for the risk areas selected and per prior explanation. Now we go to screen 830 presented in FIG. 29, and as per step 756 of FIG. 25. More specifically, now the tenant user selects/assesses the likelihood of the occurrence of each risk, exemplarily Risk #1 shown, using the "Rate Likelihood" buttons of High, Medium, Low shown. The tenant user further selects/assesses the impact on the product/scope of the organization of Risk #1 from the "Rate Impact" buttons of High, Medium, Low shown. The inherent risks are then computed by the system as:

High Likelihood×High Impact=High Inherent Risk
High Likelihood×Medium Impact=High Inherent Risk
High Likelihood×Low Impact=Medium Inherent Risk
Medium Likelihood×High Impact=High Inherent Risk
Medium Likelihood×Medium Impact=Medium Inherent Risk
Medium Likelihood×Low Impact=Medium Inherent Risk
Low Likelihood×High Impact=Medium Inherent Risk
Low Likelihood×Medium Impact=Medium Inherent Risk
Low Likelihood×Low Impact=Low Inherent Risk Once the user selects/assesses the inherent risk level of Risk #1 and clicks the "Next Step" button shown, he/she is then presented with screen 840 of FIG. 30 shown, and per step 758 of FIG. 25. More specifically, the tenant user now selects the risk treatment plan (RTP) per prior explanation for our exemplary Risk #1, and from "Risk Treatment" buttons of Accept, Transfer, Mitigate and Avoid on screen 840 as shown. As already taught, the user may choose to mitigate the risk, consequently including one or more mitigating controls in the RTP for Risk #1. Explained further, if the user chooses the risk treatment option/plan of Mitigate for Risk #1 and the user clicks the "Next Step" button at the bottom of screen 840, he/she is then taken to Screen 850 presented in FIG. 31 for choosing corresponding mitigating controls.

Screen 850 of FIG. 31 allows the user to select/choose mitigating controls for each risk, exemplarily Risk #1 shown, and based on step 760 of flowchart 750 of FIG. 25 and utilizing the functionality of mitigating control recommendation engine 704, controls library 714 and control entities 718 of FIG. 24. More specifically, the user is shown a list of controls that are currently linked to Risk #1 in "Current Linked Controls" table shown. In addition, the user is also shown a list of controls that are recommended for Risk #1 but not yet linked to Risk #1 in "Recommended Controls" table shown.

The mitigating controls are thus automatically recommended to the user instead of the user having to custom define/create them for each risk as in the techniques of the prior art. Both the above tables further show the industry frameworks that require the controls to be implemented as well as the scope of the controls in respective columns Framework and Product Scope. The tables also show the implementation status of each control, in column Implemented.

After the user has selected mitigating controls for Risk #1 and the user clicks the "Next Step" at the bottom of screen 850, he/she is taken to screen 860 presented in FIG. 32, as per step 762 of FIG. 25. More specifically, the user defines/selects the residual risk level for our exemplary Risk #1 from "Define Residual Risk" buttons of High, Medium and Low as shown. The tenant user now further assigns an owner/assignee from the tenant organization to the mitigation of Risk #1 from "Assign Risk Owner" drop-down. He/she can further add specific Action Items for the Assignee and due date at which the risk will/should be mitigated, as well as the status of risk mitigation, from respective screen widgets shown in FIG. 32.

Now, once the tenant user clicks the "Next Step" button at the bottom of screen 860, he/she is taken to screen 870 presented in FIG. 33, and as per step 764 of FIG. 25. More specifically, the user defines and associates the assets to Risk #1 that will be affected/exposed by it, or need to be protected from it if the risk is realized. "Assets" table shown in screen 850 lists the various assets, their type and description as shown. Furthermore, from the drop-downs shown in column "Actions" of the table, the user is able to associate individual assets to Risk #1 as shown. The user can also add additional assets by clicking the Add Asset button shown.

Now after the user has defined/associated the impacted assets, clicking the "Next Step" of screen 870 takes the tenant user to screen 880 of FIG. 34 and per final step 766 of flow diagram 750 of FIG. 25. More specifically, screen 880 shows a view of the dashboard of real-time risk register discussed above. Screen 880 shows the summary portion of our real-time risk register 706 of FIG. 24 showing various attributes of each risk discussed above in an easily consumable tabular form. This allows the tenant organization to get a snapshot of the compliance of the organization to various business risks and is a key innovation over the techniques of the prior art. The various columns shown in the risk register summary page are self-explanatory and have been discussed above.

FIG. 35A shows a portion 890 of risk register summary page from another example. It shows that Risk 1 for the tenant while implemented, is not operational. Once the user clicks on the risk in the row, a detailed pane expands underneath as shown, containing the detailed status of the 3 mitigating controls for the risk.

From the detailed pane for Risk 1 shown, control SO5—Encryption for Data at Rest has been implemented for both products Product #1 and Product #2, however it, it is only operational for Product #1. Therefore, the tenant immediately knows that Product #1 is compliant while Product #2 is not, and that is why the summary page shows Risk 1 as not operational. In addition to the detailed pane, an informational message is also shown to the user. This message is shown in screen portion 892 of FIG. 35B. From screen FIG. 35B, the user can click on the View Evidence Task button to view or update the evidence task for the non-operational control.

Note above the distinction between an implementation of a control and its operational state/status. The initial implementation of a control requires appropriate integrations in the instant platform using which the autocollect evidence task integration/collection module/capability collects evidence that verifies the implementation of the control. However, once initially implemented, the evidence collection may still need to be performed on a periodic basis to verify that the control is still implemented, or in other words, its operational status/state remains operational/active.

This may require periodic evidence task collection and refreshing or uploads of supporting documents based on the requirements of the control. If the supporting evidence or documents have become "stale", then this means that although the control was initially implemented and its prior operational status may have been operational, nonetheless its current operational status is no longer operational. This was the case for our example of FIG. 35A-B above.

As noted, instant real-time risk register 706 of FIG. 24 shows the implementation status and operational status of each mitigating control that is used to mitigate the risks identified during a risk assessment. For this purpose, it works in cooperation with autocollect evidence task integration/collection module 722 per above teachings.

Bulk-Uploader for Custom Risk Registers:

In order to further support custom risk assessment for a tenant, the instant security assurance platform with its risk assessment capabilities of the present embodiments can also bulk-upload/import an existing custom or legacy risk register into the instant risk assessment module. Explained further, the real-time risk register 706 of FIG. 24 allows populating itself with risks, controls, statuses, and any related detail, etc. contained in a file of a given tenant/customer/client. Such a file or files may represent a custom risk register of the tenant and is often maintained in/for another risk management solution. The present platform conveniently allows importing such a custom or legacy risk register into the instant platform via a bulk-uploader mechanism.

This important feature afforded by the instant bulk-uploader mechanism extends the real-time compliance monitoring capabilities of the instant risk register to tenants that have done prior risk assessment using legacy or alternate solutions. In other words, any prior work done by a mature tenant organization for risk assessment, including defining risks, controls, implementation/operational statuses, etc. can still be leveraged for the continuous monitoring benefits of the instant real-time risk register. In such a scenario, the custom or legacy risk register of the tenant can be imported into the instant platform by the bulk-uploader by utilizing one or more of the many available file formats, including spreadsheets or comma-separate values (CSV) files, Extensible Markup Language (XML), HyperText Markup Language (HTML), etc.

The present security assurance platform may be used in a variety of configurations within the scope of the present teachings. For example, a tenant of the instant security assurance platform may choose to use the platform only for risk assessment based on the above capabilities, without necessarily defining policies or procedures in it as in the earlier embodiments.

In yet another embodiment of the present design, a mobile device application containing all or a subset or an extension of the above-presented functionality is also implemented. Such a mobile app conveniently allows a user to perform the various functions while away from the desk. These functions may include collecting meeting notes, visitor logs, etc. as a part of evidence task collection.

The above teachings are provided as reference to those skilled in the art in order to explain the salient aspects of the invention. It will be appreciated from the above disclosure that a range of variations on the above-described examples and embodiments may be practiced by the skilled artisan without departing from the scope of the invention(s) herein described. The scope of the invention should therefore be judged by the appended claims and their equivalents.

What is claimed is:

1. A multi-tenant security assurance platform comprising computer-readable instructions stored in a non-transitory storage medium and at least one microprocessor coupled to said storage medium for executing said computer-readable instructions, said multi-tenant security assurance platform further comprising:
   (a) a readiness project module for tracking by a readiness project, a readiness of a tenant onboarded onto said multi-tenant security assurance platform for an external-facing audit project tracked by an audit project module of said multi-tenant security assurance platform, said readiness project having a desired scope for a risk assessment performed by said tenant;
   (b) a risk recommendation engine that automatically recommends one or more risks for said risk assessment, wherein at least one of said one or more risks is mitigated by implementing one or more mitigating controls, wherein said implementing is verified by collecting one or more evidence tasks and wherein said one or more mitigating controls are automatically recommended by a mitigating controls recommendation engine; and
   (c) a risk register for monitoring an operational status of said one or more mitigating controls based on said collecting;
   wherein said multi-tenant security assurance platform performs a usage-tracking of information security entities.

2. The multi-tenant security assurance platform of claim 1, wherein said one or more risks are drawn from a risks library.

3. The multi-tenant security assurance platform of claim 1, wherein said one or more mitigating controls are drawn from a controls library.

4. The multi-tenant security assurance platform of claim 1, wherein said collecting is performed by an autocollect evidence task integration module via one or more integrations installed for said tenant in said multi-tenant security assurance platform.

5. The multi-tenant security assurance platform of claim 1, wherein said readiness project is used to measure a compliance of said tenant with one or more security frameworks including General Data Protection Regulation (GDPR), System and Organizational Controls (SOC) 2, National Institute of Standards and Technology Cybersecurity Framework (NIST CSF), California Consumer Privacy Act (CCPA), International Organization for Standardization (ISO) 27001, Health Insurance Portability and Accountability Act (HIPAA) and Payment Card Industry Data Security Standard (PCI DSS).

6. The multi-tenant security assurance platform of claim 5, wherein said one or more mitigating controls are prescribed in said one or more security frameworks.

7. The multi-tenant security assurance platform of claim 1 further comprising a bulk-loader for importing a custom risk register.

8. The multi-tenant security assurance platform of claim 1, wherein said usage-tracking is used for generating said risk register, and wherein said risk register is a real-time risk register.

9. The multi-tenant security assurance platform of claim 1, wherein at least one of said one or more risks is custom created by said tenant.

10. The multi-tenant security assurance platform of claim 1, wherein at least one said one or more mitigating controls is custom created by said tenant.

11. A computer-implemented method executing computer-readable instructions by at least one microprocessor for operating a multi-tenant software as a service (SaaS) security assurance platform, said instructions stored in a non-transitory storage medium coupled to said at least one microprocessor, and said method comprising the steps of:
   (a) utilizing a readiness project module by a tenant of said multi-tenant SaaS security assurance platform for defining a readiness project with a desired scope, said readiness project used for tracking a readiness of said tenant for an external-facing audit project tracked by an audit project module of said multi-tenant SaaS security assurance platform;
   (b) utilizing a risk recommendation engine by said tenant for automatically recommending one or more risks to said tenant and for choosing a treatment plan for each of said one or more risks;
   (c) utilizing a risk assessment module for including at least one mitigating control in said treatment plan;

(d) utilizing an autocollect evidence task integration module for collecting evidence tasks for verifying an implementation of said at least one mitigating control;

(e) utilizing a risk register for monitoring an operational status of said at least one mitigating control based on said verifying; and (f) performing usage-tracking of information securities by said multi-tenant SaaS security assurance platform.

12. The computer-implemented method of claim 11, wherein said tenant utilizes said risk assessment module for assessing an inherent risk amongst said one or more risks.

13. The computer-implemented method of claim 11, wherein said tenant utilizes said risk assessment module for defining a residual risk level for each of said one or more risks.

14. The computer-implemented method of claim 11 encompassing multiple products in said scope for said tenant.

15. The computer-implemented method of claim 11, wherein said collecting in step (d) by said autocollect evidence task integration module is performed via one or more integrations installed in said multi-tenant multi-tenant SaaS security assurance platform for said tenant.

16. The computer-implemented method of claim 11 measuring a compliance of said tenant with one or more security frameworks including General Data Protection Regulation (GDPR), System and Organizational Controls (SOC) 2, National Institute of Standards and Technology Cybersecurity Framework (NIST CSF), California Consumer Privacy Act (CCPA), International Organization for Standardization (ISO) 27001, Health Insurance Portability and Accountability Act (HIPAA) and Payment Card Industry Data Security Standard (PCI DSS).

17. The computer-implemented method of claim 11 utilizing a screen capture capability for said collecting in said step (d).

18. The computer-implemented method of claim 11, wherein at least one of said one or more risks is custom created by said tenant.

19. The computer-implemented method of claim 11, wherein said usage-tracking is used for generating said risk register, and wherein said risk register is a real-time risk register.

* * * * *